(12) United States Patent
Ludwig et al.

(10) Patent No.: US 9,830,042 B2
(45) Date of Patent: Nov. 28, 2017

(54) ENHANCED ROLL-OVER, BUTTON, MENU, SLIDER, AND HYPERLINK ENVIRONMENTS FOR HIGH DIMENSIONAL TOUCHPAD (HTPD), OTHER ADVANCED TOUCH USER INTERFACES, AND ADVANCED MICE

(75) Inventors: Lester F. Ludwig, San Antonio, TX (US); Vivian Hu, San mateo, CA (US)

(73) Assignee: NRI R&D PATENT LICENSING, LLC, San Antonio, TX (US)

( * ) Notice: Subject to any disclaimer, the term of this patent is extended or adjusted under 35 U.S.C. 154(b) by 836 days.

(21) Appl. No.: 13/026,248

(22) Filed: Feb. 12, 2011

(65) Prior Publication Data

US 2011/0202889 A1   Aug. 18, 2011

Related U.S. Application Data

(60) Provisional application No. 61/303,898, filed on Feb. 12, 2010.

(51) Int. Cl.
*G06F 3/00* (2006.01)
*G06F 9/00* (2006.01)
(Continued)

(52) U.S. Cl.
CPC .............................. *G06F 3/04815* (2013.01)

(58) Field of Classification Search
CPC ........ G06F 9/4443; G06F 8/34; G06F 3/0481; G06F 3/0482; G06F 8/38; G06F 3/04847;
(Continued)

(56) References Cited

U.S. PATENT DOCUMENTS 4,748,676 A   5/1988   Miyagawa
4,899,137 A   2/1990   Behrens et al.
(Continued)

FOREIGN PATENT DOCUMENTS

EP       0 574 213 B1    12/1993

OTHER PUBLICATIONS

Dulberg, M. S., et al. An Imprecise Mouse Gesture for the Fast Activation of Controls, IOS Press, Aug. 1999, [online] [retrieved on Jul. 9, 2013] URL: http://www.csc.ncsu.edu/faculty/stamant/papers/interact.pdf.gz, 10 pgs.

(Continued)

*Primary Examiner* — Kieu Vu
*Assistant Examiner* — Anita D Chaudhuri
(74) *Attorney, Agent, or Firm* — Procopio, Cory, Hargreaves & Savitch LLP

(57) ABSTRACT

A hypermedia object associated with an application, displayed on a display screen, and responsive to information is disclosed. The information is provided by a user interface input device having two-dimensional pointing functions and at least one additional user-adjustable input for entering values from a range of more than two possible values. The hypermedia object includes a first visual representation of the hypermedia object for display in a first region of a display screen, an associated responsive area in a second region of the display for in activating the hypermedia object, and a procedure for allowing a user to activate the hypermedia object from a user-initiated action enacted on the user interface input device. Activating the hypermedia object enables the entry of at least one additional user-adjustable input value for use by the associated application.

29 Claims, 35 Drawing Sheets

(51) Int. Cl.
*G06F 17/00* (2006.01)
*G06F 3/0481* (2013.01)

(58) Field of Classification Search
CPC ............ G06F 3/04815; H04N 1/00389; H04N 1/00411
USPC ....... 715/760, 762, 763, 765, 830, 831, 833, 715/834, 835, 836, 838, 863, 865, 864
See application file for complete search history.

(56) References Cited

U.S. PATENT DOCUMENTS

| | | |
|---|---|---|
| 5,237,647 A | 8/1993 | Roberts et al. |
| 5,270,711 A | 12/1993 | Knapp |
| 5,292,999 A | 3/1994 | Tumura |
| 5,341,133 A | 8/1994 | Savoy |
| 5,347,295 A | 9/1994 | Agulnick et al. |
| 5,357,048 A | 10/1994 | Sgroi |
| 5,378,850 A | 1/1995 | Tumura |
| 5,386,219 A | 1/1995 | Greanias |
| 5,420,936 A | 5/1995 | Fitzpatrick |
| 5,440,072 A | 8/1995 | Willis |
| 5,442,168 A | 8/1995 | Gurner et al. |
| 5,459,282 A | 10/1995 | Willis |
| 5,471,008 A | 11/1995 | Fujita et al. |
| 5,475,214 A | 12/1995 | DeFranco et al. |
| 5,565,641 A | 10/1996 | Gruenbaum |
| 5,585,588 A | 12/1996 | Tumura |
| 5,592,572 A | 1/1997 | Le |
| 5,592,752 A | 1/1997 | Fu |
| 5,659,145 A | 8/1997 | Weil |
| 5,659,466 A | 8/1997 | Norris et al. |
| 5,665,927 A | 9/1997 | Taki et al. |
| 5,668,338 A | 9/1997 | Hewitt et al. |
| 5,675,100 A | 10/1997 | Hewlett |
| 5,717,939 A | 2/1998 | Bricklin et al. |
| 5,719,347 A | 2/1998 | Masubachi et al. |
| 5,719,561 A | 2/1998 | Gonzales |
| 5,724,985 A | 3/1998 | Snell |
| 5,741,993 A | 4/1998 | Kushimiya |
| 5,748,184 A | 5/1998 | Shieh |
| 5,786,540 A | 7/1998 | Westlund |
| 5,763,806 A | 8/1998 | Willis |
| 5,801,340 A | 9/1998 | Peter |
| 5,805,137 A | 9/1998 | Yasutake |
| 5,824,930 A | 10/1998 | Ura et al. |
| 5,827,989 A | 10/1998 | Fay et al. |
| 5,841,428 A | 11/1998 | Jaeger et al. |
| 5,850,051 A | 12/1998 | Machover et al. |
| 5,852,251 A | 12/1998 | Su et al. |
| 5,889,236 A | 3/1999 | Gillespie et al. |
| 5,932,827 A | 8/1999 | Osborne et al. |
| 5,969,283 A | 10/1999 | Looney et al. |
| 5,977,466 A | 11/1999 | Muramatsu |
| 5,986,224 A | 11/1999 | Kent |
| 6,005,545 A | 12/1999 | Nishida et al. |
| 6,037,937 A | 3/2000 | Beaton et al. |
| 6,047,073 A | 4/2000 | Norris et al. |
| 6,051,769 A | 4/2000 | Brown, Jr. |
| 6,100,461 A | 8/2000 | Hewitt |
| 6,107,997 A | 8/2000 | Ure |
| 6,140,565 A | 10/2000 | Yamauchi et al. |
| 6,204,441 B1 | 3/2001 | Asahi et al. |
| 6,225,975 B1 | 5/2001 | Furuki et al. |
| 6,278,443 B1 * | 8/2001 | Amro et al. .................. 345/173 |
| 6,285,358 B1 | 9/2001 | Roberts |
| 6,288,317 B1 | 9/2001 | Willis |
| 6,310,279 B1 | 10/2001 | Suzuki et al. |
| 6,310,610 B1 | 10/2001 | Beaton et al. |
| 6,320,112 B1 | 11/2001 | Lotze |
| 6,323,846 B1 | 11/2001 | Westerman et al. |
| 6,360,019 B1 | 3/2002 | Chaddha |
| 6,363,159 B1 | 3/2002 | Rhoads |
| 6,373,475 B1 | 4/2002 | Challis |
| 6,392,636 B1 | 5/2002 | Ferrari |
| 6,392,705 B1 | 5/2002 | Chaddha |
| 6,400,836 B2 * | 6/2002 | Senior .......................... 382/124 |
| 6,404,898 B1 | 6/2002 | Rhoads |
| 6,408,087 B1 | 6/2002 | Kramer |
| 6,433,801 B1 * | 8/2002 | Moon et al. .................. 715/840 |
| 6,570,078 B2 | 5/2003 | Ludwig |
| 6,703,552 B2 | 3/2004 | Haken |
| 6,793,619 B1 | 9/2004 | Blumental |
| 7,030,860 B1 | 4/2006 | Hsu et al. |
| 7,408,108 B2 | 8/2008 | Ludwig |
| 7,557,797 B2 | 7/2009 | Ludwig |
| 7,598,949 B2 | 10/2009 | Han |
| 7,611,409 B2 | 11/2009 | Muir et al. |
| 8,154,529 B2 | 4/2012 | Sleeman |
| 8,169,414 B2 | 5/2012 | Lim |
| 8,170,346 B2 | 5/2012 | Ludwig |
| 8,179,376 B2 | 5/2012 | Griffin |
| 8,345,014 B2 | 1/2013 | Lim |
| 2001/0036299 A1 | 11/2001 | Senior |
| 2002/0005108 A1 | 1/2002 | Ludwig |
| 2002/0093491 A1 | 7/2002 | Gillespie et al. |
| 2004/0074379 A1 | 4/2004 | Ludwig |
| 2004/0118268 A1 | 6/2004 | Ludwig |
| 2004/0251402 A1 | 12/2004 | Reime |
| 2006/0252530 A1 | 11/2006 | Oberberger et al. |
| 2007/0044019 A1 | 2/2007 | Moon |
| 2007/0063990 A1 | 3/2007 | Park |
| 2007/0229477 A1 | 10/2007 | Ludwig |
| 2008/0010616 A1 | 1/2008 | Algreatly |
| 2008/0091453 A1 * | 4/2008 | Meehan et al. .................. 705/1 |
| 2008/0143690 A1 | 6/2008 | Jang |
| 2008/0164076 A1 | 7/2008 | Orsley |
| 2008/0259053 A1 | 10/2008 | Newton |
| 2008/0297482 A1 | 12/2008 | Weiss |
| 2008/0300055 A1 | 12/2008 | Lutnick |
| 2008/0309634 A1 | 12/2008 | Hotelling et al. |
| 2009/0006292 A1 | 1/2009 | Block |
| 2009/0027351 A1 | 1/2009 | Zhang et al. |
| 2009/0124348 A1 | 5/2009 | Yoseloff et al. |
| 2009/0146968 A1 | 6/2009 | Narita et al. |
| 2009/0167701 A1 | 7/2009 | Ronkainen |
| 2009/0254869 A1 | 10/2009 | Ludwig |
| 2010/0013860 A1 | 1/2010 | Mandella |
| 2010/0044121 A1 | 2/2010 | Simon |
| 2010/0060607 A1 | 3/2010 | Ludwig |
| 2010/0079385 A1 | 4/2010 | Holmgren |
| 2010/0087241 A1 | 4/2010 | Nguyen et al. |
| 2010/0090963 A1 | 4/2010 | Dubs |
| 2010/0110025 A1 | 5/2010 | Lim |
| 2010/0117978 A1 | 5/2010 | Shirado |
| 2010/0177118 A1 | 7/2010 | Sytnikov |
| 2010/0231612 A1 | 9/2010 | Chaudhri et al. |
| 2010/0232710 A1 | 9/2010 | Ludwig |
| 2010/0289754 A1 | 11/2010 | Sleeman et al. |
| 2010/0302172 A1 | 12/2010 | Wilairat |
| 2010/0328032 A1 | 12/2010 | Rofougaran |
| 2010/0328051 A1 * | 12/2010 | Hale et al. .................. 340/407.1 |
| 2011/0007000 A1 | 1/2011 | Lim |
| 2011/0037735 A1 | 2/2011 | Land |
| 2011/0063251 A1 | 3/2011 | Geaghan |
| 2011/0086706 A1 | 4/2011 | Zalewski |
| 2011/0202889 A1 | 8/2011 | Ludwig |
| 2011/0202934 A1 | 8/2011 | Ludwig |
| 2011/0260998 A1 | 10/2011 | Ludwig |
| 2011/0261049 A1 | 10/2011 | Cardno et al. |
| 2011/0285648 A1 | 11/2011 | Simon et al. |
| 2012/0007821 A1 | 1/2012 | Zaliva |
| 2012/0034978 A1 | 2/2012 | Lim |
| 2012/0056846 A1 | 3/2012 | Zaliva |
| 2012/0194461 A1 | 4/2012 | Lim |
| 2012/0108323 A1 | 5/2012 | Kelly et al. |
| 2012/0192119 A1 | 7/2012 | Zaliva |
| 2012/0194462 A1 | 8/2012 | Lim |
| 2012/0195522 A1 | 8/2012 | Ludwig |
| 2012/0223903 A1 | 9/2012 | Ludwig |
| 2012/0235940 A1 | 9/2012 | Ludwig |
| 2012/0262401 A1 | 10/2012 | Rofougaran |
| 2012/0280927 A1 | 11/2012 | Ludwig |

(56) References Cited

U.S. PATENT DOCUMENTS

2012/0317521 A1 12/2012 Ludwig
2013/0009896 A1 1/2013 Zaliva
2013/0038554 A1 2/2013 West

OTHER PUBLICATIONS

Moyle, M., et al. A Flick in the Right Direction: A Case Study of Gestural Input, Conferences in Research and Practice in Information Technology, vol. 18, Jan. 2005; New Zealand, [online] [retrieved on Jul. 9, 2013] URL:http://www.cosc.canterbury.ac.nz/andrew.cockburn/papers/moyle-cockburn.pdf, 27 pgs.
Maltoni, D., et al., "Handbook of Fingerprint Recognition," Springer Professional Computing, 2nd ed. 2009, XVI, p. 74, p. 361, [online] [retrieved on Jul. 9, 2013] URL: http://books.google.com/books?id=1Wpx25D8qOwC&pg=PA361&lpg=PA361&dq=fingerprint+minutiae, 2 pgs.
VeriFinger Information, [online] [retrieved on Jun. 11, 2013] URL: http://www.fingerprint-it.com/_sol_verifinger.html, 2 pgs.
Prabhakar S., et al., Learning fingerprint minutiae location and type, Pattern Recognition 2003, 36, [online] URL: http://www.cse.msu.edu/biometrics/Publications/Fingerprint/PrabhakarJainPankanti_MinaLocType_PR03.pdf, pp. 1847-1857.
Garcia Reyes, E., An Automatic Goodness Index to Measure Fingerprint Minutiae Quality, Progress in Pattern Recognition, Image Analysis and Applications, Lecture Notes in Computer Science vol. 3773, 2005, pp. 578-585, [online] [retrieved on Jun. 2, 2013] URL: http://www.researchgate.net/publication/226946511_An_Automatic_Goodness_Index_to_Measure_Fingerprint_Minutiae_Quality/file/d912f50ba5e96320d5.pdf.
Kayaoglu, M., et al., Standard Fingerprint Databases: Manual Minutiae Labeling and Matcher Performance Analyses, arXiv preprint arXiv:1305.1443, 2013, 14 pgs, [online] [retrieved on Jun. 2, 2013] URL: http://arxiv.org/ftp/arxiv/papers/1305/1305.1443.pdf.
Alonso-Fernandez, F., et al., Fingerprint Recognition, Chapter 4, Guide to Biometric Reference Systems and Performance Evaluation, (Springer, London, 2009, pp. 51-90, [online] [retrieved on Jun. 2, 2013] URL: http://www2.hh.se/staff/josef/public/publications/alonso-fernandez09chapter.pdf.
Image moment, Jul. 12, 2010, 3 pgs, [online] [retrieved on Jun. 13, 2013] URL: http://en.wikipedia.org/wiki/Image_moment.
Nguyen, N., et al., Comparisons of sequence labeling algorithms and extensions, Proceedings of the 24th International Conference on Machine Learning, 2007, [online] [retrieved on Jun. 2, 2013] URL: http://www.cs.cornell.edu/~nhnguyen/icml07structured.pdf, pp. 681-688.
Nissen, S., Implementation of a Fast Artificial Neural Network Library (FANN), Department of Computer Science University of Copenhagen (DIKU)}, Oct. 31, 2003, [online] [retrieved on Jun. 21, 2013] URL: http://mirror.transact.net.au/sourceforge/f/project/fa/fann/fann_doc/1.0/fann_doc_complete_1.0.pdf, 92 pgs.
Igel, C., et al., Improving the Rprop Learning Algorithm, Proceedings of the Second International ICSC Symposium on Neural Computation (NC 2000), 2000, 2000, [online] [retrieved on Jun. 2, 2013] URL: http://citeseerx.ist.psu.edu/viewdoc/download?doi=10.1.1.17.3899&rep=rep1&type=pdf, pp. 115-121.
Bishop, C.M., Pattern Recognition and Machine Learning, Springer New York, 2006, pp. 561-593.
Euler Angles, 2011, [online] [retrieved on Jun. 30, 2011] URL: http://en.wikipedia.org/w/index.php?title=Euler_angles&oldid=436460926, 8 pgs.
Electronic Statistics Textbook, StatSoft, Inc., 2011, [online] [retrieved on Jul. 1, 2011] URL: http://www.statsoft.com/textbook, 1 pg.
Central Moment, Dec. 16, 2009, [online] [retrieved on Oct. 26, 2010] URL: http://en.wikipedia.org/w/index.php?title=Central_moment&oldid=332048374.
Local regression, Nov. 16, 2010, [online] [retrieved on Jun. 28, 2011] URL: http://en.wikipedia.org/w/index.php?title=Local_regression&oldid=416762287.
USPTO Notice of Allowance dated Jun. 6, 2013 issued in U.S. Appl. No. 13/846,830, filed Mar. 18, 2013.
Hernandez-Leon, R., et al., Classifying using Specific Rules with High Confidence, 9th Mexican International Conference on Artificial Intelligence, IEEE, Nov. 2010, pp. 75-80.
Fang, Y., et al., Dynamics of a Winner-Take-All Neural Network, Neural Networks, 9(7), Oct. 1996, pp. 1141-1154.
Moog, R. A., The Human Finger—A Versatile Electronic Music Instrument Component, Audio Engineering Society Preprint, 1977, New York, NY, 4 pgs.
Johnson, C., Image sensor tracks moving objects in hardware, Electronic Engineering Times, Apr. 5, 1999, 1 pg.
Kaoss pad dynamic effect/controller, Korg Proview Users' magazine Summer 1999, 2 pgs.
Leiberman, D., Touch screens extend grasp Into consumer realm, Electronic Engineering Times, Feb. 8, 1999.
Lim, et al., A Fast Algorithm for Labelling Connected Components in Image Arrays, Technical Report Series, No. NA86-2, Thinking Machines Corp., 1986 (rev. 1987), Cambridge, Mass., USA, 17 pgs.
Pennywitt, K., Robotic Tactile Sensing, Byte, Jan. 1986, 14 pgs.
Review of KORG X-230 Drum (later called Wave Drum), Electronic Musician, Apr. 1994, 1 pg.
Rich, R., Buchla Lightning MIDI Controller, Electronic Musician, Oct. 1991, 5 pgs.
Rich, R., Buchla Thunder, Electronic Musician, Aug. 1990, 4 pgs.
Dario P., et al., Tactile sensors and the gripping challenge, IEEE Spectrum, vol. 5, No. 22, Aug. 1985, pp. 46-52.
Snell, J. M., Sensors for Playing Computer Music with Expression, Proceedings of the Intl. Computer Music Conf. at Eastman, 1983, pp. 113-126.
Verner J., Artif Starr Switch Company Ztar 624-D, Electronic Musician, Nov. 1994, 5 pgs.
Haken, L., An Indiscrete Music Keyboard, Computer Music Journal, Spring 1998, pp. 30-48.
USPTO Notice of Allowance dated May 8, 2013 issued in U.S. Appl. No. 12/541,948, filed Aug. 15, 2009.
Buxton, W. A. S., Two-Handed Document Navigation, Xerox Disclosure Journal, 19(2), Mar./Apr. 1994 [online] [retrieved on May 28, 2013] URL: http://www.billbuxton.com/2Hnavigation.html, pp. 103-108.
USPTO Notice of Allowance dated Mar. 20, 2012 issued in U.S. Appl. No. 12/724,413, filed Mar. 15, 2010.
USPTO Notice of Allowance dated Jan. 10, 2008 issued in U.S. Appl. No. 10/683,914, filed Oct. 10, 2003.
USPTO Notice of Allowance dated Nov. 9, 2012 issued in U.S. Appl. No. 12/502,230, filed Jul. 13, 2009.
USPTO Notice of Allowance dated Mar. 12, 2012 issued in U.S. Appl. No. 12/511,930, filed Jul. 29, 2009.
USPTO Notice of Allowance dated May 16, 2013 issued in U.S. Appl. No. 13/441,842, filed Apr. 7, 2012.
USPTO Notice of Allowance dated May 24, 2013 issued in U.S. Appl. No. 13/442,815, filed Apr. 9, 2012.
USPTO Notice of Allowance dated Dec. 24, 2002 issued in U.S. Appl. No. 09/812,870, filed Mar. 19, 2001.
Otsu's method, [online] [retrieved on Jun. 26, 2013] URL: http://en.wikipedia.org/wiki/Otsu_method, Sep. 13, 2010, 2 pgs.
Principal component analysis, [online] [retrieved on Jun. 26, 2013] URL: http://en.wikipedia.org/wiki/Principal_component_analysis, Feb. 25, 2011, 9 pgs.
USPTO Notice of Allowance dated May 30, 2013 issued in U.S. Appl. No. 13/442,806, filed Apr. 9, 2012.
DIY Touchscreen Analysis, MOTO, [online] [retrieved on May 12, 2013] URL: http://labs.moto.com/diy-touchscreen-analysis/, Jul. 15, 2010, 23 pgs.
Wilson, T.V., How the iPhone Works, howstuffworks, [online] [retrieved on May 12, 2013] URL: http://electronics.howstuffworks.com/iphone2.htm, Jan. 8, 2011, 11 pgs.
Walker, G., Touch and the Apple iPhone, Veritas et Visus, [online] [retrieved on May 12, 2013] URL: http://www.veritasetvisus.com/VVTP-12,%20Walker.pdf, Feb. 2007, pp. 50-54.

(56) References Cited

OTHER PUBLICATIONS

Han, J., Multi-Touch Sensing through LED Matrix Displays (video), [online] [retrieved on May 12, 2013] "http://cs.nyu.edu/~jhan/ledtouch/index.html," Feb. 18, 2011, 1 pg.

Roberts Cross, [online] [retrieved on May 12, 2013] URL: http://en.wikipedia.org/wiki/Roberts_Cross, Jul. 20, 2010, visited Feb. 28, 2011, 3 pgs.

Sobel Operator, [online] [retrieved on May 12, 2013] URL: http://en.wikipedia.org/wiki/Sobel_operator, Mar. 12, 2010, visited Feb. 28, 2011, 5 pgs.

Prewitt, [online] [retrieved on May 12, 2013] URL: http://en.wikipedia.org/wiki/Prewitt, Mar. 15, 2010, visited Feb. 28, 2011, 2 pgs.

Coefficient of variation, [online] [retrieved on May 12, 2013] URL: http://en.wikipedia.org/wiki/Coefficient_of_variation, Feb. 15, 2010, visited Feb. 28, 2011, 2 pgs.

Canny edge detector, [online] [retrieved on May 12, 2013] http://en.wikipedia.org/wiki/Canny_edge_detector, Mar. 5, 2010, 4 pgs.

Polynomial regression, [online] [retrieved on May 12, 2013] URL: http://en.wikipedia.org/wiki/Polynomial_regression, Jul. 24, 2010, 4 pgs.

Pilu,M., et al., Training PDMs on models: The Case of Deformable Superellipses, Proceedings of the 7th British Machine Vision Conference, Edinburgh, Scotland, 1996, pp. 373-382, [online] [retrieved on Feb. 28, 2011] URL: https://docs.google.com/viewera=v&pid=explorer&chrome=true&srcid=0BxWzm3JBPnPmNDI1MDIxZGUtNGZhZi00NzJhLWFhZDMtNTJmYmRiMWYyMjBh&authkey=CPeVx4wO&hl=en.

Osian, M., et. al., Fitting Superellipses to Incomplete Contours, IEEE Computer Society Conference on Computer Vision and Pattern Recognition Workshops (CVPRW '04), Jun. 2004, 8 pgs.

Hough transform, [online] [retrieved on Feb. 13, 2010] URL: http://en.wikipedia.org/wiki/Hough_transform, Feb. 13, 2010, 7 pgs.

Tactile Pressure Measurement, Pressure Mapping Systems, and Force Sensors and Measurement Systems, [online] [retrieved on Aug. 6, 2013] URL: http://www.tekscan.com, 2 pgs.

Tactile Surface Pressure and Force Sensors,Sensor Products LLC, Oct. 26, 2006, [online] [retrieved on Aug. 6, 2013] URL: http://www.sensorprod.com, 2 pgs.

Pressure Profile Systems, Jan. 29, 2011, [online] [retrieved on Jan. 29, 2011] URL: http://www.pressureprofile.com, 1 pg.

Xsensor Technology Corporation, Feb. 7, 2011, [online] [retrieved on May 12, 2013] URL: http://www.xsensor.com, 1 pg.

Balda AG, Feb. 26, 2011, [online] [retrieved on May 12, 2013] URL: http://www.balda.de, 1 pg.

Cypress Semiconductor, Feb. 28, 2011, [online] [retrieved on May 12, 2013] URL: http://www.cypress.com, 1 pg.

Synaptics, Jan. 28, 2011, [online] [retrieved on May 12, 2013] URL: http://www.synaptics.com, 1 pg.

Venolia, D., et al., T-Cube: A Fast, Self-Disclosing Pen-Based Alphabet, CHI '94 Proceedings of the SIGCHI Conference on Human Factors in Computing Systems, Apr. 24-28, 1994, pp. 265-270.

Davis, R. C., et al., NotePals: Lightweight Note Taking by the Group, for the Group, University of California, Berkeley, Computer Science Division, 1998, 8 pgs.

Rekimoto, Jun, Pick-and-Drop: A Direct Manipulation Technique for Multiple Computer Environments, Sony Computer Science Laboratory Inc., Tokyo, Japan, 1997, [online] [retrieved on May 30, 2013] URL: http://www.sonycsl.co.jp/person/rekimoto/papers/uist97.pdf, 8 pgs.

Davis, R. C., et al., NotePals: Lightweight Note Sharing by the Group, for the Group, [online] [retrieved on Jun. 2, 2013] URL: http://dub.washington.edu:2007/projects/notepals/pubs/notepals-chi99-final.pdf, 9 pgs.

Want, R., et al., The PARCTAB ubiquitous computing experiment, 1995-1996, [online] [retrieved on Jun. 10, 2013] URL: http://www.ece.rutgers.edu/~parashar/Classes/02-03/ece572/perv-reading/the-parctab-ubiquitous-computing.pdf, 44 pgs.

\* cited by examiner

— PRIOR ART —

— PRIOR ART —

— PRIOR ART —

— PRIOR ART —

— PRIOR ART —

— PRIOR ART —

— PRIOR ART —

| Traditional Hyperobject | Response to: | | | | |
|---|---|---|---|---|---|
| | Cursor Contact | Click/Release | Internal-Rollover/ Click/Release | Click/ Drag/Release | Scrollwheel Operation |
| Hyperlink | Can change display | Display of another page, popup, etc. | None | None | None |
| Button | Can change display | Activate program, popup, change program behavior, etc. | None | None | None |
| Rollover | Can change display, overlay new display, etc. | None | None | None | None |
| Menu | Can cause menu pop up & menu item highlighting | Select option to change program behavior, make data entry, etc. | Change program behavior, make data entry, etc. | Select option to change program behavior, make data entry, etc. | None |
| Non-Zoom Slider | Can cause slider to pop up | None | None | Select option to change program behavior, make data entry, etc. | None |
| Zoom Slider | None | None | None | Reposition displayed view | Reposition displayed view |
| Scrollbar | None | None | None | Reposition displayed view | Reposition displayed view |

FIG. 9

— PRIOR ART —

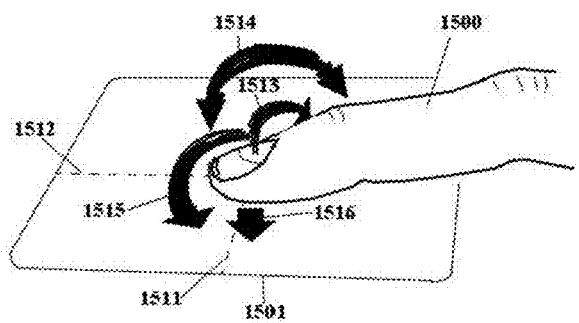
*FIG. 15*
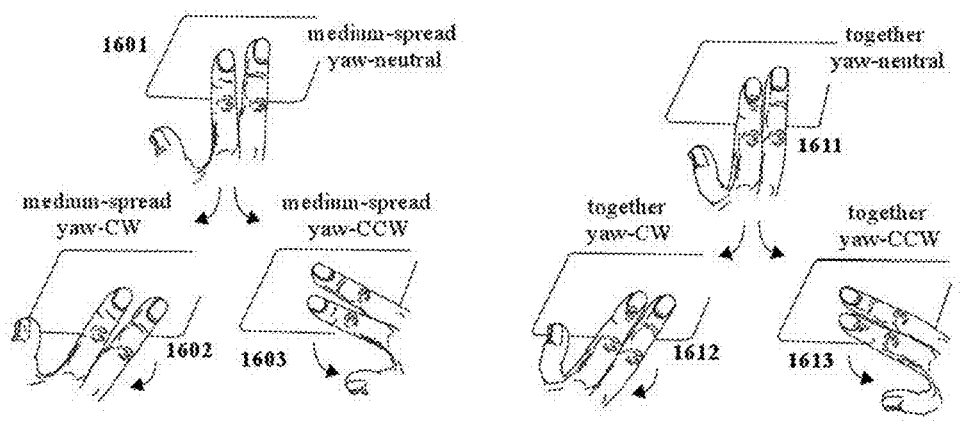
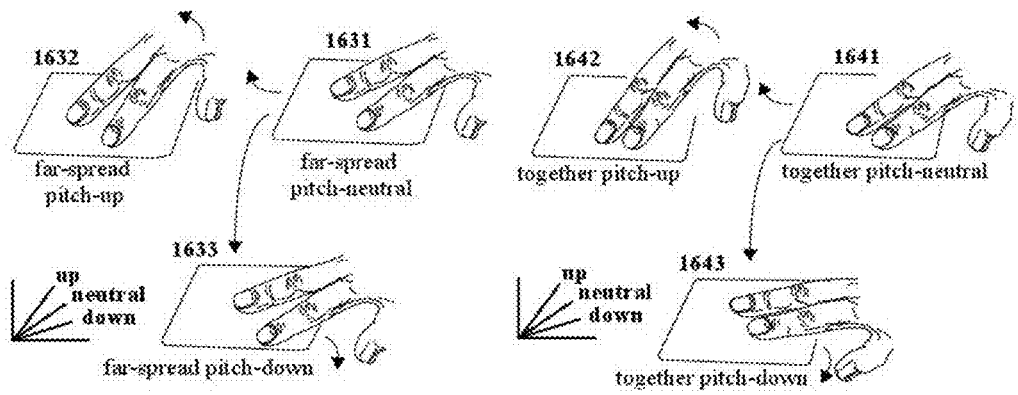
*FIG. 16*

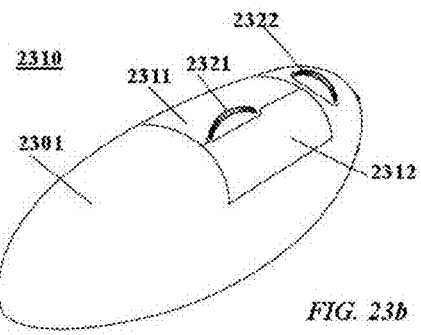
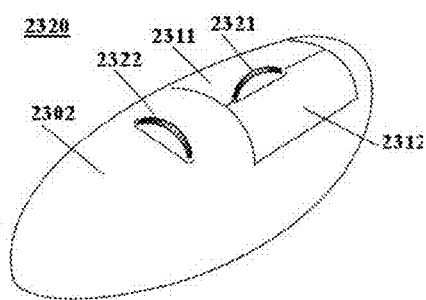
FIG. 23a  FIG. 23b
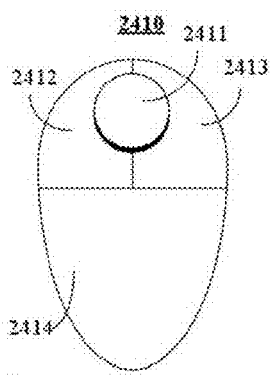
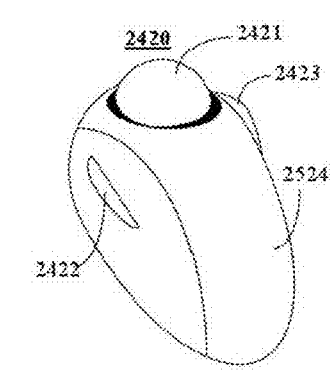
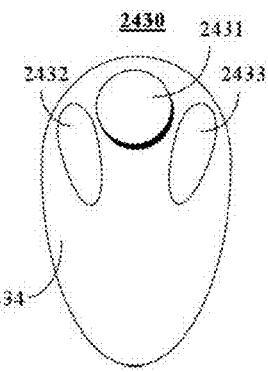
FIG. 24a  FIG. 24b  FIG. 24c
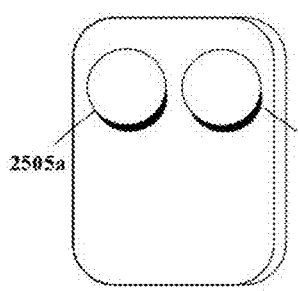
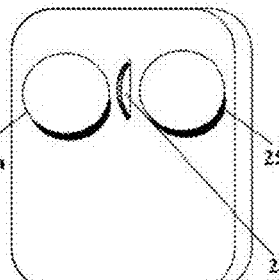
FIG. 25a  FIG. 25b
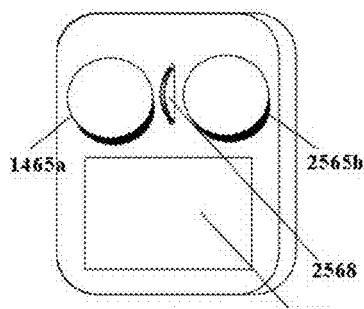
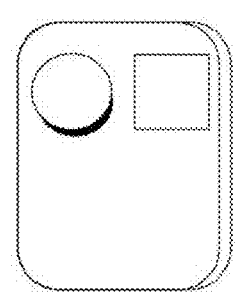
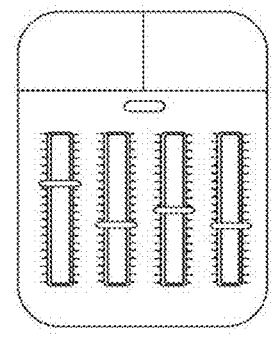
FIG. 25c  FIG. 25d  FIG. 25e

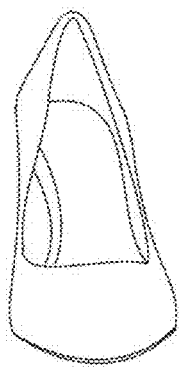
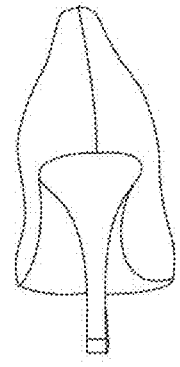
Front View
Back View
*FIG. 45a*
*FIG. 45b*
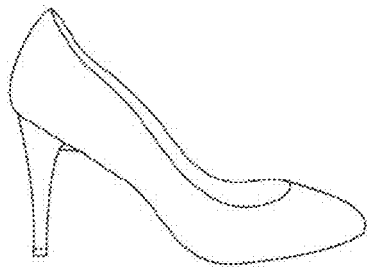
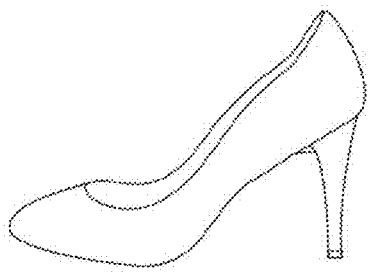
Right Side View
Left Side View
*FIG. 45c*
*FIG. 45d*
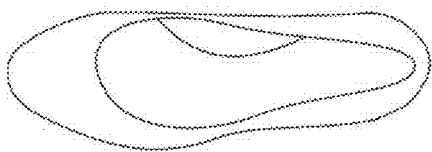
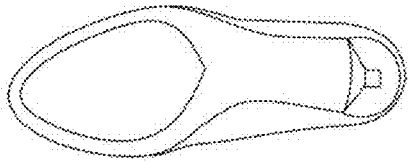
Top View
Bottom View
*FIG. 45e*
*FIG. 45f*

ENHANCED ROLL-OVER, BUTTON, MENU, SLIDER, AND HYPERLINK ENVIRONMENTS FOR HIGH DIMENSIONAL TOUCHPAD (HTPD), OTHER ADVANCED TOUCH USER INTERFACES, AND ADVANCED MICE

CROSS-REFERENCE TO RELATED APPLICATIONS

Pursuant to 35 U.S.C. §119(e), this application claims benefit of priority from Provisional U.S. Patent application Ser. No. 61/303,898, filed Feb. 12, 2010, the contents of which are incorporated by reference.

COPYRIGHT & TRADEMARK NOTICES

A portion of the disclosure of this patent document may contain material, which is subject to copyright protection. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

BACKGROUND OF THE INVENTION

Field of the Invention

The invention relates to hypermedia objects such as hyperlink, roll-over, button, slider, and menus in hypermedia documents, and user interfaces providing simultaneously-adjustable interactively-controlled discrete and pseudo-continuous user-adjustable settings and parameters, and in particular to adapting such hypermedia objects to accept and utilize the additional number of simultaneously-adjustable interactively-controlled discrete and pseudo-continuous parameters, and uses in applications.

Overview of the Invention

The present invention provides various types of extensions to the traditional and contemporary hypermedia objects such as hyperlink, roll-over, button, menu, and slider functions found in web browsers and hypermedia documents by leveraging additional and richer collections of user interface signals provided by, for example, a High Dimensional Touchpad (HTPD, as taught for example in U.S. Pat. No. 6,570,078 and pending U.S. patent application Ser. Nos. 11/761,978 and 12/418,605), Advanced Mice (for example as taught in U.S. Pat. No. 7,557,797 pending U.S. patent application Ser. Nos. 12/619,678, 13/025,129, 13/024,569, and related pending U.S. patent applications), and other rich parameter user interfaces (for example, popular advanced touch interfaces employing multitouch and/or gestures). Additionally, images of the human hand as captured by video cameras can be used as an enhanced multiple-parameter interface responsive to hand positions and gestures (for example as taught in U.S. patent application Ser. No. 10/683,915). The collection of these various technologies will be collectively referred to as Advanced Pointing Devices ("APD"). In a scaled-back implementation, scrollwheel controls of a conventional computer mouse can be used to operate the extended features of the inventive hypermedia objects such as hyperlink, roll-over, button, menu, and slider functions.

The extensions provided by the invention include:

Directing additional user input into a hypermedia "hotspot" by clicking on it in the case of a hyperlink; and Directing additional user input into a hypermedia "hotspot" simply from cursor overlay or proximity (i.e., without clicking on it) in the case of a roll-over.

The resulting extensions will be called "Multiparameter Hypermedia Objects" ("MHO"). Potential uses of the MHOs and more generally extensions provided for by the invention include:

Using the additional user input to facilitate a rapid and/or more detailed information gathering experience in an easily-entered and completed "sub-session" within a usage session;

Potentially capturing notes from the sub-session for future use;

Potentially allowing the sub-session to retain state (such as last image displayed);

Leaving the hypermedia "hotspot" without clicking out of it.

A number of user interface metaphors can be employed by the invention and/or its use, including one or more of:

Creating a pop-up visual or other visual change responsive to the rollover or hyperlink activation;

Rotating an object using rotation angle metaphors provided by the APD;

Rotating a user-experience observational viewpoint using rotation angle metaphors provided by the APD, for example, as described in pending U.S. patent application Ser. No. 12/502,230 "Control of Computer Window Systems, Computer Applications, and Web Applications via High Dimensional Touchpad User Interface" by Seung Lim;

Navigating at least one (1-dimensional) menu, (2-dimensional) pallet or hierarchical menu, or (3-dimensional) space.

Such extensions, features, and other aspects of the present invention permit far faster browsing, shopping, and information gleaning through the enhanced features of these extended functionality roll-over and hyperlink objects. The result is the advantageous employment of an APD to improve the throughput and ease of operation of a hypermedia application (for example, when doing online shopping, hypermedia reference reviews, and surfing the web) so as to obtain more information far more quickly with far less effort.

SUMMARY OF THE INVENTION

For purposes of summarizing, certain aspects, advantages, and novel features are described herein. Not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In one aspect of the invention, various types of extensions to the traditional and contemporary hypermedia objects (such as hyperlink, roll-over, button, menu, and slider functions) found in web browsers and hypermedia documents are extended to form extended hypermedia objects by leveraging additional and richer collections of user interface signals provided by, for example, a High Dimensional Touchpad ("HTPD," as taught in U.S. Pat. No. 6,570,078), Advanced Mice (as taught in U.S. Pat. No. 7,557,797), other rich parameter user interfaces such as popular touch interfaces employing multitouch and/or gestures, and images of the hand captured by video cameras.

In another aspect of the invention, the inventive extended hypermedia objects allow features such as interactive 3D rotations of depicted objects, 3D immersion experiences in virtual venues, and a number other capabilities of potentially high value to electronic commerce, education, documentation, and interactive entertainment.

In another aspect of the invention, image manipulation support for examples of these new interactive capabilities is provided.

In another aspect of the invention a hypermedia object associated with an application for display on a display screen and responsive to information provided by a user interface input device comprising two-dimensional pointing functions and at least one additional user-adjustable input for entering values from a range comprising more than two values, the hypermedia object comprising:

a first visual representation of the hypermedia object on a display screen, the first displayed visual representation for display in a first region of the display associated with an application;

an associated responsive area in a second region of the display, the responsive area for use in activating the hypermedia object;

a procedure for activating the hypermedia object from a user-initiated action enacted on a user interface input device;

wherein activation of the hypermedia object enables the entry of at least one additional user-adjustable input value for use by the associated application.

In another aspect of the invention, the first and second regions of the display are the same region.

In another aspect of the invention, the hypermedia object further comprises a hyperlink function activated by user interface input device when a cursor is positioned within the associated responsive area, the cursor position controlled by the two-dimensional pointing functions.

In another aspect of the invention, the hypermedia object comprises a rollover function activated by using the user interface input device to position the cursor within the associated responsive area, the cursor position controlled by the two-dimensional pointing functions.

In another aspect of the invention, the hypermedia object comprises a button function activated by the user interface input device when the cursor is positioned within the associated responsive area, the cursor position controlled by the two-dimensional pointing functions.

In another aspect of the invention, the hypermedia object comprises a slider function.

In another aspect of the invention, the hypermedia object comprises a menu function.

In another aspect of the invention, the user input device is a computer mouse comprising a first scrollwheel.

In another aspect of the invention, the user input device is a computer mouse further comprising a second scrollwheel.

In another aspect of the invention, the user input device is a computer mouse comprising a touchpad.

In another aspect of the invention, the user input device is a computer mouse comprising a High Definition Touch Pad (HDTP).

In another aspect of the invention, the user input device comprises a touch user interface responsive to gestures and the at least one additional user-adjustable input comprises at least one gesture.

In another aspect of the invention, the user input device comprises a touch user interface responsive to the yaw angle of a finger in contact with the touch user interface and the at least one additional user-adjustable input is responsive to a measurement of the yaw angle.

In another aspect of the invention, the user input device comprises a touch user interface responsive to the roll angle of a finger in contact with the touch user interface and the at least one additional user-adjustable input is responsive to a measurement of the roll angle.

In another aspect of the invention, the user input device comprises a touch user interface responsive to the pitch angle of a finger in contact with the touch user interface and the at least one additional user-adjustable input is responsive to a measurement of the pitch angle.

In another aspect of the invention, the user input device comprises a touch user interface responsive to at least two angles of a finger in contact with the touch user interface and the at least one additional user-adjustable input is responsive to a measurement of each of the two angles.

In another aspect of the invention, a second visual representation of the hypermedia object is displayed when the hypermedia object is activated.

In another aspect of the invention, the first visual representation of the hypermedia object changes when the hypermedia object is activated.

In another aspect of the invention, the first displayed visual representation of the hypermedia object changes responsive to the at least one additional user-adjustable input.

In another aspect of the invention, the user input device is a touch interface comprising a tactile grammar.

In another aspect of the invention is used to implement an improved interactive interface for consumers viewing products online providing users with a virtual, 3D view of the product as seen in stores, utilizing the HDTP to spatially manipulate views of the product as if handling and rotating the product.

In another aspect of the invention, as the at least one additional user-adjustable input for entering values is varied between values, one or another image of a group of images is displayed as part or all of the displayed visual appearance of an MHO, directly responsive to the last received value of the at least one additional user-adjustable input.

In another aspect of the invention, as the at least one additional user-adjustable input for entering values is varied between values, one or another image of a group of images is displayed as part or all of the displayed visual appearance of an MHO, responsive to commands or data provided by an associated program and/or other software.

In another aspect of the invention is used to implement an improved interactive interface for consumers buying event tickets online providing users with a virtual view of the event venue as seen from any of the seats available for purchase. Those who have never been to a given venue can experience the view from a given seat to inform their selection before a purchasing decision is made.

In another aspect of the invention, image processing is used to synthesize an image of a particular viewing angle from one or more photographic images comprising one or more other viewing angle(s), at least one of the calculation and display of which is under the control of a user input device.

In another aspect of the invention, a mathematical model tied to a scaled seat-map or a database linked to a seat map can calculate and/or retrieve separation distance data and viewing angle data and present to one or both of an at least one image selection element and an at least one image processing element, at least one of the calculation and display of which is under the control of a user input device.

In another aspect of the invention, separation distance data and viewing angle data is used by at least one image processing element to calculate a synthesized view from one or more photographic images, at least one of the calculation and display of which is under the control of a user input device.

In another aspect of the invention, an image selection element selects images to display based on calculated and/or retrieved viewing angle data. In an embodiment, an image selection element selects images to display based on calculated and/or retrieved separation distance data.

In another aspect of the invention, should some locations in the venue contain view obstructions, the image selection element can include provisions for selection specific image selection from obstruction-handling families of images, at least one of the calculation and display of which is under the control of a user input device.

In another aspect of the invention, distance and/or angle information can be used by an image processing element to provide one or more of selective cropping and/or distance-varying image warping to render a reasonably accurate expected view from the particular location, such as a seat or region of seats in a theater, sports, or performance venue, at least one of the calculation and display of which is under the control of a user input device.

In another aspect of the invention, at least some of the above can be used to provide display of images representing interactively selected views at various angles at the particular seat or seating area, at least one of the calculation and display of which is under the control of a user input device.

In another aspect of the invention, these and additional image processing functions can be used to implement panoramically merged images, at least one of the calculation and display of which is under the control of a user input device.

BRIEF DESCRIPTION OF THE DRAWINGS

The above and other aspects, features and advantages of the present invention will become more apparent upon consideration of the following description of preferred embodiments taken in conjunction with the accompanying drawing figures.

FIG. 9 provides a summary table of example traditional hyperobjects.

FIG. 12b provides a graphical representation of a tactile image produced by contact with multiple human fingers on a tactile sensor array of lesser spatial resolution than that depicted in FIG. 12a.

FIG. 15 suggests general ways in which two or more of these independently adjustable degrees of freedom adjusted simultaneously.

FIG. 16 demonstrates a few two-finger multi-touch postures and/or gestures from the many that can be readily recognized by HDTP technology.

FIGS. 23a and 23b illustrate examples of conventional scroll-wheel mouse provided with an added left-right scroll-wheel as taught in U.S. Pat. No. 7,557,797.

FIGS. 24a-24c illustrate examples where a single trackball is incorporated into the back of a conventional computer mouse as taught in U.S. Pat. No. 7,557,797.

FIGS. 25a-25c illustrate examples where two trackballs are incorporated into the back of a conventional computer mouse as taught in U.S. Pat. No. 7,557,797, some of these (FIGS. 25b-25c) comprising yet other additional sensors.

FIG. 25d depicts a mouse provided with a trackball and a small touchpad as taught in U.S. Pat. No. 7,557,797.

FIG. 25e depicts a mouse provided with a plurality of slider controls as taught in U.S. Pat. No. 7,557,797.

FIGS. 45a-45f depict views of a shoe as can be captured in individual images for use in the image array data structures described in conjunction with FIGS. 34-40.

DETAILED DESCRIPTION OF THE PREFERRED EMBODIMENTS

In the following description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention.

In the following description, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Windowing Systems

Desktop, laptop, tablet, web, and other types of contemporary computers provide for a plurality of active software applications to share visual display and user input devices by means of some form of windowing system. Windowing systems are well known with foundational principles dating back decades (see for example F. R. Hopgood, et al., *Methodology of Window Management*, Springer-Verlag, Berlin, 1986, ISBN 0387161163) and are known at least as an operational level to virtually all users of these devices. Without getting into the many well-known aspects of windowing systems, one skilled in the art is reminded that:

- A plurality of windows can be displayed simultaneously on the screen of the (desktop, laptop, tablet, or web) computer;
- Multiple windows can overlap one another;
- The windowing system also provides a visually-rendered cursor whose position is determined by left-right/forward-back operation provisions of a pointing device (mouse, touchpad, trackball, etc.);
- Windows are typically selected by "clicking" a discrete-event provision (button operation, touchpad tap, etc.) of the pointing device—windows can also be selected by default in some cases, such as when the initialization of a previously inactive application displays, updates, or pops-up a new window;
- A selected window remains selected until the user selects a different window or a window is selected by default;
- User keyboard input and other types of pointing device input is typically directed to aspects of an application associated with the window that is currently selected.

Figure 1:
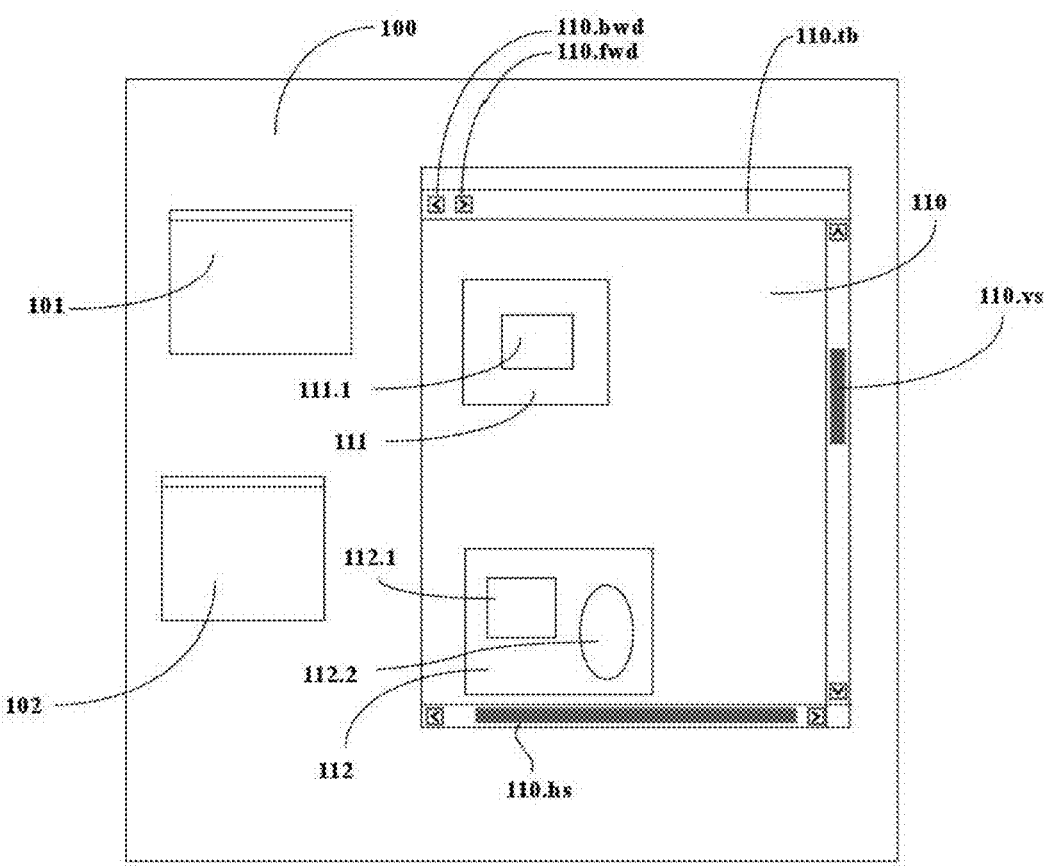
FIG. 1 depicts a plurality of windows, one or more of which can be a hypermedia application window such as a browser, and hierarchies of visually displayed and other objects within or associated with these windows.

FIG. 1 depicts a visual display screen area 100 displaying a plurality of representative windows—here 101, 102, 110. In this FIG., none of the windows 101, 102, 110 are shown as overlapping so as to streamline the discussion; one skilled in the art will understand the appearance of overlapping of one or more of these windows. One or more of these windows can be a hypermedia window such as a browser (here 110), and hierarchies of objects (111 and 111.1; 112 and 112.1, 112.2) rendered within or superimposed over the display area of the browser window 110. The hypermedia (browser or application) window 110 of FIG. 1 also depicts a toolbar 110.*tb* as well as a vertical scrollbar 110.*vs* and a horizontal scrollbar 110.*hs*. Such vertical and horizontal scrollbars typically appear when the display area within the window is smaller than the vertical and/or horizontal span of the visual content, allowing control of the vignette displayed within the aperture created by the display, this control responsive to the positions of scrollbar(s) within the degrees of possible travel. The position of a scrollbar is in turn controlled by one or more input aspects from the pointing device.

Browser and Other Hypermedia Windows in a Windowing Environment

As is also well-known, a particularly important type of window-based application is the browser. The browser visually renders information according to the directives of one or more of a markup language file (HTML, XML, etc.), a script (such as JAVA script, etc.), and/or other source material (for example, from a PDF viewer). The browser can be driven from one or more files and/or executing program(s) that are on the computer itself and/or at one or more server computers reachable over an attached network. The attached network can be a closed local area network, but far more typically the attached network provides access to the internet. Most usage of browsers is to access files and/or executing program(s) that are hosted by one or more servers reachable via the internet.

Navigation via Hyperlinks and Page Arrow Buttons

Figure 2:
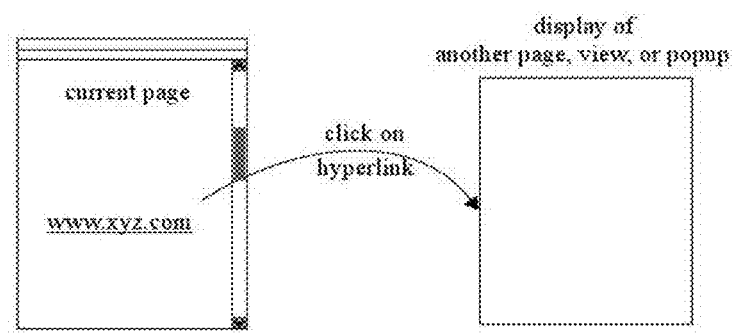
FIG. 2 depicts typical operation of a traditional hyperlink.

Browsers and some other type of applications can include various types of visually-cued 'hyperlink' objects that can be spatially-localized within the window (underlined, highlighted, and/or colored text, images or regions within images, etc.) that can be operated by pointing device input events such as clicking when the screen cursor is overlaid or sufficiently close to the spatial location of the visual cue. Operation of the hyperlink typically either changes the material displayed in the window or associated additional window, or causes the display of a new window as is depicted in FIG. 2.

Because such windows typically display combinations of text, graphics, images, and/or video, portions or entireties of which can implement hyperlinks, browsers and similarly-featured application windows can be referred to as hypermedia application windows.

Figure 3:
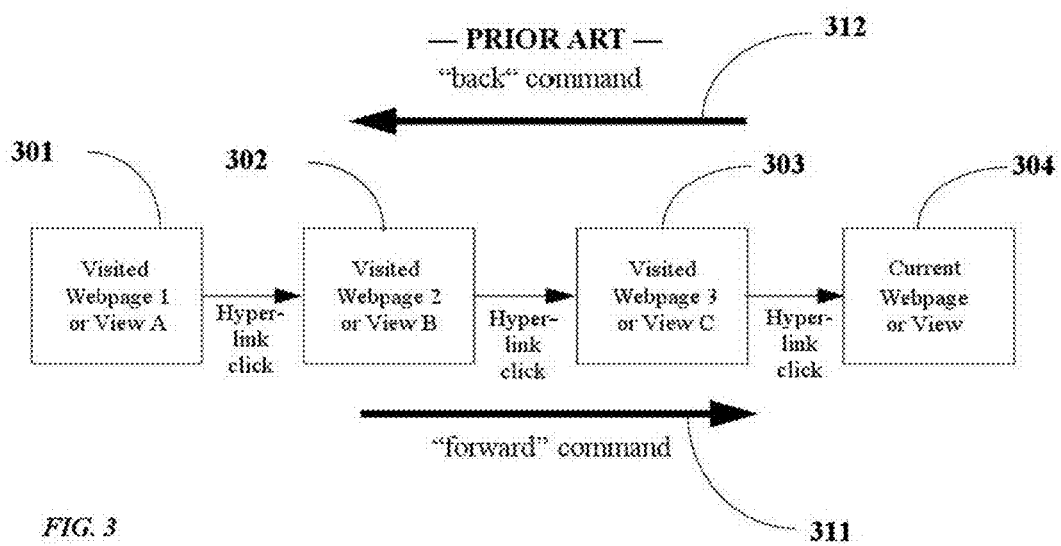
FIG. 3 depicts modes of navigation among web pages or hypermedia views.

FIG. 3 depicts an example of navigation among web pages in a browser window or views within another type of hypermedia application window. Hyperlinks themselves provide stepwise means for moving forward in a sequence of views, while toolbar 110.*tb* page arrow buttons, such as the buttons 110,*fwd* and 110.*bwd*, operated by input from the pointing device, allows one to move forward 311 or backward 312 within the sequence of web pages or views 301-304 traversed up to the time of their operation. It is noted that, in typical implementations, branching into an alternative hyperlink from a previous web page or view (any of 301, 302, 303) destroys all forward history (respectively 302-304, 303-304, 304). Some contemporary tabbed browsers overcome this limitation by creating a new tab that inherits the actively displayed webpage/view and history.

Contemporary Hyperlink, Rollover, Button, Slider, and Menu Objects

In this section, traditional and contemporary hypermedia objects such as hyperlink objects, button objects, rollover objects, menu objects, and slider objects (including scrollbar sliders and zoom sliders which are additionally often controlled by the scrollwheel of a scrollwheel mouse whenever a window or frame within a window is selected) are considered and compared.

Cursor Contact/Proximity Detection

Figure 4:
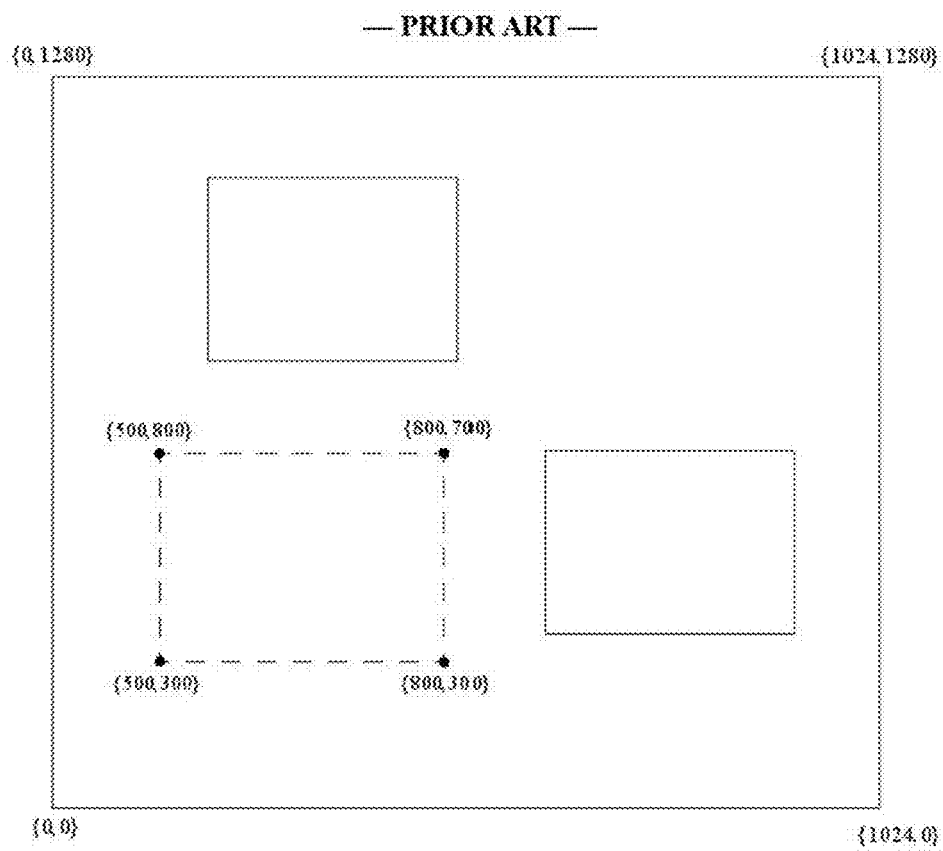
FIG. 4 depicts a rectangular region of a window or hypermedia object in a window, defining quantities and geometric aspects relevant to conditional tests for cursor location within a displayed area.

Each of the traditional hyperlink, rollover, button, slider, and menu objects described below require conditional tests on the location of the cursor. As to this, FIG. 4 depicts a representative rectangular region of a window or hypermedia object in a window. In this example, the presence of the cursor in the window can be determined by a condition test made on the coordinates of the cursors position, for example with respect to the situation depicted in FIG. 4 such a conditional test can be structured as:

If [ $(500 \leq x \leq 800)$ && $(300 \leq y \leq 700)$ ],     then ["Active Action"],
                                                       else ["Inactive Action"];

Note that when both the "x" and "y" coordinates are within the range defined by the conditional test, contact with the window is subsequently defined.

This form of conditional test thus comprises effectively the entirety of what is required to operate the rollover object and to pre-activate or deactivate a menu items in the aforementioned example menu object. Note that when both the "x" and "y" coordinates are within the range defined by the conditional test, contact with a "hotspot" comprising the geometric scope of the hyperobject is subsequently defined.

The hyperlink, button, menu item, and some slider operation modes require additional inclusion of a click event:

If [ $(500 \leq x \leq 800)$ && $(300 \leq y \leq 700)$ &&
   ("ClickEvent" = TRUE)],
      then ["Active Action"],
      else ["Inactive Action"];

The same menu item and slider operation modes require additional inclusion of a click-and-drag event which combines the above with additional conditional tests.

Hyperlink Object

By long-accepted definition and convention, the traditional hyperlink object described requires the cursor to be located on or sufficiently near the visually rendered hyperlink element and a subsequent click event to activate. Typically the traditional hyperlink object also provides some visible responsive indication of its operation by the pointer device. Activation of the traditional hyperlink can change the currently displayed webpage or view to a new webpage or view, launch a pop-up window or a new window directed to a new webpage or view, launch a pop-up menu, or provide other operations.

Button Object

Figure 5:
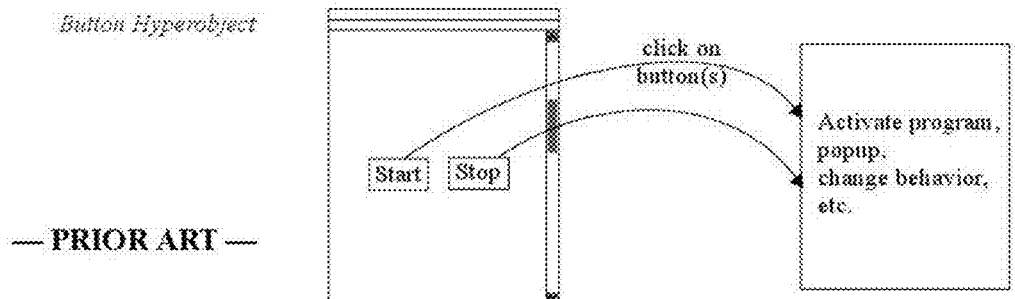
FIG. 5 depicts a pair of button objects and actions resulting from their operation.

A traditional hyperobject related to the hyperlink is the button object. The button is very similar in its operation to a graphical icon hyperlink, and can be used in the same manner, but in that it is typically graphically rendered to resemble a physically-operated "control panel" pushbutton it is most often employed in panel control functions such as an "Enter" function, data entry functions, mode control functions, start/stop/pause functions, etc. FIG. 5 depicts a pair of representative button objects and actions resulting from their operation.

Rollover Object

Figure 6:
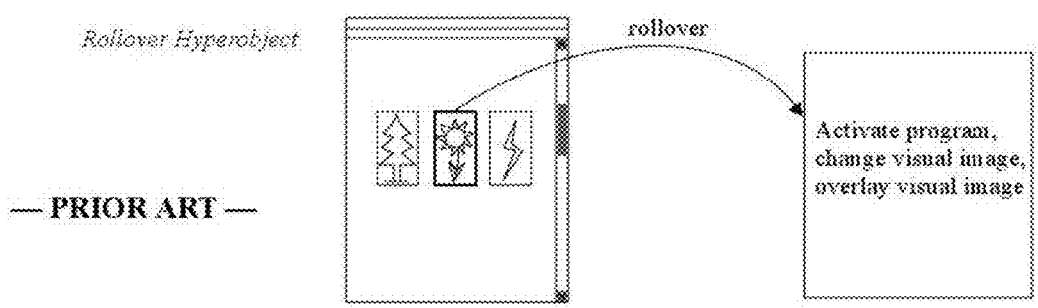
FIG. 6 depicts a rollover object and actions resulting from its operation.

Another traditional hyperobject arguably related to the hyperlink is the rollover object. The rollover object typically offers the same range of actions as a button or hyperlink but only requires the cursor to be located on or sufficiently near the visually rendered hyperlink element to activate (i.e., no subsequent click event is used). Because the rollover object is so readily activated by causal movement of the cursor, the rollover object typically performs rapidly reversible operations such as simply changing its visual representation (for example, changing from one image or graphic to another image or graphic). In some cases, a rollover function and a hyperlink function can be combined so as to allow a rollover event to invoke a rapidly reversible operation and a click event to invoke a more action resulting in more significant actions (such as changing the currently displayed webpage or view to a new webpage or view, launch a pop-up window or a new window directed to a new webpage or view, etc.). FIG. 6 depicts a representative rollover object and actions resulting from its operation.

Menu Object

Figure 7:
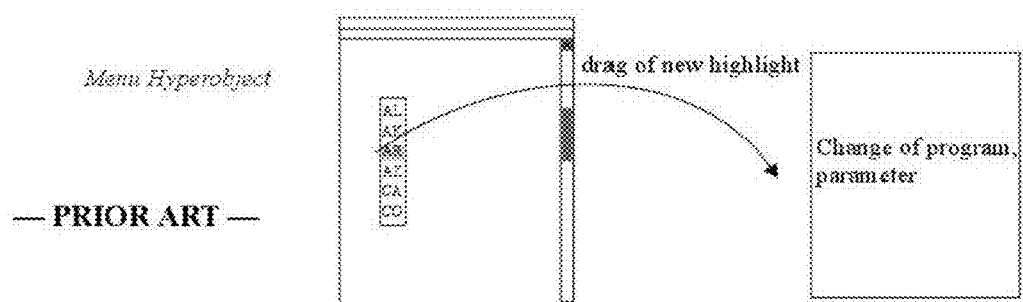
FIG. 7 depicts a menu object and actions resulting from its operation.

Yet another traditional hyperobject related to the hyperlink, button, and rollover is the menu object. In practice there are a wide range of types of menus and operational procedures for them; here only a representative example is considered. The menu usually pops up as a result of the operation of a button or rollover object. Once the menu is displayed, moving the cursor over the individual menu items causes some sort of visual indication of pre-activation. A click caused a pre-activated individual menu item to act as if it were a button. FIG. 7 depicts a representative menu object of the type described in this example (mindful as is one skilled in the art that other types of menu operations are known) and actions resulting from its operation.

Sliders

Figure 8:
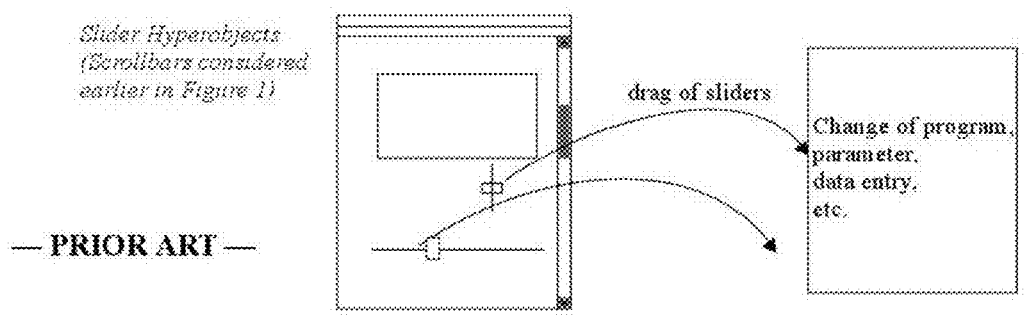
FIG. 8 depicts a pair of slider objects and actions resulting from their operation.

A somewhat more complicated traditional hyperobject is the slider, typically comprising a visually-displayed "knob" and a typically linear path for which it is permitted to "travel," said travel responsive to input from a user input device. Although exceptions can be found and/or contrived, a slider is usually employed to set or change the value of a particular variable in an application program from within a range comprising many possible values. For example, a slider can be used as an audio volume control, selecting from any of a number of possible volume values available, for example where the number of possible volume values available could typically be 16 to 128. In another application, the slider can be used to set the zoom-level on a map viewer. When the number of possible values available is small, the function provided by the traditional slider object can alternatively be implemented by a traditional menu object. The value of the slider object stands forth when the number of possible values available is large (making operation of a traditional menu object unwieldy) or the metaphor and/or persistent visual geometric indication of the selected value is desired. In a typical implementation, the slider button is clicked on and its position is dragged in either direction along a one-dimensional travel path. In some embodiments the mere change in the slider "knob" position is sufficient to change the value of a selected variable from one value in a range comprising many possible values to another such value in the range. In other embodiments the click operation must be released in order to change the value of a selected variable from one value in a range comprising many possible values to another such value. Many other types of slider implementations are apparent to one skilled in the art. FIG. 8 depicts a pair of representative slider objects and actions resulting from their operation.

Noted extensions to the above characterization of sliders are typically made for scrollbar sliders (on edges of windows) and zoom sliders (employed in some applications such as map and image viewers). For example, once a window or frame of within a window that includes a vertical scrollbar is selected, the scrollwheel provided by a contemporary computer mouse is solely directed to the operation of the vertical scrollbar slider (for example, the scrollbar 110.*vs* of FIG. 1) as long as that window or frame of within a window remains selected. As another example, once a window or frame of within a window that includes a zoom slider is selected, the scrollwheel provided by a contemporary computer mouse is solely directed to the operation of the zoom slider as long as that window or frame of within a window remains selected. Many variations are possible for managing scrollwheel assignments when both scrolling and zoom functions are available:

In some map and image viewer applications both scrollbar sliders and a zoom slider are provided, for example versions of Google Maps which provide a map image frame and a side-area frame, wherein the scrollwheel controls the zoom slider when the image frame is selected and the vertical scrollbar slider when the side-area frame is selected.

In other map and image viewer applications only either scrollbar sliders or a zoom slider is provided, wherein the scrollwheel is directed to one of these while other provisions can be provide for the other (for example, the scrollwheel is directed to the zoom slider and click-and-drag actions on the image are used to implement a scroll function in lieu of scrollbar sliders).

In other map and image viewer applications, neither scrollbar sliders and zoom sliders are provided (for example, the scrollwheel is directed to the zoom function even though no slider is displayed, and click-and-drag actions on the image are used to implement a scroll function in lieu of scrollbar sliders).

Comparison

FIG. 9 provides a summary table of some of the attributes of the example traditional hyperobjects described and considered thus far. The examples described, and the further simplifications made in order to display in the table, are only meant to be representative and are hardly comprehensive as is clear to one skilled in the art.

Note in the traditional hyperobjects described and considered thus far, as well as the many variations and alternatives known by one skilled in the art, virtually all rely on the following user-input driven from a conventional pointing device for their operation:

Location of the cursor;

Click/release events.

Traditional User Interface Pointing Devices

Turning now to traditional user interface pointing devices, the traditional mouse, traditional trackball, and traditional touchpad, and traditional touchscreen typically are used to provide the following user inputs:

| User Input Type | Traditional Mouse | Traditional Trackball | Traditional Touchpad or Touchscreen |
| --- | --- | --- | --- |
| Cursor "X" position | Left-right position of housing | Left-right rotation of trackball | Left-right position of finger/stylus |
| Cursor "Y" position | Forward-back position of housing | Forward-back rotation of trackball | Left-right position of finger/stylus |
| Left click | Left button | Left button | Left button and/or tap |
| Right click | Right button | Right button | Right button |
| Double (left) click | Double operation of Left button | Double operation of Left button | Double operation of Left button and/or double-tap |

Contemporary Generation User Interface Pointing Devices

More contemporary computer mice additionally provide a scrollwheel along with the traditional components and features of the traditional mouse. Some scrollwheels allow the wheel to be depressed downward to operate a spring-loaded switch that provides a third class of button events. As mentioned just above, typically the scrollwheel provided by a contemporary computer mouse is solely directed to the operation of the vertical scrollbar (for example, the scrollbar 110.vs of FIG. 1), if displayed, of the currently selected window. More recently, computer mice providing "2-way scrolling" (sometimes called "4-way scrolling") features wherein the scrollwheel, in addition to conventional forward-back rotation, can be tilted left or right with the resulting signal directed to the control the horizontal scrollbar (for example, the scrollbar 110.hs of FIG. 1), if displayed, of the currently selected window.

Providing an additional scroll control to a scrollwheel mouse that can be used to operate the horizontal scrollbar with a left-right operation was taught several years prior to the appearance of such products in the specification of issued U.S. Pat. No. 7,557,797 (priority date Feb. 12, 2004) and is to be addressed in a pending continuation patent application from that specification subject to that same priority date.

Additionally, touch screens have recently received tremendous attention with the addition of array tactile imaging capabilities. Such touch screen technologies permit multi-touch sensing, metaphors, and gestures. Although such touch screen technologies have obtained great commercial success from there defining role in the iPhone and subsequent adaptations in PDAs and other types of cell phones and hand-held devices, these were in fact taught in the 1999 filings of U.S. Pat. No. 6,570,078 and pending U.S. patent application Ser. No. 11/761,978.

These more advanced user interface pointing devices provide additional user control capabilities that can be used in hypermedia applications, and in particular in web-based applications rendered in a browser. A known example of this is the aforementioned use of the scrollwheel in controlling the degree of zoom in the web-based Google Maps application.

Further, there remains a wide range of additional control capabilities that can be provided by further enhanced user interface technologies. A number of representative enhanced user interface technologies are described next, specifically:

(a) the HDTP taught in the 1999 filings of U.S. Pat. No. 6,570,078 and pending U.S. patent application Ser. No. 11/761,978, pending U.S. patent application Ser. Nos. 12/418,605, 12/502,230, 12/541,948, and related pending U.S. patent applications; and (b) the Advanced Mice taught in the 2004 filings of issued U.S. Pat. No. 7,557,797 and related pending U.S. patent applications such as Ser. Nos. 12/619,678, 13/025,129, 13/024,569. The capabilities of these, or to a more limited extent, the capabilities of contemporary generation user interface pointing devices can be used to enhance the capabilities of traditional hypermedia objects (such as the hyperlink, button, rollover, menu, and slider) as well as defining new types of hypermedia objects.

HDTP User Interface Technology

In an embodiment, a touchpad used as a pointing and data entry device can comprise an array of sensors. The array of sensors is used to create a tactile image of a type associated with the type of sensor and method of contact by the human hand. The tactile image comprises and array of data elements such as an array of pressure measurements, and array of proximity measurements, an array of reflective optical measurements, etc. Thus the tactile image can be or comprise a pressure image, proximity image, reflective optical image, etc. In an embodiment, each data element comprises a scalar numerical value corresponding to a measurement from an associated sensor. In another embodiment, at least one data element comprises a plurality of scalar numerical values. In an embodiment, each data element comprises one or more scalar values produced from signal processing, image processing, and/or other operations applied to measurements provided by an array of sensors.

In one embodiment, the individual sensors in the sensor array are pressure sensors and a direct pressure-sensing tactile image is generated by the sensor array.

In another embodiment, the individual sensors in the sensor array are proximity sensors and a direct proximity tactile image is generated by the sensor array. Since the contacting surfaces of the finger or hand tissue contacting a surface typically increasingly deforms as pressure is applied, the sensor array comprised of proximity sensors also provides an indirect pressure-sensing tactile image.

In another embodiment, the individual sensors in the sensor array can be optical sensors. In one variation of this, an optical image is generated and an indirect proximity tactile image is generated by the sensor array. In another variation, the optical image can be observed through a transparent or translucent rigid material and, as the contacting surfaces of the finger or hand tissue contacting a surface typically increasingly deforms as pressure is applied, the optical sensor array also provides an indirect pressure-sensing tactile image.

In some embodiments, the array of sensors can be transparent or translucent and can be provided with an underlying visual display element such as an alphanumeric and/or graphics and/or image display. The underlying visual display can comprise, for example, an LED array display, a backlit LCD, etc. Such an underlying display can be used to render geometric boundaries or labels for soft-key functionality implemented with the tactile sensor array, to display status information, etc.

In an embodiment, the touchpad can comprise a tactile sensor array obtains or provides individual measurements in every enabled cell in the sensor array that provides these as numerical values. The numerical values can be communicated in a numerical data array, as a sequential data stream, or in other ways. When regarded as a numerical data array with row and column ordering that can be associated with the geometric layout of the individual cells of the sensor array, the numerical data array can be regarded as representing a tactile image.

The tactile sensor array should not be confused with the "null/contact" touchpad which, in normal operation, acts as a pair of orthogonally responsive potentiometers. These "null/contact" touchpads do not produce pressure images, proximity images, or other image data but rather, in normal operation, two voltages linearly corresponding to the location of a left-right edge and forward-back edge of a single area of contact. Such "null/contact" touchpads, which are universally found in existing laptop computers, are discussed and differentiated from tactile sensor arrays in issued U.S. Pat. No. 6,570,078 and pending U.S. patent application Ser. No. 11/761,978 (pre-grant publication U.S. 2007/0229477). Before leaving this topic, it is pointed out that these the "null/contact" touchpads nonetheless can be inexpensively adapted with simple analog electronics to provide at least primitive multi-touch capabilities as taught in U.S.

Pat. No. 6,570,078 and pending U.S. patent application Ser. No. 11/761,978 (therein, paragraphs [0022]-[0029] of its pre-grant publication U.S. 2007/0229477, for example).

One implementation of a tactile sensor array is a pressure sensor array. Pressure sensor arrays discussed in U.S. Pat. No. 6,570,078 and pending U.S. patent application Ser. No. 11/761,978. These typically operate by measuring changes in electrical (resistive, capacitive) or optical properties of an elastic material as the material is compressed. Prominent manufacturers and suppliers of pressure sensor arrays include Tekscan, Inc. (307 West First Street., South Boston, Mass., 02127, www.tekscan.com), Pressure Profile Systems (5757 Century Boulevard, Suite 600, Los Angeles, Calif. 90045, www.pressureprofile.com), Sensor Products, Inc. (300 Madison Avenue, Madison, N.J. 07940 USA, www.sensorprod.com), and Xsensor Technology Corporation (Suite 111, 319-2nd Ave SW, Calgary, Alberta T2P 0C5, Canada, www.xsensor.com).

In lieu of a pressure sensor array, a proximity sensor array or effective equivalents (for example, as can be accomplished with a video camera as described in issued U.S. Pat. No. 6,570,078 and pending U.S. patent application Ser. No. 11/761,978) can be used as a tactile sensor array. In general, a tactile proximity sensor array suitable for use with the present invention can be implemented in a wide variety of ways using any number of techniques or physical effects. The only requirement is that the tactile proximity sensor array produce a multi-level gradient measurement image as a finger, part of hand, or other pliable object varies is proximity in the immediate area of the sensor surface.

Figure 10:
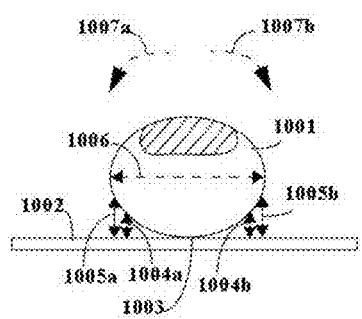
FIG. 10 illustrates the side view of a finger lightly touching the surface of a tactile sensor array.

More specifically, FIG. 10 illustrates a representative side view of a finger 1001 lightly touching the surface 1002 of a tactile sensor array. In this example, the finger 1001 contacts the tactile sensor surface in a relatively small area 1003. In this situation, on either side the finger curves away from the region of contact 1003, where the non-contacting yet proximate portions of the finger grow increasingly far 1004a, 1005a, 1004b, 1005b from the surface of the sensor 1002. These variations in physical proximity of portions of the finger with respect to the sensor surface should cause each sensor element in the tactile proximity sensor array to provide a corresponding proximity measurement varying responsively to the proximity, separation distance, etc. The tactile proximity sensor array advantageously comprises enough spatial resolution to provide a plurality of sensors within the area occupied by the finger (for example, the area comprising width 1006). In this case, as the finger is pressed down, the region of contact 1003 grows as the more and more of the pliable surface of the finger conforms to the tactile sensor array surface 1002, and the distances 1004a, 1005a, 1004b, 1005b contract. If the finger is tilted, for example by rolling in the user viewpoint counterclockwise (which in the depicted end-of-finger viewpoint clockwise 1007a) the separation distances on one side of the finger 1004a, 1005a will contract while the separation distances on one side of the finger 1004b, 1005b will lengthen. Similarly if the finger is tilted, for example by rolling in the user viewpoint clockwise (which in the depicted end-of-finger viewpoint counterclockwise 1007b) the separation distances on the side of the finger 1004b, 1005b will contract while the separation distances on the side of the finger 1004a, 1005a will lengthen.

Figure 11:
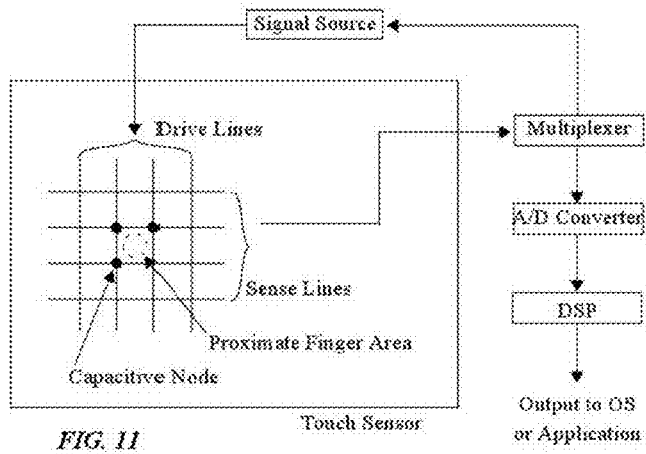
FIG. 11 depicts a popularly accepted model of a typical cell phone or PDA capacitive proximity sensor implementation.

Capacitive proximity sensors can be used in various handheld devices with touch interfaces (see for example, among many, http://electronics.howstuffworks.com/iphone2.htm, http://www.veritasetvisus.com/VVTP-12,%20Walker.pdf). Prominent manufacturers and suppliers include Balda A G (Bergkirchener Str. 228, 32549 Bad Oeynhausen, Del., www.balda.de), Cypress (198 Champion Ct., San Jose, Calif. 95134, www.cypress.com), and Synaptics (2381 Bering Dr., San Jose, Calif. 95131, www.synaptics.com). In these sensors, the region of finger contact is detected by variations in localized capacitance resulting from capacitive proximity effects induced by a nearly-adjacent finger. More specifically, the electrical field at the intersection of orthogonally-aligned conductive buses is influenced by the vertical distance or gap between the surface of the sensor array and the skin surface of the finger. The capacitive proximity sensor technology is low-cost, reliable, long-life, stable, and can readily be made transparent. FIG. 11 (adapted from http://www.veritasetvisus.com/VVTP-12,%20Walker.pdf with slightly more functional detail added) shows a popularly accepted model of a typical cell phone or PDA capacitive proximity sensor implementation. In some embodiments the present invention can use the same spatial resolution as current capacitive proximity touchscreen sensor arrays. In other embodiments of the present invention, a higher spatial resolution is advantageous. For example, in many contemporary capacitive proximity sensors, the touch of a fingertip can be comprised within the physical dimensions of one sensor element or one sensor-separation spacing. In higher resolution implementations, the touch of a fingertip can span the physical dimensions of many sensor elements and sensor-separation spacing, for example as in the higher resolution example depicted in (soon to be discussed) FIGS. 12a-12b.

As a first example of an optical array sensor, Forrest M. Mims is credited as showing that a conventional LED can be used as a light detector as well as a light emitter. Recently, light-emitting diodes have been used as a tactile proximity sensor array (for example, as depicted in the video available at http://cs.nyu.edu/~jhan/ledtouch/index.html). Such tactile proximity array implementations typically need to be operated in a darkened environment (as seen in the video in the above web link). In one embodiment provided for by the invention, each LED in an array of LEDs can be used as a photodetector as well as a light emitter, although a single LED can either transmit or receive information at one time. Each LED in the array can sequentially be selected to be set to be in receiving mode while others adjacent to it are placed in light emitting mode. A particular LED in receiving mode can pick up reflected light from the finger, provided by said neighboring illuminating-mode LEDs. The invention provides for additional systems and methods for not requiring darkness in the user environment in order to operate an LED array as a tactile proximity sensor. In one embodiment, potential interference from ambient light in the surrounding user environment can be limited by using an opaque pliable and/or elastically deformable surface covering the LED array that is appropriately reflective (directionally, amorphously, etc. as can be advantageous in a particular design) on the side facing the LED array. Such a system and method can be readily implemented in a wide variety of ways as is clear to one skilled in the art. In another embodiment, potential interference from ambient light in the surrounding user environment can be limited by employing amplitude, phase, or pulse width modulated circuitry and/or software to control the underlying light emission and receiving process. For example, in an implementation the LED array can be configured to emit modulated light modulated at a particular carrier frequency or variation waveform and respond to only modulated light signal components extracted from the received light signals comprising that same carrier frequency or variation waveform. Such a system and method can be readily implemented in a wide variety of ways as is clear to one skilled in the art.

As a second example of an optical array sensor, use of video cameras for gathering control information from the human hand in various ways is discussed in U.S. Pat. No. 6,570,078 and Pending U.S. patent application Ser. No. 11/761,978. In another video camera tactile controller embodiment, a flat or curved translucent panel can be used as sensor surface. When a finger is placed on the translucent panel, light applied to the opposite side of the translucent panel reflects light in a distinctly different manner than in other regions where there is no finger or other tactile contact. The image captured by an associated video camera will provide gradient information responsive to the contact and proximity of the finger with respect to the surface of the translucent panel. For example, the parts of the finger that are in contact with the surface will provide the greatest degree of reflection while parts of the finger that curve away from the surface of the sensor provide less reflection of the light. Gradients of the reflected light captured by the video camera can be arranged to produce a gradient image that appears similar to the multilevel quantized image captured by a pressure sensor. By comparing changes in gradient, changes in the position of the finger and pressure applied by the finger can be detected.

In many various embodiments, the tactile sensor array can be connected to interface hardware that sends numerical data responsive to tactile information captured by the tactile sensor array to a processor. In various embodiments, this processor will process the data captured by the tactile sensor array and transform it various ways, for example into a collection of simplified data, or into a sequence of tactile image "frames" (this sequence akin to a video stream), or into highly refined information responsive to the position and movement of one or more fingers and/or other parts of the hand.

Figure 12A:
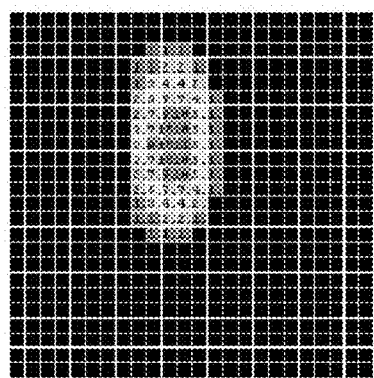
FIG. 12a is a graphical representation of a tactile image produced by contact of a human finger on a tactile sensor array.
Figure 12B:
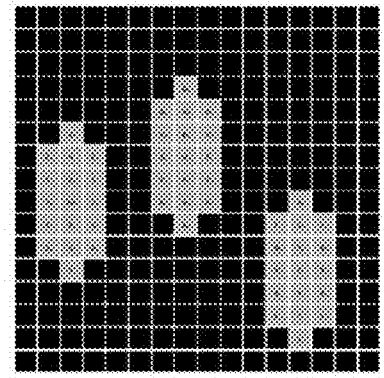

As to further representative detail of the latter example, a "frame" can refer to a 2-dimensional list comprising a number of rows and a number of columns forming an array, the array comprising tactile measurement value(s) for every sensor in a tactile sensor array at a given instance. In an embodiment, each data element comprises a scalar numerical value corresponding to a measurement from an associated sensor. In another embodiment, at least one data element comprises a plurality of scalar numerical values. In an embodiment, each data element comprises one or more scalar values produced from signal processing, image processing, and/or other operations applied to measurements provided by an array of sensors. The time interval between one frame and the next one depends on the frame rate of the system and the number of frames in a unit time (usually frames per second). FIG. 12a is a graphical representation of a tactile image produced by contact with the bottom surface of the most outward section (between the end of the finger and the most nearby joint) of a human finger on a tactile sensor array. In this example tactile array, there are 24 rows and 24 columns; other realizations can have significantly more (hundreds or thousands) of rows and columns. Tactile measurement values of each cell are indicated by the numbers and shading in each cell. Darker cells represent cells with higher tactile measurement values. Similarly, FIG. 12b provides a graphical representation of an example tactile image produced by contact with multiple human fingers on a tactile sensor array. In other embodiments, there can be a larger or smaller number of pixels for a given images size, resulting in varying resolution. Additionally, there can be larger or smaller area with respect to the image size resulting in a greater or lesser potential measurement area for the region of contact to be located in or move about. (Note the sensor array of FIG. 11 has less spatial resolution than that associated with FIG. 12b, which in turn has less spatial resolution than that associated with FIG. 12a.

Individual sensor elements in a tactile sensor array can vary sensor-by-sensor when presented with the same stimulus. The invention provides for each sensor to be individually calibrated in implementations where that can be advantageous. Sensor-by-sensor measurement value scaling, offset, and/or nonlinear warpings can be invoked for all or selected sensor elements during data acquisition scans. Similarly, the invention provides for individual noisy or defective sensors to be tagged for omission of their flawed measurements during data acquisition scans and/or post-scan data processing.

Figure 13:
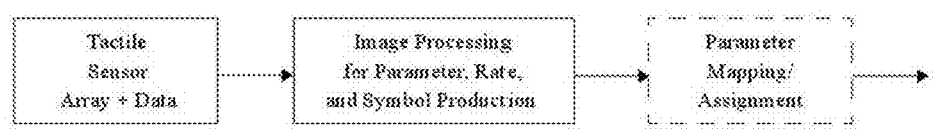
FIG. 13 depicts a signal flow in an HDTP implementation.

FIG. 13 depicts an example realization wherein a tactile sensor array is provided with real-time or near-real-time data acquisition capabilities. The captured data reflects spatially distributed tactile measurements (such as pressure, proximity, etc.). The tactile sensory array and data acquisition stage provides this real-time or near-real-time tactile measurement data to a specialized image processing arrangement for the production of parameters, rates of change of those parameters, and symbols responsive to aspects of the hand's relationship with the tactile or other type of sensor array. In some applications, these measurements can be used directly. In other situations, the real-time or near-real-time derived parameters can be directed to mathematical mappings (such as scaling, offset, and/or nonlinear warpings) in real-time or near-real-time into real-time or near-real-time application-specific parameters or other representations useful for applications. In some embodiments, general purpose outputs can be assigned to variables defined or expected by the application.

Figure 14A:
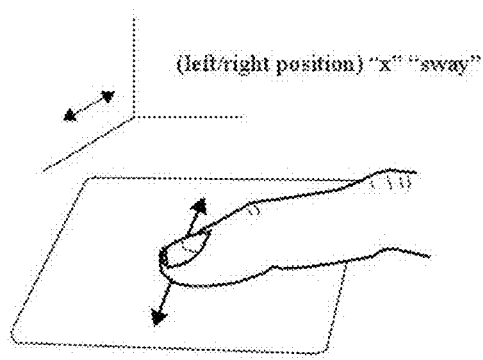
FIGS. 14a-14f illustrate the six independently adjustable degrees of freedom of touch from a single finger that can be simultaneously measured by the HDTP technology.
Figure 14D:
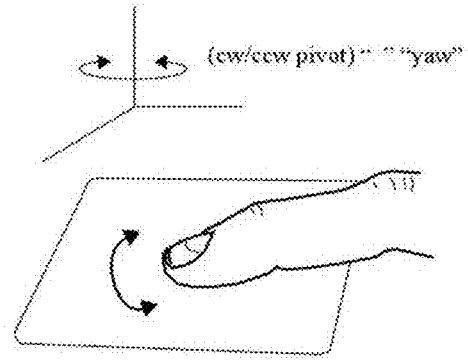
Figure 14B:
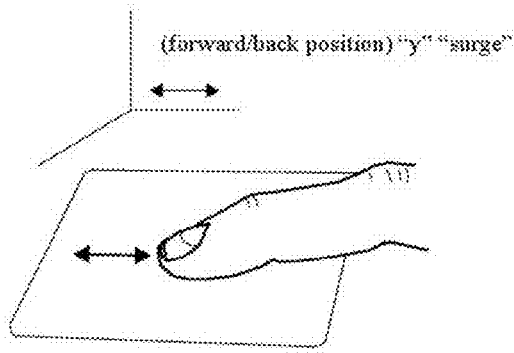
Figure 14E:
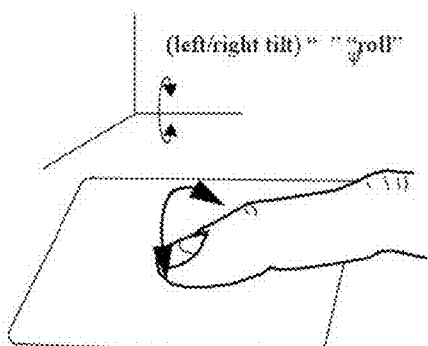
Figure 14C:
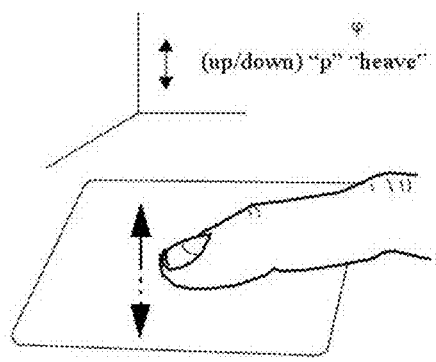
Figure 14F:
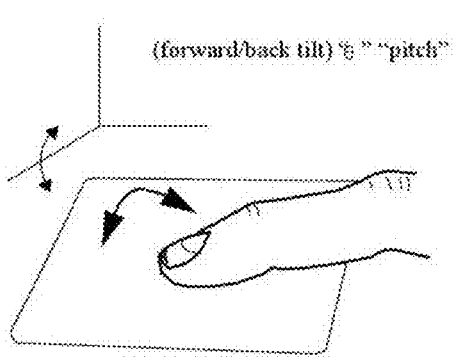

FIGS. 14a-14f illustrate the six independently adjustable degrees of freedom of touch from a single finger that can be simultaneously measured by the HDTP technology. The depiction in these figures is from the side of the touchpad. FIGS. 14a-14c show actions of positional change (amounting to applied pressure in the case of FIG. 14c) while FIGS. 14d-14f show actions of angular change. Each of these can be used to control a user interface parameter, allowing the touch of a single fingertip to control up to six simultaneously-adjustable quantities in an interactive user interface. In more detail:

FIG. 14a depicts variation of the left/right position ("x") of the finger contact;

FIG. 14b depicts variation of the forward/back position ("y") of the finger contact;

FIG. 14c depicts variation of the up/down position or downward pressure ("p") of the finger contact;

FIG. 14d depicts variation of the clockwise/counterclockwise (yaw) angle ("ψ") of the finger contact;

FIG. 14e depicts variation of the left/right tilt (roll) angle ("φ") of the finger contact;

FIG. 14f depicts variation of the forward/back (pitch) angle ("θ") of the finger contact.

FIG. 15 suggests general ways in which two or more of these independently adjustable degrees of freedom adjusted at once with a single finger 1500:

left/right position ("x") of the finger contact 1511;

forward/back position ("y") of the finger contact 1512;

up/down position or downward pressure ("p") of the finger contact 1516;

clockwise/counterclockwise (yaw) angle ("ψ") of the finger contact 1515;

left/right tilt (roll) angle ("φ") of the finger contact 1513; forward/back (pitch) angle ("θ") of the finger contact 1514.

More advanced implementations of the HDTP provide for multi-touch capabilities that can be far more sophisticated that those popularized by the Apple iPhone, NYU, and others.

FIG. 16 demonstrates a few representative two-finger multi-touch postures and/or gestures from the hundreds that can be readily recognized by HDTP technology. HDTP technology can also be configured to recognize and measure postures and/or gestures involving three or more fingers, various parts of the hand, the entire hand, multiple hands, etc., as taught for example in U.S. Pat. No. 6,570,078 and pending U.S. patent application Ser. Nos. 11/761,978 and 12/418,605.

Figure 17:
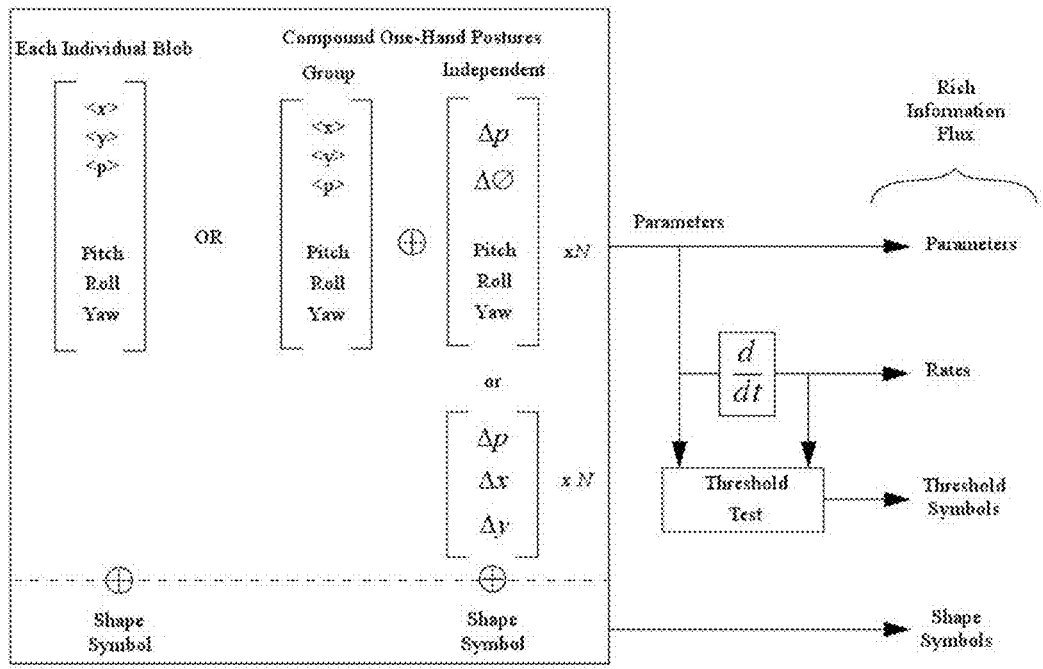
FIG. 17 shows an example of how raw measurements of the six quantities of FIGS. 14a-14f, together with shape recognition for distinguishing contact with various parts of the hand and the touchpad, can be used to create a rich information flux of parameters, rates, and symbols.

FIG. 17 shows an example of how raw measurements of the six quantities of FIGS. 14*a*-14*f,* together with shape recognition for distinguishing contact with various parts of the hand and the touchpad, can be used to create a rich information flux of parameters, rates, and symbols, as taught for example in U.S. Pat. No. 6,570,078 and pending U.S. patent application Ser. Nos. 11/761,978 and 12/418,605.

Figure 18:
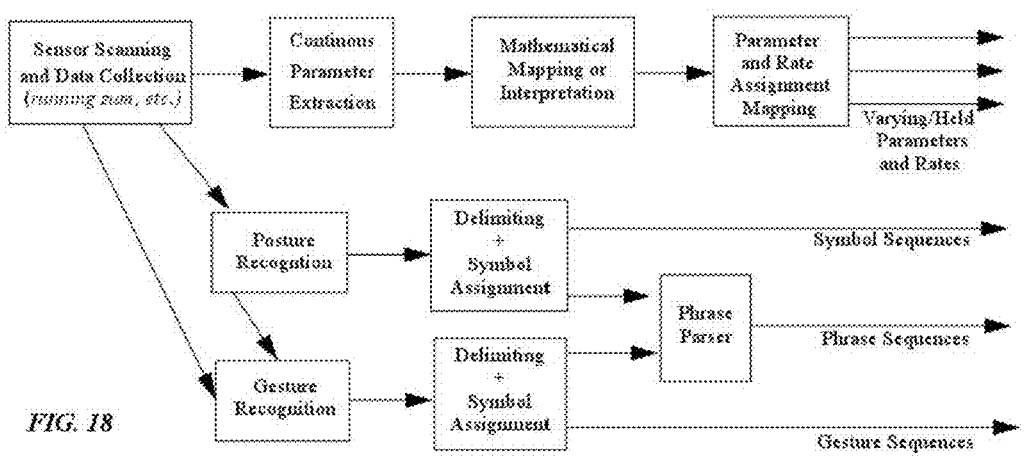
FIG. 18 shows an approach for incorporating posture recognition, gesture recognition, and other functions to create a rich human/machine tactile interface system capable of additionally supporting or incorporating syntax and grammars.

FIG. 18 shows a representative approach for incorporating posture recognition, gesture recognition, state machines, and parsers to create an even richer human/machine tactile interface system capable of incorporating syntax and grammars, as taught for example in U.S. Pat. No. 6,570,078 and pending U.S. patent application Ser. Nos. 11/761,978 and 12/418,605.

Figure 19A:
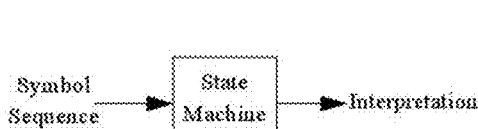
FIGS. 19a-19d depict operations acting on various parameters, rates, and symbols to produce other parameters, rates, and symbols, including operations such as sample/hold, interpretation, context, etc.
Figure 19B:
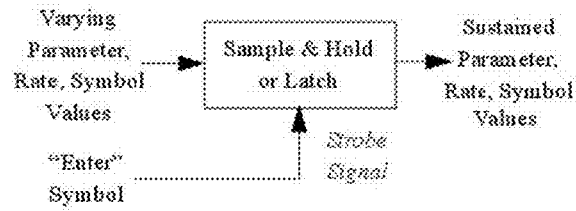
Figure 19C:
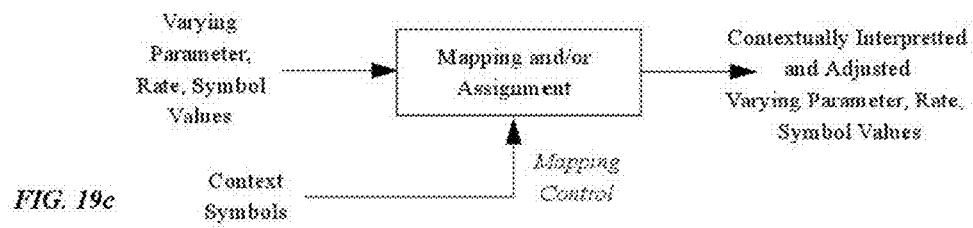
Figure 19D:
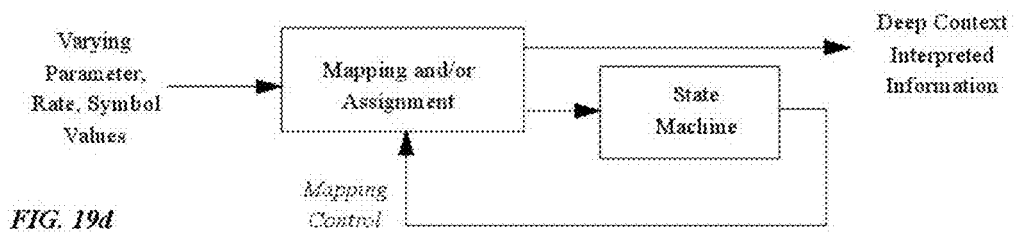

The HDTP affords and provides for yet further capabilities. For example, sequence of symbols can be directed to a state machine, as shown in FIG. 19*a,* to produce other symbols that serve as interpretations of one or more possible symbol sequences. In an embodiment, one or more symbols can be designated the meaning of an "Enter" key, permitting for sampling one or more varying parameter, rate, and/or symbol values and holding the value(s) until, for example, another "Enter" event, thus producing sustained values as illustrated in FIG. 19*b.* In an embodiment, one or more symbols can be designated as setting a context for interpretation or operation and thus control mapping and/or assignment operations on parameter, rate, and/or symbol values as shown in FIG. 19*c.* The operations associated with FIGS. 19*a*-19*c* can be combined to provide yet other capabilities. For example, the example arrangement of FIG. 19*d* shows mapping and/or assignment operations that feed an interpretation state machine which in turn controls mapping and/or assignment operations. In implementations where context is involved, such as in arrangements such as those depicted in FIGS. 19*b*-19*d,* the invention provides for both context-oriented and context-free production of parameter, rate, and symbol values. The parallel production of context-oriented and context-free values can be useful to drive multiple applications simultaneously, for data recording, diagnostics, user feedback, and a wide range of other uses.

Figure 20:
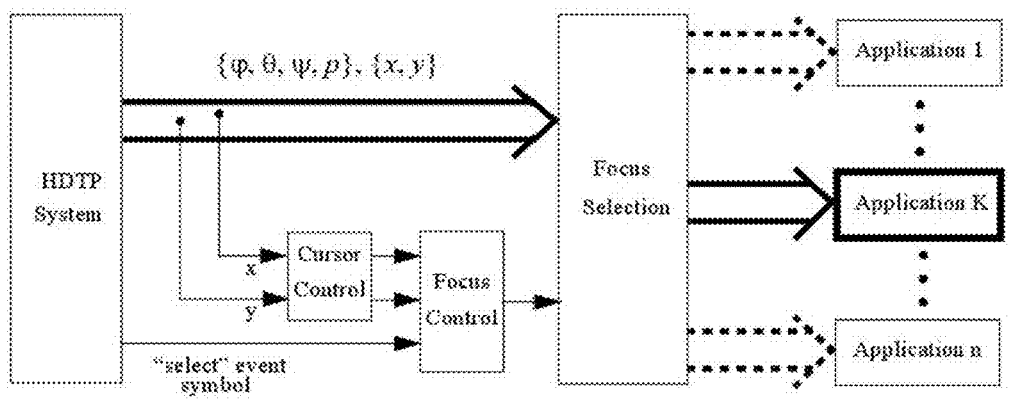
FIG. 20 depicts a user interface input arrangement incorporating one or more HDTPs that provides user interface input event and quantity routing for focus control.

FIG. 20 depicts a representative user arrangement incorporating one or more HDTP system(s) or subsystem(s) that provide(s) user interface input event and routing of HDTP produced parameter values, rate values, symbols, etc. to a variety of applications. In an embodiment, these parameter values, rate values, symbols, etc. can be produced for example by utilizing one or more of the individual systems, individual methods, and/or individual signals described above in conjunction with the discussion of FIGS. 17, 18, and 19*a*-19*b.* As discussed later, such an approach can be used with other rich multiparameter user interface devices in place of the HDTP. An arrangement similar to that of FIG. 20 is also taught in pending U.S. patent application Ser. No. 12/502,230 "Control of Computer Window Systems, Computer Applications, and Web Applications via High Dimensional Touchpad User Interface" by Seung Lim, and FIG. 20 is adapted from FIG. 6e of that pending application (U.S. patent application Ser. No. 12/502,230) for further expansion here. Additional window manger input focus control for High Dimensional Touchpad (HDTP), Advanced Mice, and other multidimensional user interfaces are taught in pending U.S. patent application Ser. No. 13/026,097.

In an implementation approach or modality of operation for an arrangement such as the one of FIG. 20, the Focus Control element uses a selected subset of the information stream provided by the HDTP or other user interface device providing traditional user-adjustable inputs supplemented by additional user-adjustable inputs. The Focus Control element uses a selected subset of the information stream to interpret the user's intention for the direction of focus among several windows, applications, etc. The figure shows only applications, but some of these can be replaced with application child windows, operating system, background window, etc. In this example, focus may be controlled by an {x,y} location threshold test and a "select" symbol event, although other information may be used in its place.

In an arrangement such as the one of FIG. 20, or in other implementations, at least two parameters are used for navigation of the cursor when the overall interactive user interface system is in a mode recognizing input from cursor control. These can be, for example, the left-right ("x") parameter and forward/back ("y") parameter provided by the touchpad. The arrangement of FIG. 20 includes a representative implementation of this.

Alternatively, these two cursor-control parameters can be provided by another user interface device, for example another touchpad or a separate or attached mouse (the latter to be discussed shortly in the context of FIGS. 22*a*-22*e*).

In some situations, control of the cursor location can be implemented by more complex means. One example of this is the control of location of a 3D cursor wherein a third parameter must be employed to specify the depth coordinate of the cursor location. For such situations, the arrangement of FIG. 20 would be modified to include a third parameter (for use in specifying this depth coordinate) in addition to the left-right ("x") parameter and forward/back ("y") parameter described earlier.

In an embodiment, focus control is used to interactively routing user interface signals among applications. In most current systems, there is at least some modality wherein the focus is determined by either the current cursor location or a previous cursor location when a selection event was made. In the user experience, this selection event typically involves the user interface providing an event symbol of some type (for example a mouse click, mouse double-click touchpad tap, touchpad double-tap, etc). The representative arrangement of FIG. 20 includes an implementation wherein a select event generated by the touchpad system is directed to the focus control element. The focus control element in this arrangement in turn controls a focus selection element that directs all or some of the broader information stream from the HDTP system to the currently selected application. (In FIG. 20, "Application K" has been selected as indicated by the thick-lined box and information-flow arrows.)

In some embodiments, each application that is a candidate for focus selection provides a window displayed at least in part on the screen, or provides a window that can be deiconified from an icon tray or retrieved from beneath other windows that may be obfuscating it. In some embodiments, if the background window is selected, focus selection element that directs all or some of the broader information stream from the HDTP system to the operating system, window system, and/or features of the background window. In some embodiments, the background window can be in fact regarded as merely one of the applications shown in the right portion of the arrangement of FIG. 20. In other embodiments, the background window can be in fact regarded as being separate from the applications shown in the right portion of the arrangement of FIG. 20. In this case the routing of the broader information stream from the HDTP system to the operating system, window system, and/or features of the background window is not explicitly shown in FIG. 20.

Touchscreen and Other Embodiments of the HDTP

Figure 21A:
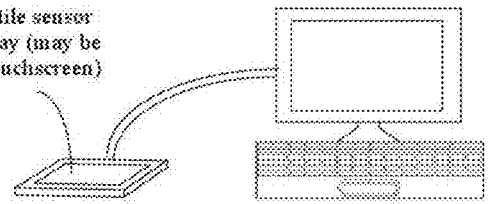
FIGS. 21a-21g depict a number of arrangements and embodiments employing HDTP technology.
Figure 21B:
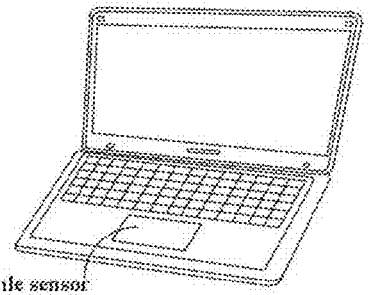
Figure 21C:
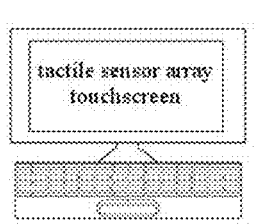
Figure 21D:
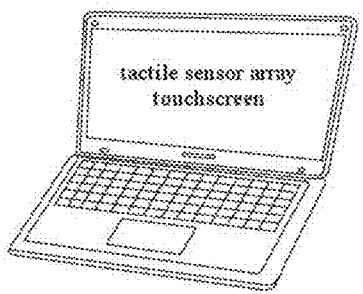

FIGS. 21a-21g and 22a-22e depict a number of representative arrangements and embodiments employing the HDTP technology. FIG. 21a illustrates a HDTP as a peripheral that can be used with a desktop computer (shown) or laptop not shown). FIG. 21b depicts an HDTP integrated into a laptop in place of the traditional touchpad pointing device. In FIGS. 21a-21b the HDTP tactile sensor can be a stand-alone component or can be integrated over a display so as to form a touchscreen. FIG. 21c depicts an HDTP integrated into a desktop computer display so as to form a touchscreen. FIG. 21d shows the HDTP integrated into a laptop computer display so as to form a touchscreen.

Figure 21E:
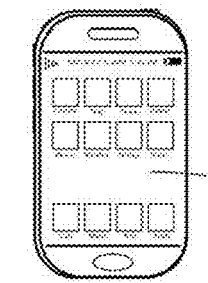
Figure 21F:
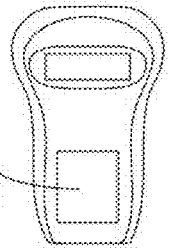

FIG. 21e depicts an HDTP integrated into a cell phone, smartphone, PDA, or other hand-held consumer device. FIG. 21f shows an HDTP integrated into a test instrument, portable service-tracking device, portable service-entry device, field instrument, or other hand-held industrial device. In FIGS. 21e-21f the HDTP tactile sensor can be a stand-alone component or can be integrated over a display so as to form a touchscreen.

Figure 21G:
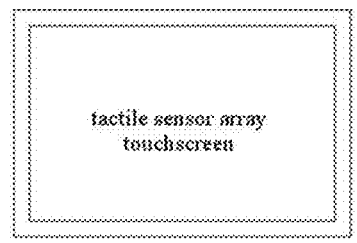
Figure 22A:
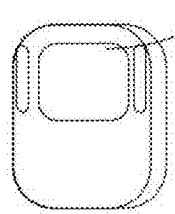
FIGS. 22a-22e depict various integrations of an HDTP into the back of a conventional computer mouse as taught in U.S. Pat. No. 7,557,797.
Figure 22B:
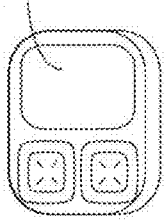
Figure 22C:
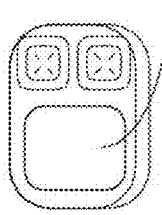
Figure 22D:
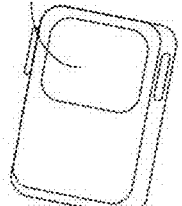
Figure 22E:
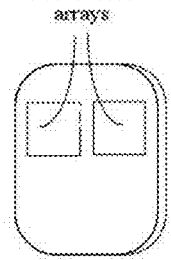

FIG. 21g depicts an HDTP touchscreen configuration that can be used in a tablet computer, wall-mount computer monitor, digital television, video conferencing screen, kiosk, etc.

In at least the arrangements of FIGS. 21a, 21c, 21d, and 21g, or other sufficiently large tactile sensor implementation of the HDTP, more than one hand can be used and individually recognized as such.

Embodiments Incorporating the HDTP into a Traditional or Contemporary Generation Mouse FIGS. 22a-22e depict various representative integrations of an HDTP into the back of a conventional computer mouse. In FIGS. 22a-22d the HDTP tactile sensor can be a stand-alone component or can be integrated over a display so as to form a touchscreen. Such configurations have very recently become popularized by the product release of Apple "Magic Mouse™" although such combinations of a mouse with a tactile sensor array on its back responsive to multi-touch and gestures were taught earlier in pending U.S. patent application Ser. No. 12/619,678 (priority date Feb. 12, 2004) entitled "User Interface Mouse with Touchpad Responsive to Gestures and Multi-Touch."

In another embodiment taught in the specification of issued U.S. Pat. No. 7,557,797 and associated pending continuation applications more than two touchpads can be included in the advance mouse embodiment, for example as suggested in the arrangement of FIG. 22e. As with the arrangements of FIGS. 22a-22d, one or more of the plurality of HDTP tactile sensors or exposed sensor areas of arrangements such as that of FIG. 22e can be integrated over a display so as to form a touchscreen.

Advanced Mice User Interface Technology

The HDTP in the above examples is used to supply more than the traditional two user interface parameters provided by a conventional user interface input device such as a conventional computer mouse, trackball, touchpad, etc. The present invention provides for the use of other user interface input arrangements and devices as alternatives to or in conjunction with one or more HDTPs. In this section the features and capabilities of Advanced Mice are briefly reviewed and set up for their use in embodiments of the invention. Focus control can be implemented in a manner completely or nearly analogous with FIG. 20, as well as other approaches (for example as will be presented later in the contexts of later FIGS. 27a-27d and FIGS. 30a-30b).

In a simple example, the scroll-wheel of a scroll-wheel mouse is used to provide a third simultaneously adjustable user interface parameter. In another example, a second or yet more additional scroll-wheels can be added to a conventional scroll-wheel mouse. The resultant collection of scroll-wheels can be relatively positioned in parallel, oriented at orthogonal angles so as to support a coordinate-metaphor, positioned on the sides of the mouse body, etc. FIGS. 23a and 23b illustrate examples of conventional scroll-wheel mouse provided with an added left-right scroll-wheel 2322 as taught in U.S. Pat. No. 7,557,797. Such arrangements can employ a connecting cable, or the device can be wireless.

In another example of Advanced Mice, one or more trackballs can be added to a conventional computer mouse. FIGS. 24a-24c illustrate examples where a single trackball is incorporated into the back of a conventional computer mouse as taught in U.S. Pat. No. 7,557,797. FIGS. 25a-25c illustrate examples where two trackballs are incorporated into the back of a conventional computer mouse as taught in U.S. Pat. No. 7,557,797. The trackballs in the arrangements of FIGS. 24a-24c and FIGS. 25a-25c can be the conventional two degree of freedom type (roll left-right, roll away-towards) or can provide three to six degrees of freedom as taught in U.S. Pat. No. 7,557,797; U.S. patent application Ser. No. 10/806,694. Such arrangements can employ a connecting cable, or the device can be wireless.

Another example Advanced Mice arrangement include the trackball/touchpad/mouse combinations of FIGS. 25c and 25d and the multiple slider configuration of FIG. 25e, each taught in U.S. Pat. No. 7,557,797. Other example Advanced Mice arrangements include those with two or more scroll wheels (for example as in pending U.S. patent application Ser. No. 13/024,569), a multiple-parameter joystick providing three or more simultaneously adjustable user interface inputs on the back of a mouse (for example as in pending U.S. patent application Ser. No. 13/025,129), and such a multiple-parameter joystick combined with a trackball (for example as also in pending U.S. patent application Ser. No. 13/025,129).

Each of these arrangements can employ a connecting cable, or the device can be wireless.

Video Control

Additionally, images of the human hand as captured by video cameras can be used as an enhanced multiple-parameter interface responsive to hand positions and gestures, for example as taught in pending U.S. patent application Ser. No. 10/683,915 and more specifically in paragraphs [314], [321]-[332], [411], [653], and (in view of paragraph [325]) also paragraphs [241]-[263] of that pending application's pre-grant publication U.S. 2004/0118268.

Example Use of the Additional Parameters by Applications

The types of human-machine geometric interaction between the hand and the HDTP facilitate many useful applications within a visualization environment. A few of these include control of visualization observation viewpoint location, orientation of the visualization, and controlling fixed or selectable ensembles of one or more of viewing parameters, visualization rendering parameters, pre-visualization operations parameters, data selection parameters, simulation control parameters, etc. As one example, the 6D orientation of a finger can be naturally associated with visualization observation viewpoint location and orientation, location and orientation of the visualization graphics, etc. As another example, the 6D orientation of a finger can be naturally associated with a vector field orientation for introducing synthetic measurements in a numerical simulation.

As yet another example, at least some aspects of the 6D orientation of a finger can be naturally associated with the orientation of a robotically positioned sensor providing actual measurement data. As another example, the 6D orientation of a finger can be naturally associated with an object location and orientation in a numerical simulation. As another example, the large number of interactive parameters can be abstractly associated with viewing parameters, visualization rendering parameters, pre-visualization operations parameters, data selection parameters, numeric simulation control parameters, etc.

In yet another example, the "x" and "y" parameters provided by the HDTP can be used for focus selection and the remaining parameters can be used to control parameters within a selected GUI.

In still another example, the "x" and "y" parameters provided by the HDTP can be regarded as a specifying a position within an underlying base plane and the roll and pitch angles can be regarded as a specifying a position within a superimposed parallel plane. In a first example extension of the previous two-plane example, the yaw angle can be regarded as the rotational angle between the base and superimposed planes. In a second example extension of the previous two-plane example, the finger pressure can be employed to determine the distance between the base and superimposed planes. In a variation of the previous two-plane example, the base and superimposed plane can not be fixed as parallel but rather intersect as an angle associated with the yaw angle of the finger. In the each of these, either or both of the two planes can represent an index or indexed data, a position, pair of parameters, etc. of a viewing aspect, visualization rendering aspect, pre-visualization operations, data selection, numeric simulation control, etc.

USB HID Device Abstraction

The USB HID device class provides an open interface useful for both traditional computer pointing devices such as the standard computer mouse and other user interface devices such as game controllers. The USB HID device class has also been used to interface with the Logitech 3DConnexion SpaceNavigator™. The USB HID device class is currently specified at the time of this patent application by at least the Device Class Definition for HID 1.11, currently available at http://www.usb.org/developers/devclass_docs/HID1_11.pdf. More generally, the invention provides for the USB HID device class to be used for at least additional user interface signals (user interface parameters) provided by the High Dimensional Touchpad (HTPD), Advanced Mice, and other multidimensional or rich parameter user interfaces that generate additional user interface signals above those found in traditional computer mice, touchpads, and trackballs. This can be done in a number ways, for example as taught in pending U.S. Patent Application 61/435,401 and as described below in material adapted from that pending US patent application.

Figure 26A:
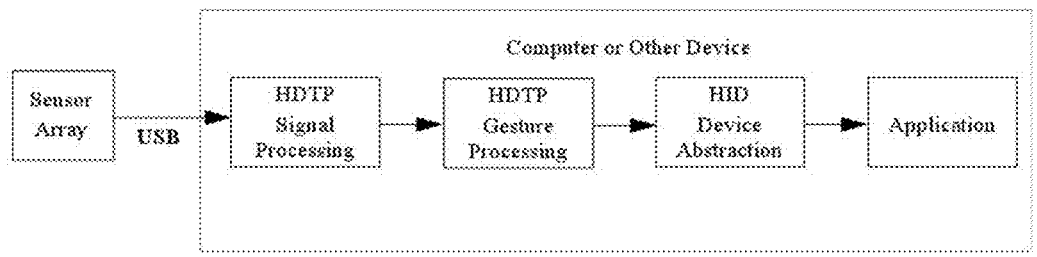
FIGS. 26a-26c depicts exemplary embodiments providing HDTP technologies with a HID device abstraction for interfacing to applications.

In a first exemplary embodiment, a USB HID device abstraction is employed to connect a computer or other device with an HDTP sensor that is connected to the computer via a USB interface. Here the exemplary HDTP signal processing and HDTP gesture processing are implemented on the computer or other device. The HDTP signal processing and HDTP gesture processing implementation can be realized via one or more of CPU software, GPU software, embedded processor software or firmware, and/or a dedicated integrated circuit. FIG. 26a depicts an exemplary implementation of such an embodiment.

Figure 26B:
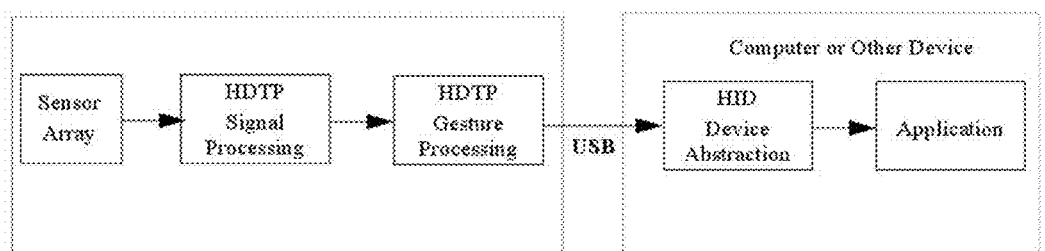

In another exemplary embodiment, a USB HID device abstraction is employed to connect a computer or other device with an HDTP sensor and one or more associated processor(s) which in turn is/are connected to the computer via a USB interface. Here the exemplary HDTP signal processing and HDTP gesture detection are implemented on the one or more processor(s) associated with HDTP sensor. The HDTP signal processing and HDTP gesture processing implementation can be realized via one or more of CPU software, GPU software, embedded processor software or firmware, and/or a dedicated integrated circuit. FIG. 26b depicts an exemplary implementation of such an embodiment.

Figure 26C:
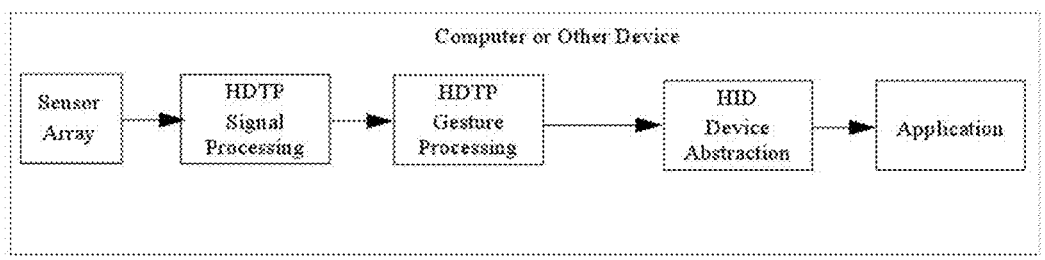

In another exemplary embodiment, a USB HID device abstraction is used as a software interface even though no USB port is actually used. The HDTP signal processing and HDTP gesture processing implementation can be realized via one or more of CPU software, GPU software, embedded processor software or firmware, and/or a dedicated integrated circuit. FIG. 26c depicts an exemplary implementation of such an embodiment. Alternatively, ADPs can interface to a computer or other device in yet other ways. For example, a special purpose interface can be used. As another example, the Bluetooth networking standard can be used.

Support for Additional Parameters via Existing or Extended Window Systems and Operating Systems The additional interactively-controlled parameters provided by HDTP (such as that taught in the 1999 filings of issued U.S. Pat. No. 6,570,078 and pending U.S. patent application Ser. No. 11/761,978, pending U.S. patent application Ser. Nos. 12/418,605, 12/502,230, 12/541,948, and related pending U.S. patent applications), Advanced Mice (such as that Mice taught in the 2004 filings of issued U.S. Pat. No. 7,557,797 and related pending U.S. patent applications), and other rich multiparameter user interface devices supply more interactively-controlled parameters than the established number supported by conventional window and operating systems. Provisions to support the use of additional interactively-controlled parameters provided by HDTP, Advanced Mice, and other rich multiparameter user interface devices with existing or extended operating systems has been taught in pending U.S. patent application Ser. No. 12/875,128. Some material from pending U.S. patent application Ser. No. 12/875,128 is directly adapted in this section for convenience. Additionally, images of the human hand as captured by video cameras can be used as an enhanced multiple-parameter interface responsive to hand positions and gestures, for example as taught in pending U.S. patent application Ser. No. 10/683,915 and more specifically in paragraphs [314], [321]-[332], [411], [653], and (in view of paragraph [325]) also paragraphs [241]-[263] of that pending application's pre-grant publication U.S. 2004/0118268.

More generally, the invention provides for additional user interface parameter signals provided by the not only the High Dimensional Touchpad (HTPD) and Advanced Mice, but also other multidimensional or rich parameter user interfaces providing additional user interface signals above those found in traditional computer mice, touchpads, and trackballs. This fuller collection (HDTP, Advanced Mice, other multidimensional or rich parameter user interface devices providing additional user interface signals above those found in traditional computer mice, touchpads, and trackballs) will be collectively referred to as Advanced Pointing Devices (APDs).

There is a number of ways that conventional window systems, window managers, and operating systems can be used or adapted to support the additional interactively-controlled parameters provided by an APD. A few examples are provided here, and other approaches are anticipated by the invention.

In one approach, the entire (interactively-controlled) information flux provided by an APD is carried over the same framework used to carry the traditional computer mouse/touchpad user interface signals from conventional pointing devices. In one version of this approach, only the driver for the APD need be added and recognized by the window systems, window managers, and operating systems. The window systems, window managers, and operating systems then distributes the entire (interactively-controlled) information flux to the application selected according to focus control implemented by the operating system. For some window systems, window managers, and operating systems, such an approach can be implemented without modification. In other window systems, window managers, and operating systems implementations, such an approach can require a modification to the window system, window manager, and operating system. Should a particular existing window systems, window managers, and operating systems resident on a computing device require such modification, the invention provides for the modification to be implemented via a downloadable patch or other form of update (for example, using a data-storage media).

Figure 27A:
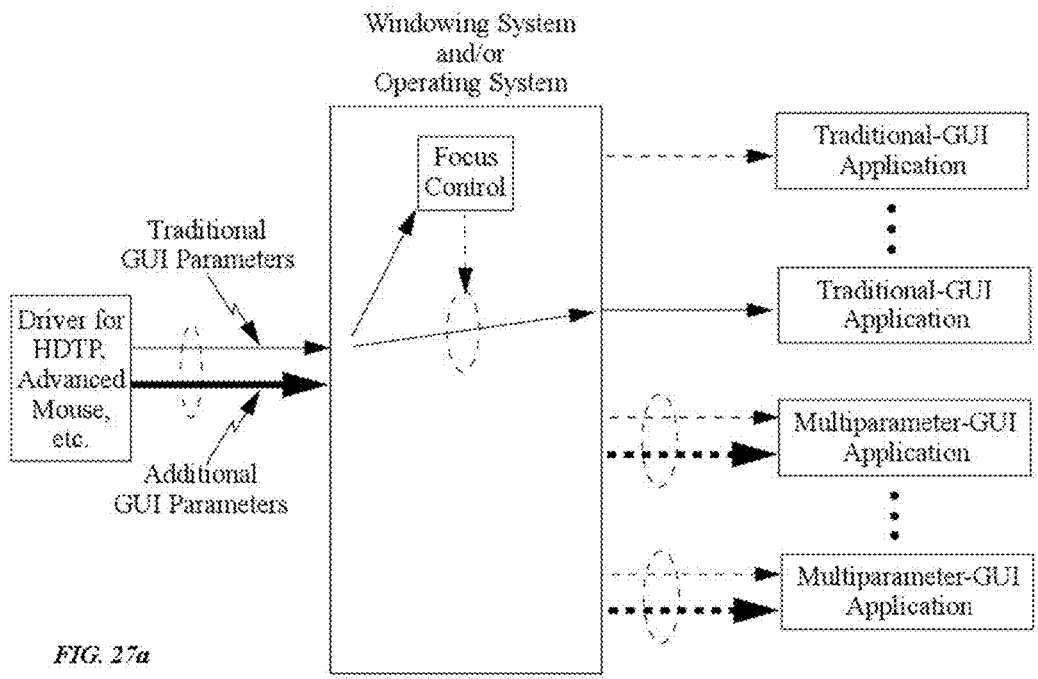
FIGS. 27a-27d depict arrangements for directing additional user interface parameter signals to applications.
Figure 27B:
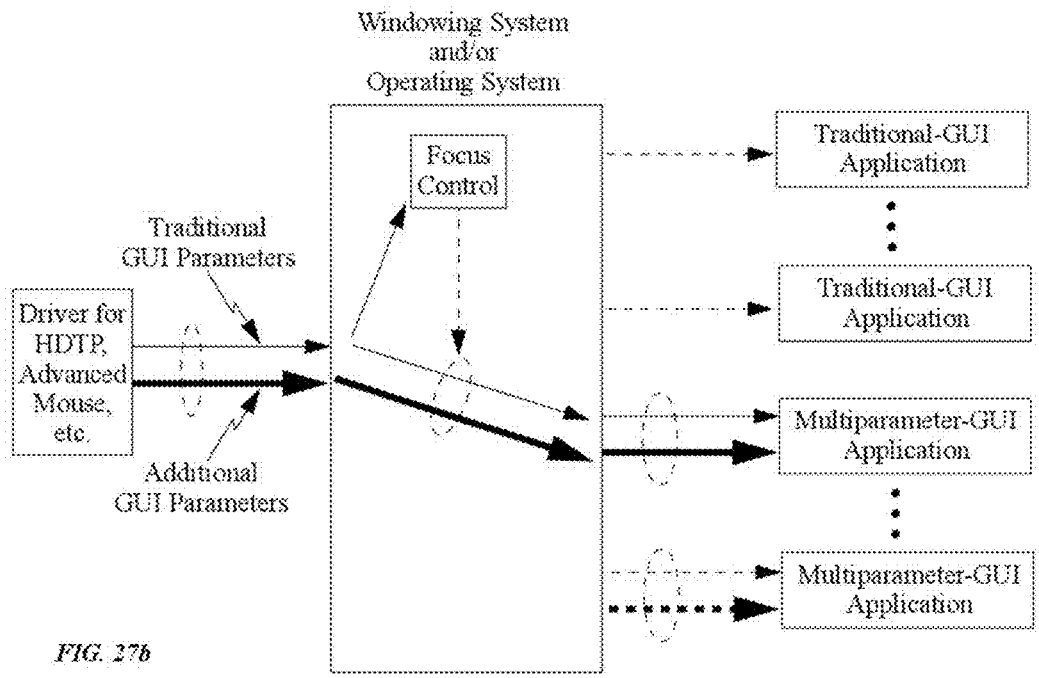
Figure 27C:
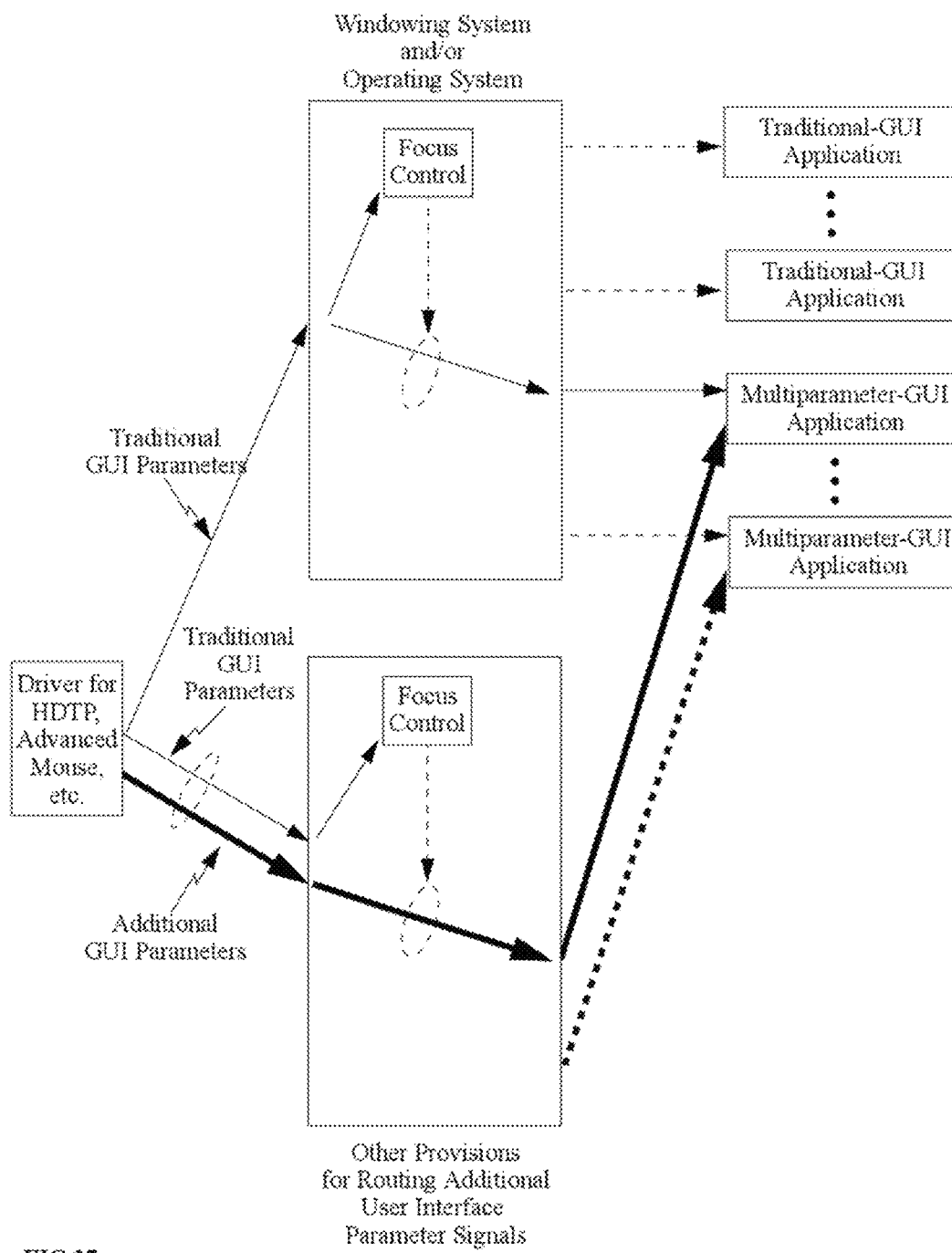
Figure 27D:
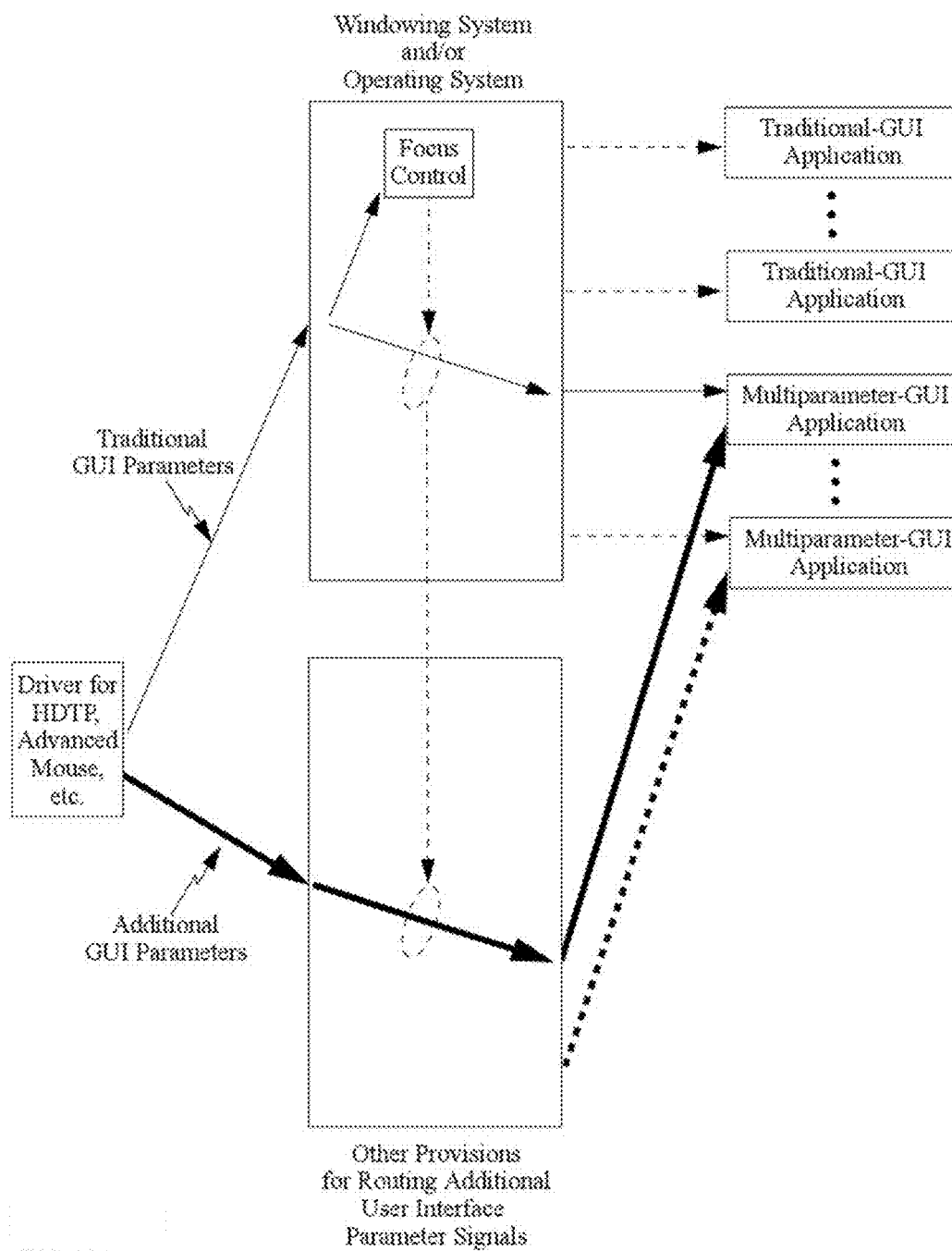

FIGS. 27a and 27b depict a representative rendering of this approach. In each figure, the driver for the APD presents traditional computer mouse/touchpad user interface signals from conventional pointing devices (thin straight arrowed lines) to the window systems, window managers, and operating systems as well as additional computer mouse/touchpad/trackball user interface signals (thick straight arrowed lines) from the APD. In each of these approaches, as well as other variations clear to one skilled in the art, the window system, window manager, and operating system, or combination of these comprise a focus control functionality used to route the traditional and additional user interface parameter signals. The focus control can be responsive to at least the position of a displayed cursor with respect to a displayed application window, the cursor and application window displayed on a display screen. In some approaches or operating modes, merely positioning the cursor within the window of an application makes a focus selection to that application. In other approaches or operating modes, positioning the cursor within the window of an application is not alone sufficient to make a focus selection to that application; instead the focus stays with the last selection until a user-provided selection event is made, for example a mouse click or double click, a touchpad tap or double-tap, a trackball button click or double click, etc.

In the rendering of FIGS. 27a and 27b, focus control (for example, as defined by cursor location with respect to one or more displayed application windows) is responsive traditional computer mouse/touchpad user interface signals (thin straight arrowed lines). In other arrangements, such as a system employing a 3D desktop, at least one additional parameter can be also directed to focus control and/or cursor location. In the suggestive rendering of FIGS. 27a and 27b, there are a plurality of applications, some designed to accept only traditional computer mouse/touchpad user interface signals (in the upper right of each figure) as well as other applications designed to accept these traditional signals as well as one or more of the additional user interface signals provided by the APD (in the lower right of each figure). The applicable portions of the description applies even if there are fewer applications of either or both types, or if there is only one type or only one application overall. In the case of FIG. 27a, the focus control routes only the traditional interface signals to a selected application designed to accept only traditional computer mouse/touchpad user interface signals. In the case of FIG. 27b, the focus control routes a larger collection of signals, including both traditional computer mouse/touchpad user interface signals as well as at least one additional user interface signal made available by the APD.

In another approach, the windowing and/or operating system only distributes traditional computer mouse/touchpad user interface signals from conventional pointing devices and other provisions are used to direct the additional user interface parameter signals provided by the APD to selected applications. This can be implemented in a number of ways. In one example, depicted in FIG. 27c, separate focus controls are used, each responsive to the traditional user interface signals provided by the APD. In another example, depicted in FIG. 27d, the operating system focus control provides signals to the routing element for the additional user interface parameter signals provided by the APD. Other variations are anticipated and are provided for by the invention.

Once user interface signals are routed to an application, the application it self can utilize or sub-route the user interface signals in various ways. Some applications, such as data visualization, maps, simulations, CAD systems, etc. can beneficially use more than three simultaneously interactively adjustable user inputs directly. Other applications, such as browsers and viewers, can support such applications indirectly as taught and discussed for example in pending U.S. patent application Ser. No. 12/875,119. Browsers, viewers, and hypermedia documents can also be provided with advanced hypermedia objects that generalize the notion of hyperlinks, rollovers, sliders, buttons, etc. that are configured to utilize additional user interface signals; such advanced hypermedia objects taught and discussed for example in pending U.S. Patent Application 61/435,395.

Support for Additional Parameters via Browser Plug-Ins

The additional interactively-controlled parameters provided by the APD provide more than the usual number supported by conventional browser systems and browser networking environments.

The use of browser plug-ins to support the use of HDTP (such as taught in the 1999 filings of issued U.S. Pat. No. 6,570,078 and pending U.S. patent application Ser. No. 11/761,978, pending U.S. patent application Ser. Nos. 12/418,605, 12/502,230, 12/541,948, and related pending U.S. patent applications), Advanced Mice (such as those taught in the 2004 filings of issued U.S. Pat. No. 7,557,797 and related pending U.S. patent applications), and other rich multiparameter user interface devices with associated browser-based applications has been taught in pending U.S. Patent Application 61/239,428. Some of that material from pending U.S. Patent Application 61/239,428 is directly adapted in this section for convenience. Additionally, images of the human hand as captured by video cameras can be used as an enhanced multiple-parameter interface responsive to hand positions and gestures, for example as taught in pending U.S. patent application Ser. No. 10/683,915 and more specifically in paragraphs [314], [321]-[332], [411], [653], and (in view of paragraph [325]) also paragraphs [241]-[263] of that pending application's pre-grant publication U.S. 2004/0118268.

Figure 28A:
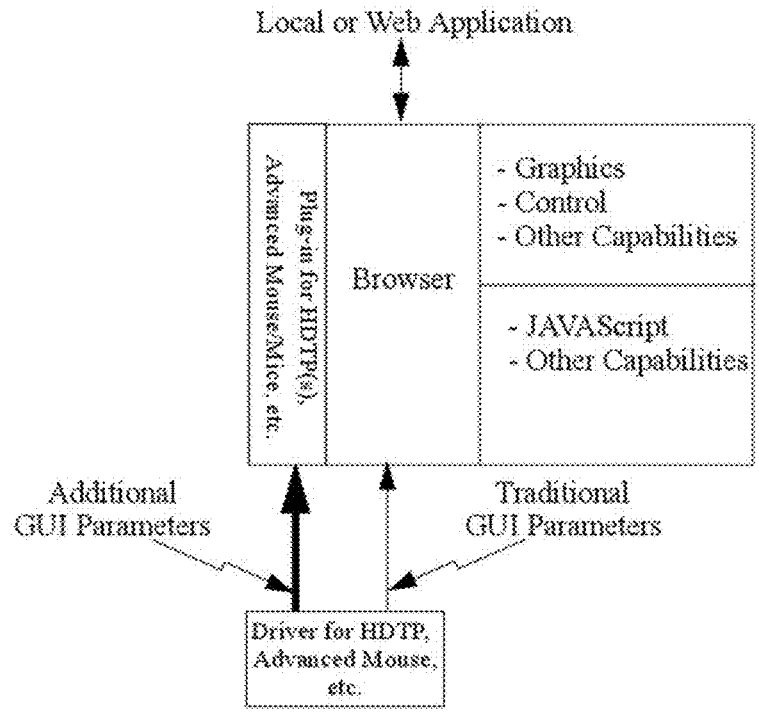
FIG. 28a depicts a browser plug-in arrangement for directing additional user interface input parameters to an application interfacing to the browser.

In an additional approach, the invention provides for an APD (which again includes the HDTP, Advanced Mice, and other rich or multiparameter user interface devices) to interface with a browser via a browser plug-in. Such an arrangement can be used to capture the additional user interface input parameters and pass these on to an application interfacing to the browser. An example of such an arrangement is depicted in FIG. 28a. The browser can interface with local or web-based applications that drive the visualization and/or control the data source(s), process the data, etc. The browser can be provided with client-side software such as JAVA Script.

Figure 28B:
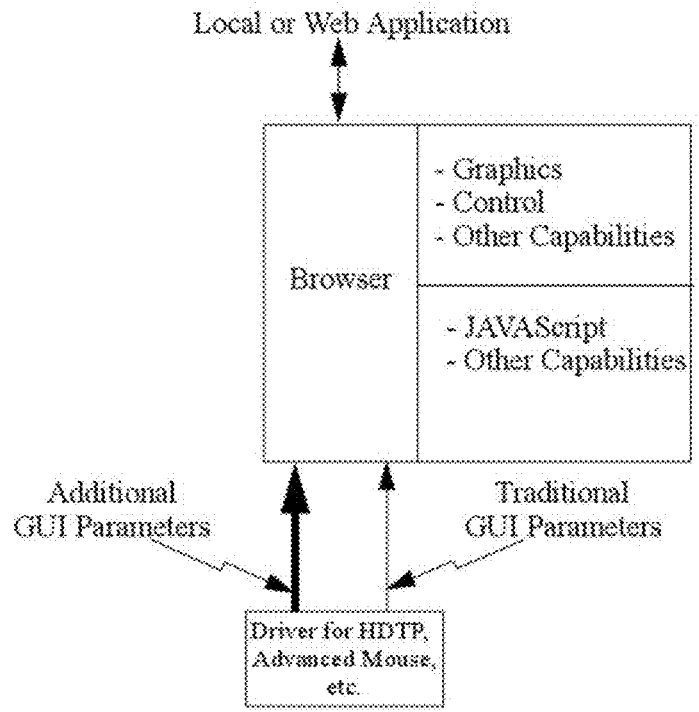
FIG. 28b depicts additional browser plug-in arrangements for advanced 2D and/or 3D vector and raster graphics which can additionally be interfaced with client-side software such as JAVA Script.

The invention further provides for advanced graphics to be rendered in a browser. This allows for implementations wherein the browser is used as a viewer for data visualizations, advanced animations, etc. The browser can interface with local or web-based applications that drive the visualization. An example arrangement is depicted in FIG. 28b. In an embodiment, the browser can be provided with Simple Vector Graphics ("SVG") utilities (natively or via an SVG plug-in) so as to render basic 2D vector and raster graphics. In another embodiment, the browser can be provided with a 3D graphics capability, for example via the Cortona 3D browser plug-in. These embodiments or alternatives can be provided with client-side software such as JAVA Script.

Multiple Parameter Extensions to Traditional Hypermedia Objects

The present invention provides extensions to the traditional and contemporary hyperlink, roll-over, button, menu, and slider functions found in web browsers and hypermedia documents leveraging additional user interface parameter signals provided by an APD (i.e., HTPD, Advanced Mouse, or other rich or multiparameter user interfaces including currently popular advanced touch interfaces employing multitouch and/or gestures). The extensions provided by the invention include:

In the case of a hyperlink, button, slider and some menu features, directing additional user input into a hypermedia "hotspot" by clicking on it;

In the case of a roll-over and other menu features: directing additional user input into a hypermedia "hotspot" simply from cursor overlay or proximity (i.e., without clicking on it).

The resulting extensions will be called "Multiparameter Hypermedia Objects" ("MHO").

Potential uses of the MHOs and more generally extensions provided for by the invention include:

Using the additional user input to facilitate a rapid and/or more detailed information gathering experience in a low-barrier sub-session;

Potentially capturing notes from the sub-session for future use;

Potentially allowing the sub-session to retain state (such as last image displayed);

Leaving the hypermedia "hotspot" without clicking out of it.

A number of user interface metaphors can be employed in the invention and/or its use, including one or more of:

Creating a pop-up visual or other visual change responsive to the rollover or hyperlink activation;

Rotating an object using rotation angle metaphors provided by the APD;

Rotating a user-experience observational viewpoint using rotation angle metaphors provided by the APD, for example, as described in pending U.S. patent application Ser. No. 12/502,230 "Control of Computer Window Systems, Computer Applications, and Web Applications via High Dimensional Touchpad User Interface" by Seung Lim;

Navigating at least one (1-dimensional) menu, (2-dimensional) pallet or hierarchical menu, or (3-dimensional) space.

In an embodiment, a second displayed visual representation of the hypermedia object is displayed on the display screen when the hypermedia object is activated.

In an embodiment, the first displayed visual representation of the hypermedia object changes when the hypermedia object is activated.

In an embodiment, the first displayed visual representation of the hypermedia object changes is responsive to the at least one additional user-adjustable input.

In an embodiment, a hypermedia object associated with an application for display on a display screen and responsive to information provided by a user interface input device comprising two-dimensional pointing functions and at least one additional user-adjustable input for entering values from a range comprising more than two values, the hypermedia object comprising:

a first visual representation of the hypermedia object on a display screen, the first displayed visual representation for display in a first region of the display associated with an application;

an associated responsive area in a second region of the display, the responsive area for use in activating the hypermedia object;

a procedure for activating the hypermedia object from a user-initiated action enacted on a user interface input device;

wherein activation of the hypermedia object enables the entry of at least one additional user-adjustable input value for use by the associated application.

In an embodiment, the first and second regions of the display are the same region.

In an embodiment, the hypermedia object further comprises a hyperlink function activated by the user interface input device when a cursor is positioned within the associated responsive area, the cursor position controlled by the two-dimensional pointing functions.

In an embodiment, the hypermedia object comprises a rollover function activated by using the user interface input device to position the cursor within the associated responsive area, the cursor position controlled by the two-dimensional pointing functions.

In an embodiment, the hypermedia object comprises a button function activated by clicking the user interface input device when the cursor is positioned within the associated responsive area, the cursor position controlled by the two-dimensional pointing functions.

In an embodiment, the hypermedia object comprises a slider function.

In an embodiment, the hypermedia object comprises a menu function.

In an embodiment, the user input device is a computer mouse comprising a first scrollwheel.

In an embodiment, the user input device is a computer mouse further comprising a second scrollwheel.

In an embodiment, the user input device is a computer mouse comprising a touchpad.

In an embodiment, the user input device is a computer mouse comprising a High Definition Touch Pad (HDTP).

In an embodiment, the user input device comprises a touch user interface responsive to gestures and the at least one additional user-adjustable input comprises at least one gesture.

In an embodiment, the user input device comprises a touch user interface responsive to the yaw angle of a finger in contact with the touch user interface and the at least one additional user-adjustable input is responsive to a measurement of the yaw angle.

In an embodiment, the user input device comprises a touch user interface responsive to the roll angle of a finger in contact with the touch user interface and the at least one additional user-adjustable input is responsive to a measurement of the roll angle.

In an embodiment, the user input device comprises a touch user interface responsive to the pitch angle of a finger in contact with the touch user interface and the at least one additional user-adjustable input is responsive to a measurement of the pitch angle.

In an embodiment, the user input device comprises a touch user interface responsive to at least two angles of a finger in contact with the touch user interface and the at least one additional user-adjustable input is responsive to a measurement of each of the two angles.

In an embodiment, a second displayed visual representation of the hypermedia object is displayed on the display screen when the hypermedia object is activated.

In an embodiment, the first displayed visual representation of the hypermedia object changes when the hypermedia object is activated.

In an embodiment, the first displayed visual representation of the hypermedia object changes responsive to the at least one additional user-adjustable input.

In an embodiment, the user input device is a touch interface comprising a tactile grammar.

Such extensions, features, and other aspects of the present invention permit far faster browsing, shopping, information gleaning through the enhanced features of these extended functionality roll-over and hyperlink objects.

Parameter Flow Routing to Multiparameter Hypermedia Objects

In an embodiment, an example general theme for extending traditional and contemporary hypermedia objects such as hyperlink, roll-over, button, menu, and slider functions to handle the additional parameters provided by an APD include:

Test for cursor location meeting conditions for selecting the MHO over other MHOs, background window, or user interface modalities (for example, as was described earlier in conjunction with FIG. 4);

If conditions met, additional user interface parameter signals from APD are directed to software associated with the MHO.

The additional user interface parameter signals are used to control aspects of the application or MHO that are not attained by using user interface parameter signals with either the MHO or with the traditional and contemporary forms of these hypermedia objects.

In regards to this example general theme, it is noted that aside from use with scrollbar sliders and zoom sliders, the scrollwheel user interface parameter signal of a contemporary scroll-wheel mouse do not appear to be used much (if at all) in the interaction with hypermedia objects. Further, established use of the scrollwheel user interface parameter signal of a contemporary scroll-wheel mouse is fundamental different from the general theme of the invention: in existing systems and software the scrollwheel user interface parameter signal provides the same adjustment actions as would clicking on and dragging the slider, while in the example general theme this is precluded. The invention therefore provides for MHO hyperlinks, buttons, rollovers, menus, and sliders that direct scrollwheel user interface parameter signals to software associated with them (in keeping with the example general theme described above).

Figure 29A:
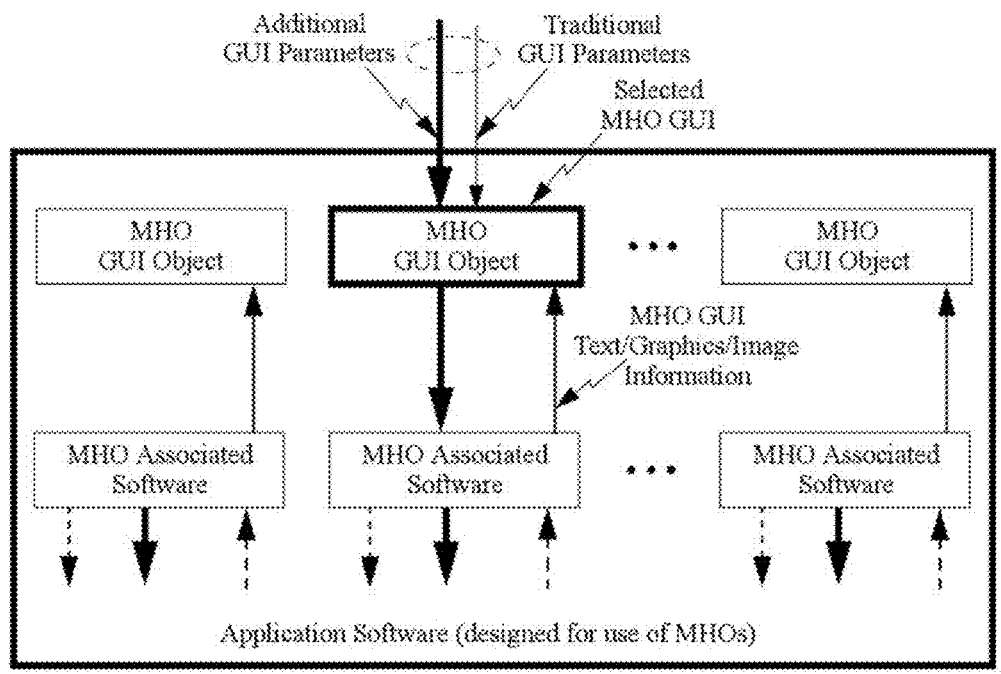
FIGS. 29a and 29b depict arrangements provided for by the invention wherein an application designed to utilize additional APD user interface parameter signals.

FIG. 29a depicts an arrangement provided for by the invention wherein an application designed to utilize additional APD user interface parameter, symbol, and/or gesture signals (thick arrowed lines) via MHOs comprises at least one MHO (here a plurality are depicted, but only one is required). Traditional user interface parameter signals (thin arrowed line) are used to select (thick box lines) the application and a particular MHO within it. The selected MHO permits the additional APD user interface parameter, symbol, and/or gesture signals (thick arrowed lines) to be directed to the MHO associated software. The MHO associated software passes these on to the additional APD user interface parameter, symbol, and/or gesture signals (thick arrowed line) to the application software. In an embodiment, the MHOs and application software can additionally communicate information to the MHO associated software from the application software and/or from the MHO associated software to the application software (dashed arrowed lines).

Figure 29B:
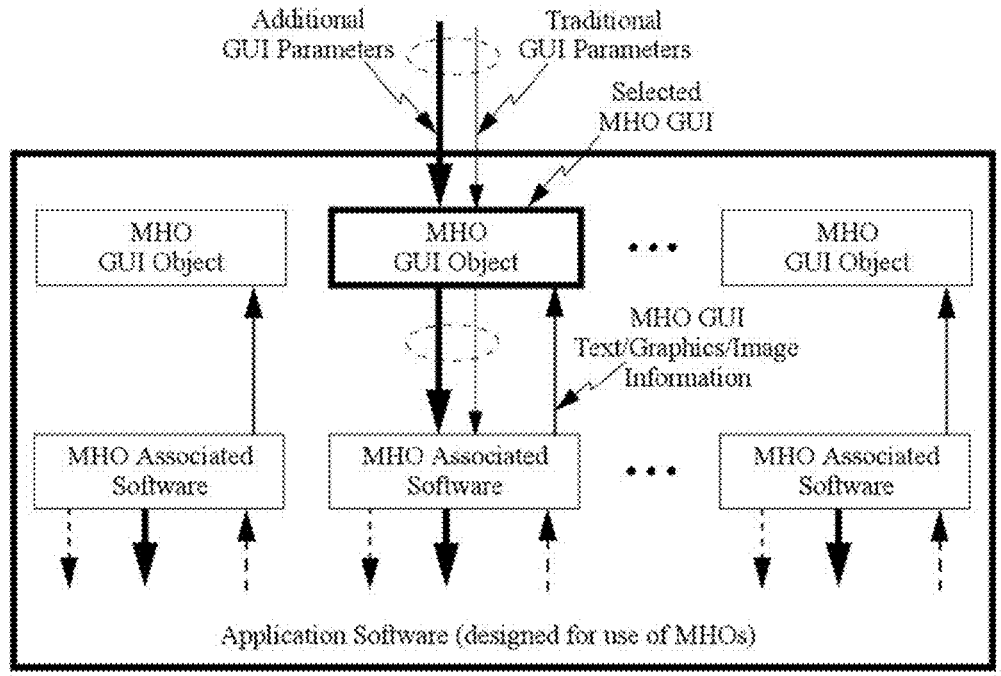

In another embodiment, the selected MHO can further forward traditional user interface parameter signals as well as additional APD user interface parameter, symbol, and/or gesture signals as suggested in FIG. 29b.

Figure 30A:
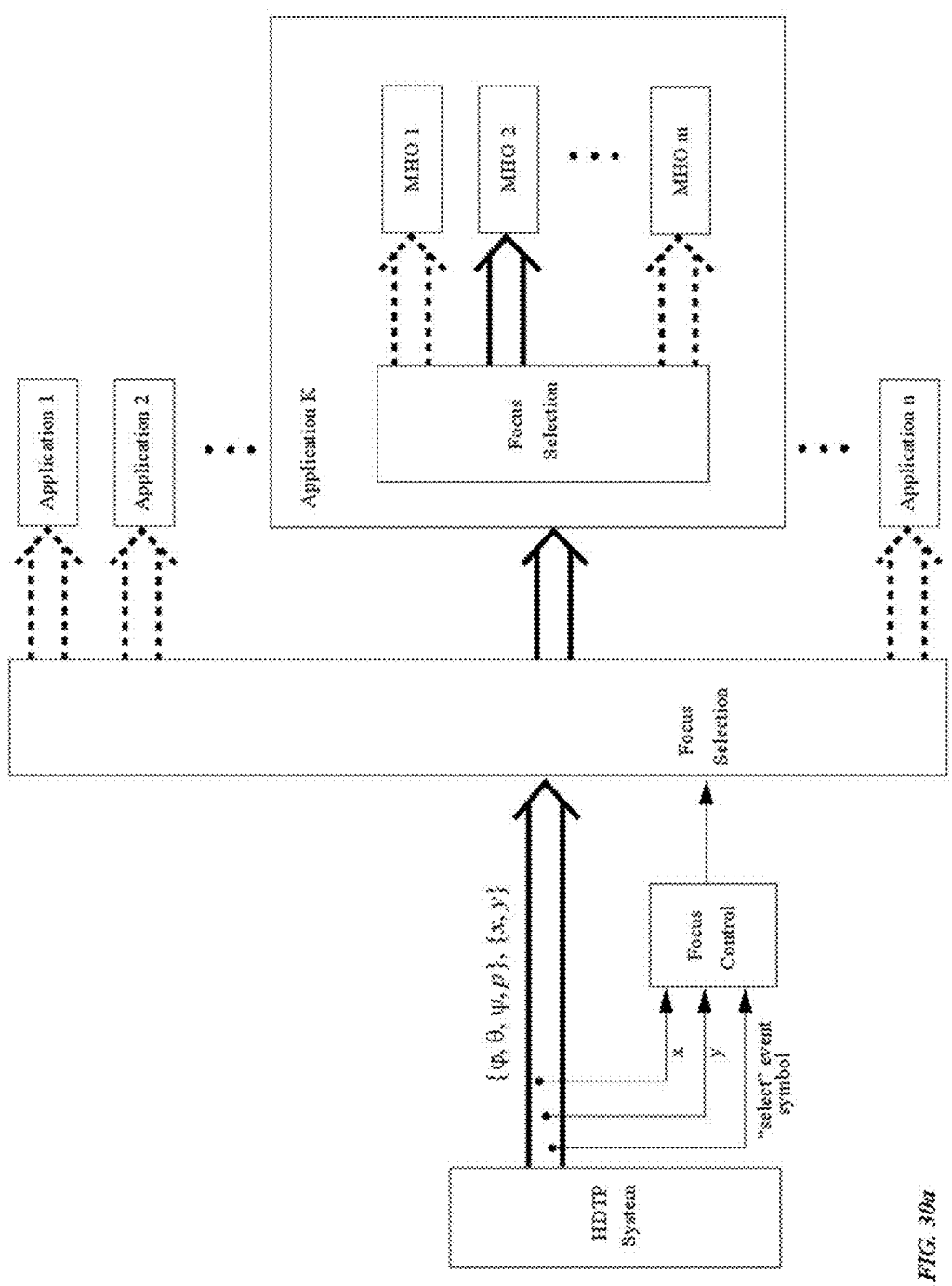
FIGS. 30a and 30b depict arrangements for directing additional user interface input parameters to multi-parameter hypermedia objects (MHOs) rendered within the display of browser-based applications.
Figure 30B:
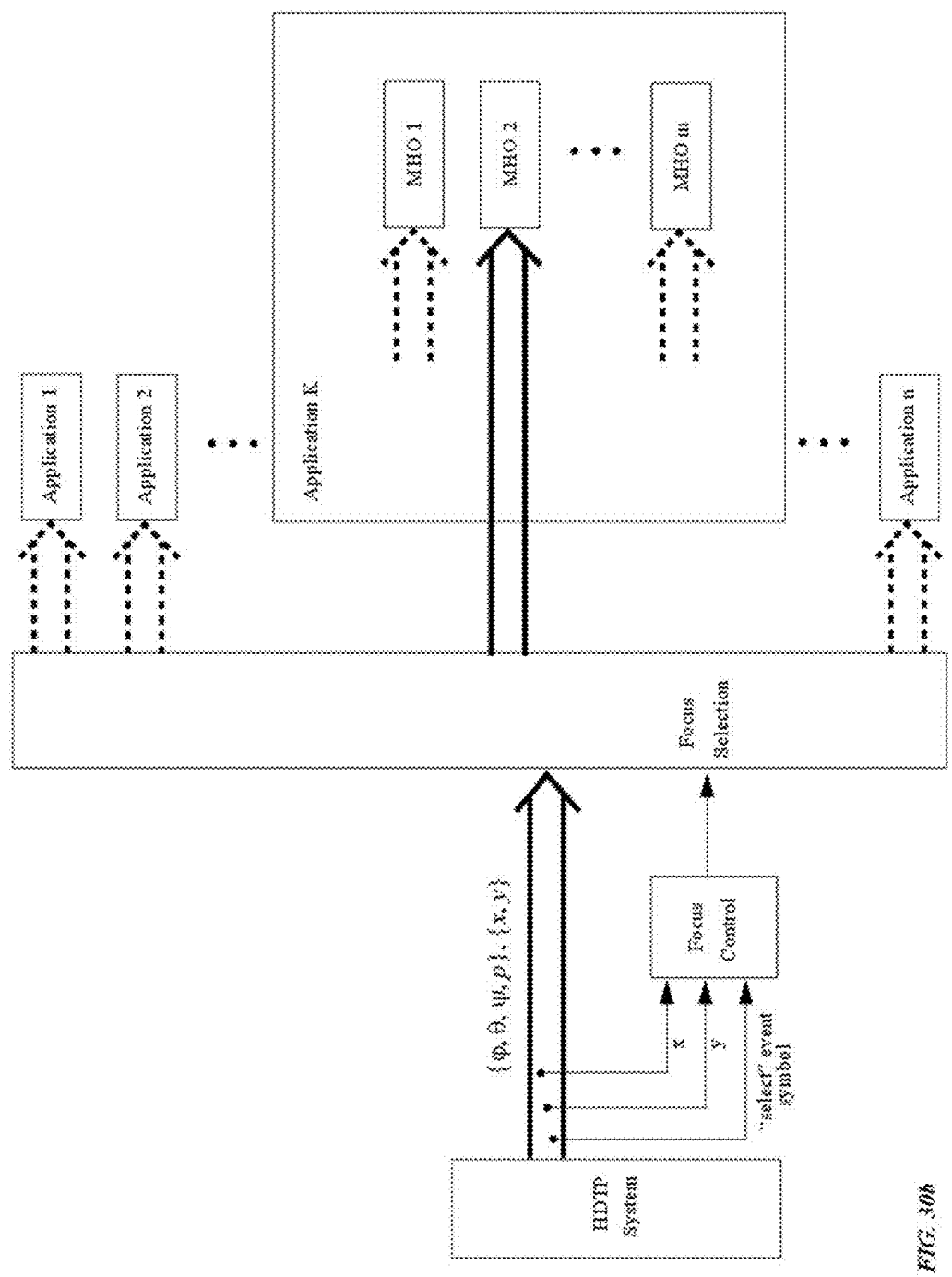

Implicit in the representative arrangements depicted in FIGS. 29a and 29b is the process of focus selection within the context of the underlying application. Such an arrangement can be implemented in a number of ways, for example by the windowing and/or operating system(s), within the application, or various combinations of both. For example, the focus selection can be implemented within a hypermedia application (such as a browser or viewer), and in some embodiments further be assisted by the focus control functions within the windowing and/or operating system(s). For example, FIG. 30a depicts a first example arrangement for directing the user interface input parameter, symbol, and/or gesture signal stream to MHOs rendered within the display of selected application, for example extending the signal flow depicted in FIG. 20. In this example, the focus control and focus selection functions within the windowing and/or operating system(s) direct APD information flows to a particular selected application (here "Application K"), and within the selected application ("Application K") a second focus selection function can be implemented. Note, for example, the selected application can be a browser-based application, as provided for by the invention. As another example, FIG. 30b depicts a second example arrangement wherein the windowing and/or operating system(s) direct the user interface input parameter, symbol, and/or gesture signal stream directly to MHOs rendered within the display of selected application.

Examples of MHO Structures

Like a traditional hypermedia object, an MHO can comprise one or more arguments including one or more of:

Graphics and image information;
Text string information;
Formatting information;
Hot-spot size and location details;
Modal behavior information (actions upon roll-over, actions upon click-selection, etc.)
URL destination for a page or document location change.

Additionally, and MHO can also comprise:

Additional modal behavior information (extra states to be kept, etc.)
A "name" (or link to) at least one instance of associated software;
A list of variables used to communicate with associated software;
An outgoing data interface to associated software;
An incoming data interface to associated software.

Examples of MHO Operation

The software associated with an MHO can use the extra parameters to do, for example, one or more of the following:

Change rendered graphics or images comprised by the MHO;
Change rendered graphics or images associated with but not comprised by the MHO;
Change or produce sounds associated with the MHO;
Change software settings associated with the MHO;
Enter data to software associated with the MHO, although the use and operation of the MHOs are not restricted to these examples. The software associated with an MHO can perform one or more functions such as these on its own (for example, using information provided by arguments of the MHO function, as in traditional HTML) or can be assisted or controlled in doing so by the application software (employing for example one or both of the communications paths represented by the dashed arrowed lines).

Other Representative Types of MHOs

Figure 31:
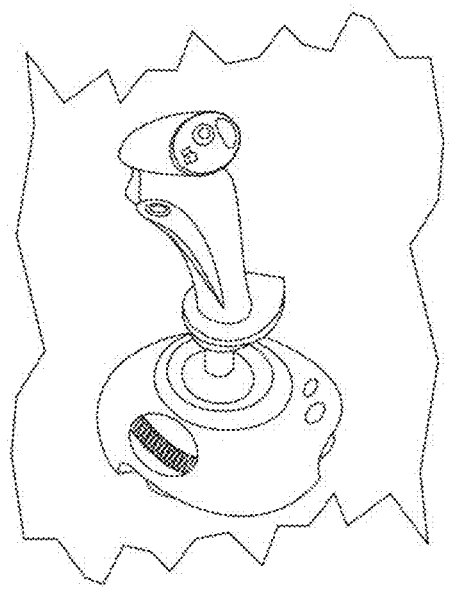
FIGS. 31-34 depict MHOs that differ from direct extensions of traditional and contemporary hypermedia objects.
Figure 32:
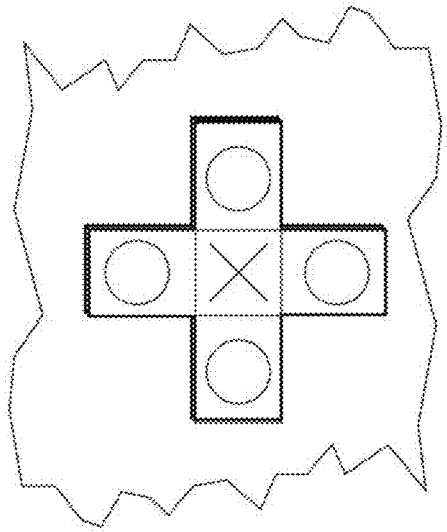
Figure 33:
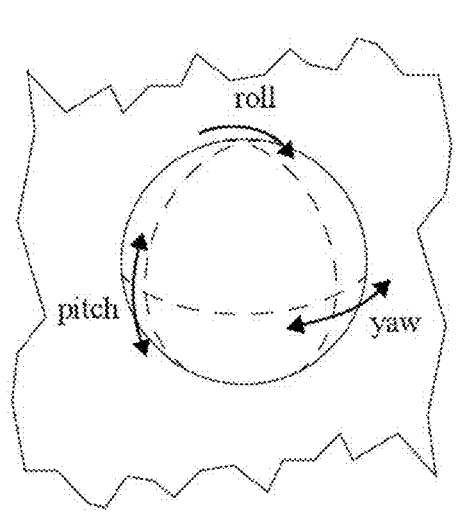
Figure 34:
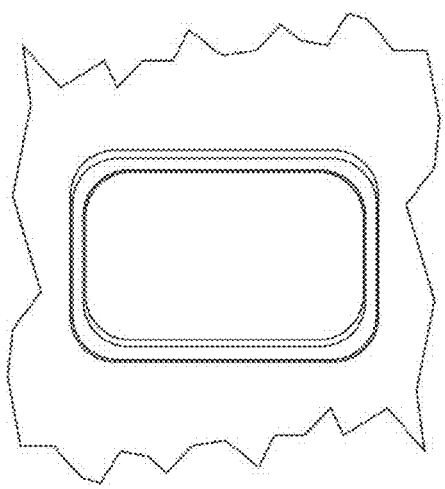

In addition to MHOs that are additional-parameter extensions of traditional hypermedia objects, new types of MHOs unlike traditional or contemporary hypermedia objects can be implemented leveraging the additional user interface parameter signals and user interface metaphors that can be associated with them. Illustrative examples include:

Visual joystick (in various embodiments, the joystick could retain its last position after it is "released," or in other embodiments can return to central position after release), for example as depicted in FIG. 31;
Visual rocker-button (in various embodiments, the rocker button can keep position after release, or in other embodiments can return to central position after release), for example as depicted in FIG. 32;
Visual rotating trackball, cube, or other object (in various embodiments, the rocker button can keep position after release, or in other embodiments can return to central position after release), for example as depicted in FIG. 33;
A small miniature touchpad), for example as depicted in FIG. 34.

Yet other types of MHOs are possible and provided for by the invention. For example:

The background of the body page can be configured as an MHO;
The background of a frame or isolated section within a body page can be configured as an MHO;
An arbitrarily-shaped region, such as the boundary of an entity on a map, within a photograph, or within a graphic can be configured as an MHO.

In any of these, the invention provides for the MHO to be activated or selected by various means, for example by clicking or tapping when the cursor is displayed within the area, simply having the cursor displayed in the area (i.e., without clicking or tapping, as in a rollover), etc.

Variations on any of these and as well as other new types of MHOs can similarly be crafted by those skilled in the art and these are provided for by the invention.

MHO Dynamic Visual Features

In an embodiment, the displayed visual appearance of an MHO can advantageously be changed response to at least one or more of the following:

User interface parameter, symbol, and/or gesture signals directed to the MHO and processed within the MHO;
User interface parameter, symbol, and/or gesture signals directed to the MHO, passed to associated software, and processed by the associated software to produce other signals, data flows, or data changes which cause a change of displayed visual appearance of the MHO;
Other actions of a associated software that produce other signals, data flows, or data changes which cause a change of displayed visual appearance of the MHO;
Internal operations of the associated software;
External data provided to the associated software;
External data provided to the MHO.

The invention also provides for the displayed visual appearance of an MHO to be changed by other processes and circumstances.

In an embodiment, the aforementioned visual changes in the visual appearance of the MHO as displayed can comprise changes of displayed color in the visual display of the MHO. For example:

At least one color comprised in the visual display of the MHO can vary as a user interface parameter is varied, directly responsive to the value of the user interface parameter;
At least one color comprised in the visual display of the MHO can vary as a user interface parameter is varied, responsive to the action of associated software on the value of the user interface parameter;
At least one color comprised in the visual display of the MHO can vary as a user interface parameter is varied, responsive to the action of associated software in response to other software action on information responsive to the value of the user interface parameter (for example, the return of a database query, the calculation of a cost, etc.).

In an embodiment, the aforementioned visual changes in the visual appearance of the MHO as displayed can comprise changes of displayed text in the visual display of the MHO. For example:

The content and/or format of text comprised in the visual display of the MHO can vary as a user interface parameter is varied, directly responsive to the value of the user interface parameter;
The content and/or format of text comprised in the visual display of the MHO can vary as a user interface parameter is varied, responsive to the action of associated software on the value of the user interface parameter;
The content and/or format of text comprised in the visual display of the MHO can vary as a user interface parameter is varied, responsive to the action of associated software in response to other software action on information responsive to the value of the user interface parameter (for example, the return of a database query, the calculation of a cost, etc.).

In an embodiment, the aforementioned visual changes in the visual appearance of the MHO as displayed can comprise changes of displayed rendered graphics in the visual display of the MHO. For example:

At least one graphically rendered attribute comprised in the visual display of the MHO can vary as a user interface parameter is varied, directly responsive to the value of the user interface parameter;

At least one graphically rendered attribute comprised in the visual display of the MHO can vary as a user interface parameter is varied, responsive to the action of associated software on the value of the user interface parameter;

At least one graphically rendered attribute comprised in the visual display of the MHO can vary as a user interface parameter is varied, responsive to the action of associated software in response to other software action on information responsive to the value of the user interface parameter (for example, the return of a database query, the rendering of a scene, etc.).

In an embodiment, the aforementioned visual changes in the visual appearance of the MHO as displayed can comprise changes of displayed image in the visual display of the MHO. For example:

At least one displayed image comprised in the visual display of the MHO can vary as a user interface parameter is varied, directly responsive to the value of the user interface parameter;

At least one displayed image comprised in the visual display of the MHO can vary as a user interface parameter is varied, responsive to the action of associated software on the value of the user interface parameter;

At least one displayed image comprised in the visual display of the MHO can vary as a user interface parameter is varied, responsive to the action of associated software in response to other software action on information responsive to the value of the user interface parameter (for example, the return of a database query, the display of a different view of an object or scene, etc.).

Ranges and Cycles

In some applications, some visual changes in the visual appearance of the MHO as displayed will be rendered over a range with endpoints. In other applications, some visual changes in the visual appearance of the MHO as displayed will be rendered over a periodic cycle without endpoints, in particular those relating directly or in metaphor to the rotation of an object and/or viewpoint in one, two, or three angular dimensions.

Figure 35:
FIG. 35 depicts a 1-dimensional array of N images, any one of which can be selected for rendering as part or all of the displayed visual appearance of an MHO.

FIG. 35 depicts a representative 1-dimensional array of N images, any one of which can be selected for rendering as part or all of the displayed visual appearance of an MHO. In a first example, as a single user interface parameter is varied between values, one or another of these N images is displayed as part or all of the displayed visual appearance of an MHO, directly responsive to the last received value of the user interface parameter itself. In a second example, as a single user interface parameter is varied between values, one or another of these N images is displayed as part or all of the displayed visual appearance of an MHO, responsive to commands or data provided by an associated program and/or other software.

Figure 36:
FIG. 36 depicts a periodic structure imposed on the array of FIG. 34.

FIG. 36 depicts a representative periodic structure imposed on the array of FIG. 35. Such a periodic structure is useful for example in rendering the full 1-dimensional rotation of an object or viewpoint as well as other periodic behaviors or attributes (such as that of a clock face, weekly calendar, medicinal regiment, etc.).

Figure 37:
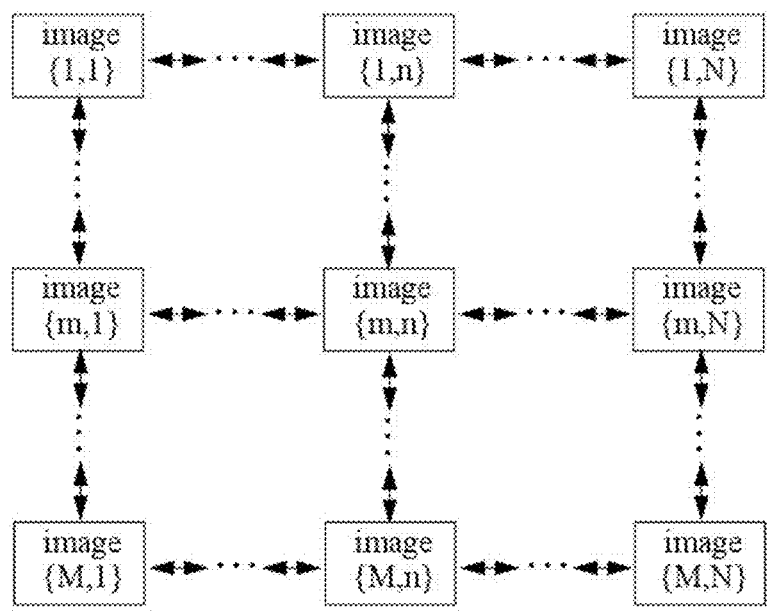
FIG. 37 depicts a 2-dimensional array of N×M images, any one of which can be selected for rendering as part or all of the displayed visual appearance of an MHO.

FIG. 37 depicts a representative 2-dimensional array of N×M images, any one of which can be selected for rendering as part or all of the displayed visual appearance of an MHO.

Figure 38A:
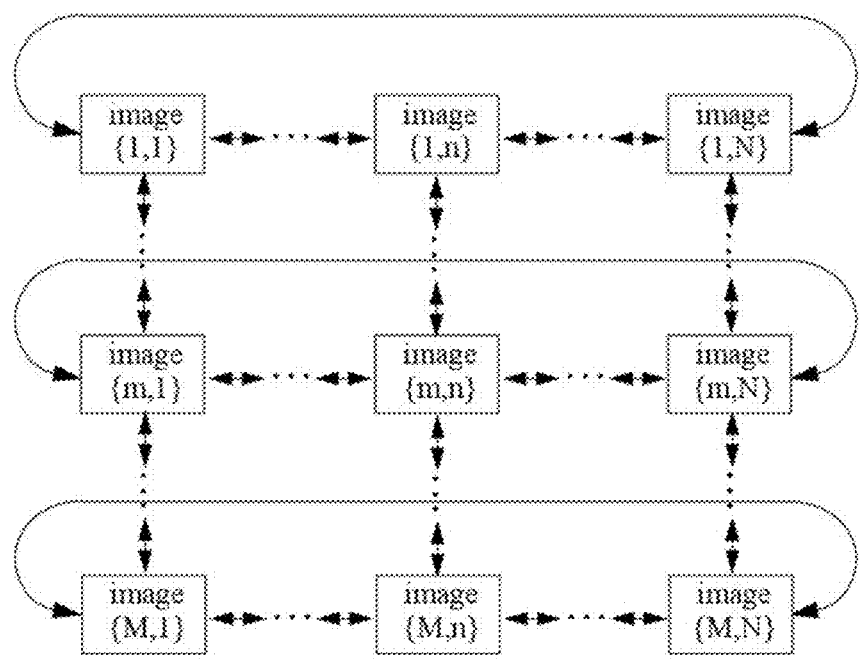
FIG. 38a depicts a 1-dimensional periodic structure imposed on the 2-dimensional array of FIG. 36.

FIG. 38*a* depicts a representative 1-dimensional periodic structure imposed on the 2-dimensional array of FIG. 37. In this example, the remaining dimension of the array does not have a periodic structure imposed on it.

Figure 38B:
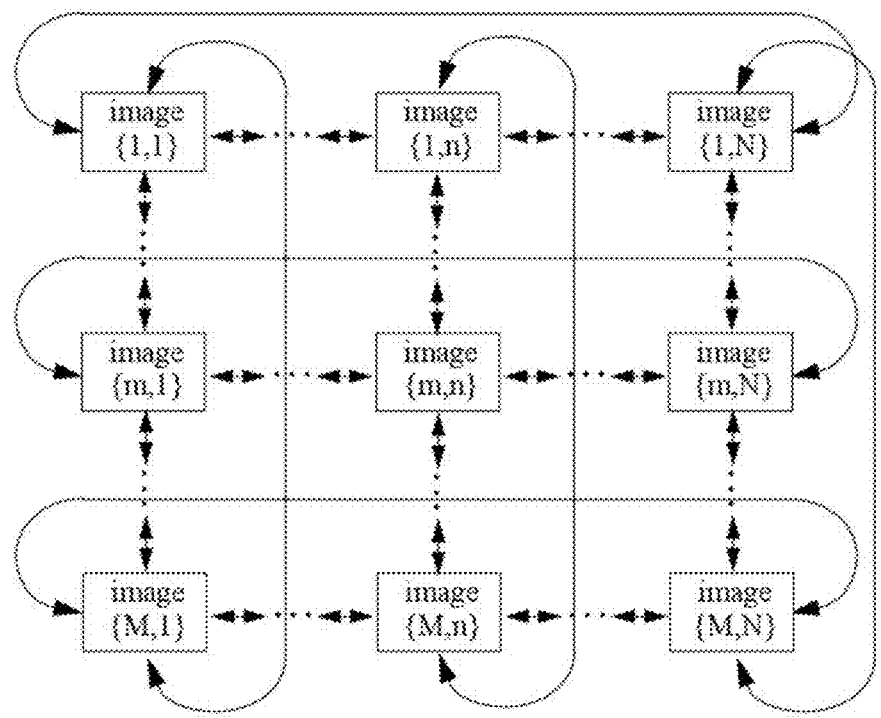
FIG. 38b depicts a 2-dimensional periodic structure imposed on the 2-dimensional array of FIG. 37.

FIG. 38*b* depicts a representative 2-dimensional periodic structure imposed on the 2-dimensional array of FIG. 37.

Figure 39:
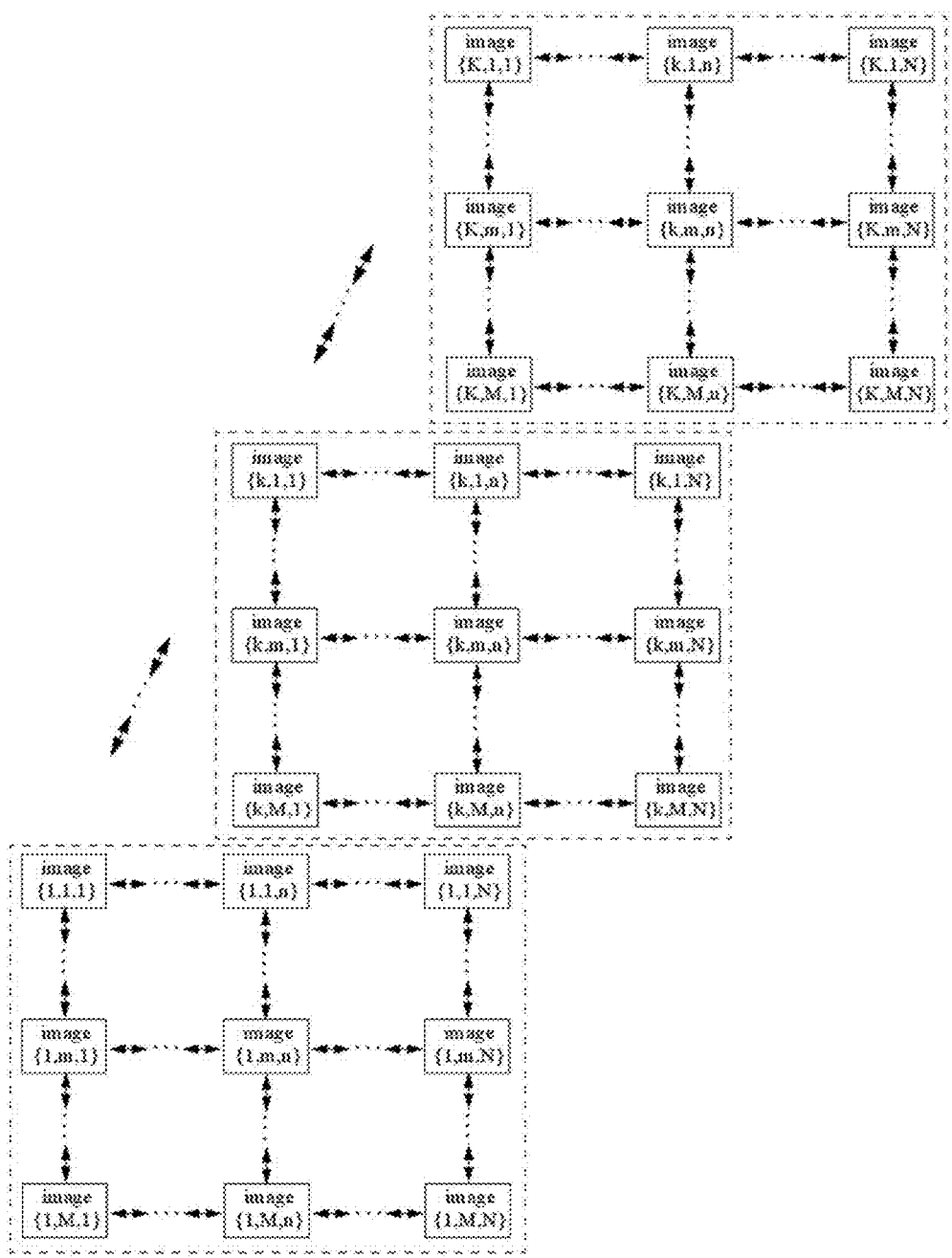
FIG. 39 depicts a 3-dimensional array of K×M×N images, any one of which can be selected for rendering as part or all of the displayed visual appearance of an MHO.

FIG. 39 depicts a representative 2-dimensional array of K×M×N images, any one of which can be selected for rendering as part or all of the displayed visual appearance of an MHO.

Figure 40:
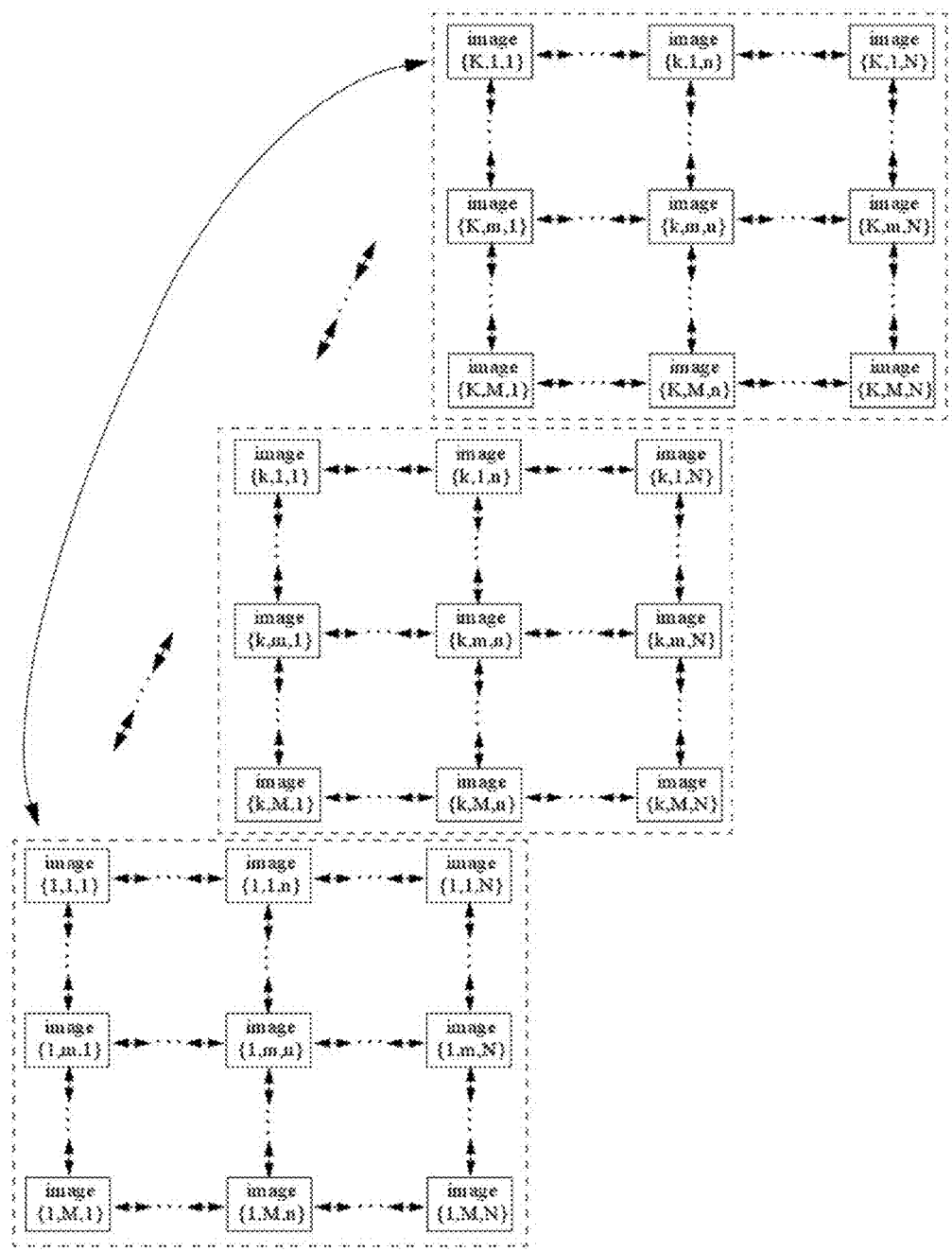
FIG. 40 depicts a 1-dimensional periodic structure imposed on the 3-dimensional array of FIG. 39.

FIG. 40 depicts a representative 1-dimensional periodic structure imposed on the 2-dimensional array of FIG. 39. In this example, the remaining dimension of the array does not have a periodic structure imposed on it. By substituting the 2-dimensional array structure in the dashed-line boxes with the FIG. 38*a* 1-dimensional periodic structure imposed on the 2-dimensional array, a resultant arrangement providing a 2-dimensional periodic structure imposed on the 3-dimensional array of FIG. 39 is obtained. By substituting the 2-dimensional array structure in the dashed-line boxes with the FIG. 38*b* 2-dimensional periodic structure imposed on the 2-dimensional array, a resultant arrangement providing a 3-dimensional periodic structure imposed on the 3-dimensional array of FIG. 39 is obtained.

Although the above representative example structures have been described in terms of images, the same structure can also be imposed on rendered graphics instructions, text content, text format, and color data.

Example Applications Employing Multiparameter Hypermedia Objects

The following on-line and/or hypermedia catalog examples are intended to demonstrate advantages and value resulting from employing MHOs working in conjunction with an APD so as to obtain more information far more quickly with far less effort. Some of these examples will showcase general or specific use of the HDTP as the APD so as to demonstrate some of the powerful metaphors possible built from 6-dimensional positions and movements of the human finger.

On-Line Shopping or Hypermedia-Catalog Examples

Traditional and contemporary webpage designs do not provide the freedom of easily altering the view presented for one section within a page (i.e., moving the view left or right, up or down, or zooming in or out) without affecting the display of the page itself. The following example demonstrates how one or more MHOs can be used to implement this functionality.

Figure 41:
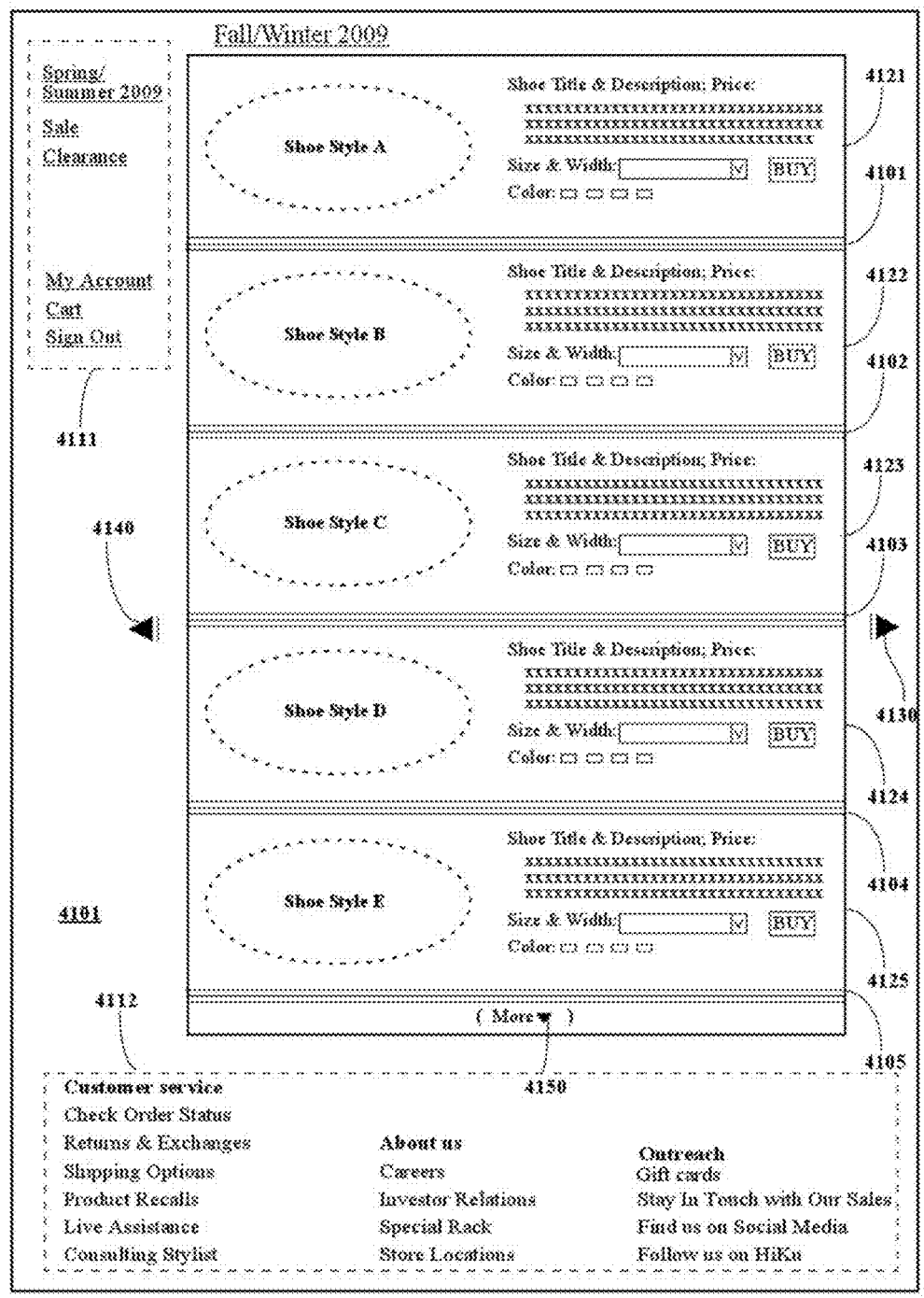
FIG. 41 depicts a body page that comprises various types of traditional hypermedia objects and MHOs.

FIG. 41 depicts a representative visual rendering of a body page 4101 for a browser-rendered web-based application. In this example, the body page 4101 comprises a plurality of sections (here represented by 4121-4125) providing product details for one or more selected categories from which the user may choose. In this example, various fields of hypermedia or MHO hyperlinks 4111, 4112 are provided for navigating to other pages. Also in this example, a right-pointing hypermedia or MHO button 4130 can be used for navigation to the next earlier-viewed page, for example the next category "Sale." Additionally in this example, left-pointing hypermedia or MHO button 4140 can be used for navigation to previous earlier-viewed page, for example the "Spring/Summer 2009" page. Yet further in this example, a bottom-pointing hypermedia or MHO button 4150 can be used for navigation to display additional sections.

One or more of these buttons 4130, 4140, 4150 (or other related buttons which can be included, such as "Next", "Previous", etc.) can be implemented as MHOs. When such MHO buttons are selected or activated by (depending on the realization) being clicked, tapped or rolled over, additional parameters are directed to affairs associated with the button (for example, allowing a quick small overlay view to appear and be display controlled (scroll up/down, scroll left/right, or zoom in/out) without disturbing the rest of the displayed webpage. For example, if such an MHO button is (depending on the realization) click, tapped or rolled over, specific additional parameters (for example, finger movements of roll, pitch, yaw, and/or downward pressure) can be directed to controlling the display (scroll up/down, scroll left/right, or zoom in/out) of the page associated with the MHO button. Another feature an MHO can be used to invoke is a quick small overlay view showing miniatures of previous earlier-viewed page(s) or next earlier-viewed page(s).

In an example embodiment, the background of the body page can be configured as an MHO while background of each individual sections (here represented by 4121-4125) can be configured as an MHO separate from each other and that of the MHO background of the body page. For example, if the area inside of body page 4101 is (depending on the realization) clicked, tapped, or rolled over, specific additional parameters (for example, finger movements of roll, pitch, yaw, and/or downward pressure) can be directed to controlling the display (scroll up/down, scroll left/right, or zoom in/out) of the body page 4101 itself. In an embodiment, tilting one's finger up and down in body page 4101 could be used to control the page's vertical movement (including section 4121). If instead a user (depending on the realization) clicks, taps or rolls over the area comprised by section 4121, the same control metaphor would instead apply only to section 4121. Thus, in an embodiment wherein an HDTP is used to control such a MHO section area, if a user (depending on the realization) taps or rolls over inside of section 4121 and tilts a finger up and down, only the display (scroll up/down, scroll left/right, or zoom in/out) of section 4121 will be affected, with no change to the display (scroll up/down, scroll left/right, or zoom in/out) of the rest of body page 4101.

Attention is now directed to controlling the display of sections and other features that facilitate rapid comparisons of products, services, images, feature options, items of information, etc. A motivation for this is that most online shopping applications do not provide an easy way to compare products within the view of a webpage. Instead, online shoppers typically compare products by adding items of interest to the shopping cart or to a wish list, the collections of which are rendered as a separate page. Not only does the user have to switch between web pages in order to change, but such lists cannot easily be shared with friends in such a way that maintains all images and metadata intact. Further, the shopping user has to have set up an account and login the account in order to view the wish list or shopping cart, adding yet more time-consuming encumbrances to the on-line shopper, thus making the shopping experience more frustrating and time consuming and making the site or catalog less attractive for return business. In an embodiment described next, an alternative is provided in order to view and compare selected items one wishes. Aspects of the alternative can utilize various types of MHOs in various ways, for example as described in the material to follow.

Figure 42:
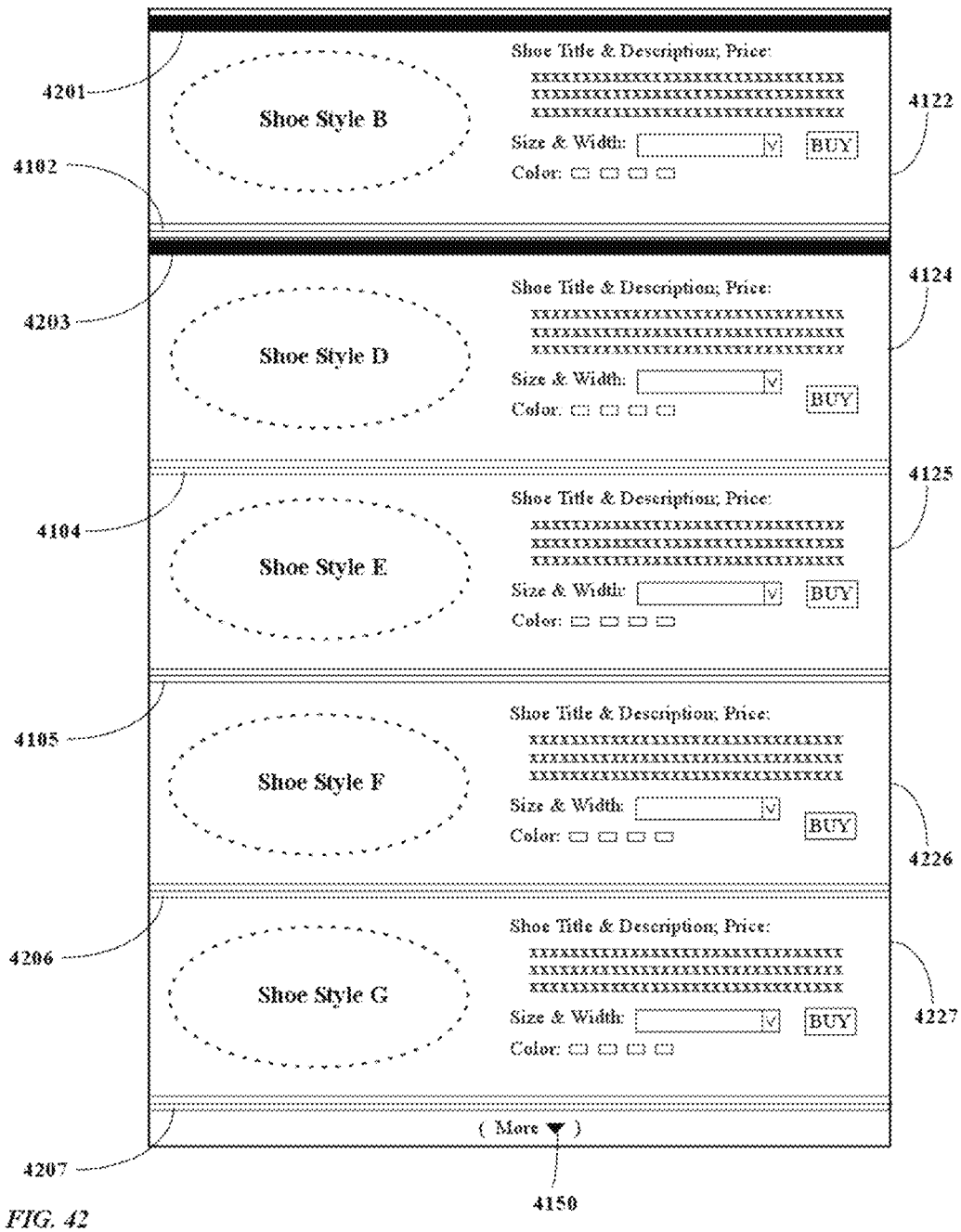
FIG. 42 shows a specific section of the webpage of FIG. 41 so as to focus on MHO features.

FIG. 42 shows a group of sections, such as 4122, 4124-4127, here operating in different modality that those shown within the body page 4101 of FIG. 41. To simplify FIG. 42, most other hypermedia objects or MHOs 4111, 4112, 4130, 4140 have been excised from the drawing.

Returning briefly to FIG. 41, sections 4121-4125 are currently displayed and additional sections can be displayed using the "More" hypermedia or MHO button 4150. Here, each section is separated by bright-shade line-through bars 4101-4105. In an embodiment, when a line-through bar (such as one of 4101-4105) is double-clicked or double-tapped, an associated section (for example the section above the line-through bar) is removed from the display and the line-through bar turns into dark-shade or black to signify that at least one section is hidden. For example in FIG. 42, sections for shoe styles A and C have been hidden and their associated line-through bars 4101, 4103 are now converted into dark-shade or black bars 4201, 4203 to signify that at least one immediately preceding section is hidden. Other line-through bars (for example 4102, 4104, 4105) are displayed unaffected. Notice in FIG. 42 additional user operation and actions have resulted in displayed shoe styles B, D, E, F and G. Newly displayed sections that appear (such as shoe style F 4226 and shoe style G 4227 in FIG. 42) are, at least initially, displayed in conjunction with associated line-through bars (such as 4206 and 4207 in FIG. 42). In an embodiment, a dark-shade or black bar 4201, 4203 can be double-clicked or double-tapped to reveal the concealed section(s) associated with it.

In an embodiment, the bright-shade line-through bar (such as one of 4101-4105) or its equivalent can be implemented as a standard hyperlink. In an embodiment, the dark-shade or black bar (such as 4201, 4203) can also be implemented as a standard hyperlink, or alternatively can be implemented as an MHO hyperlink, rollover, button, etc. If implemented as an MHO, the extra parameters used to initiate and can be directed to controlling the display (scroll up/down, scroll left/right, or zoom in/out) of the concealed section(s) associated with it.

In an embodiment, an arrangement such as that of FIG. 42 can serve as a personalized list. In an embodiment, an arrangement such as that of FIG. 42 may not have resulted from a single body page such as the body page 4101 of FIG. 41, but rather comprise or serve as a list that was created by other means. In any of these cases or other approaches, the invention provides for one to additionally save the list for later use, save it and post on a blog or website, email the list to a friend or to oneself, or save the data to the computer or removable storage element (such as a removable USB drive) for viewing at a later time when an active internet connection is not available. The sections comprised by the list can include simple images or some of the more advanced image features to be described next.

Figure 43:
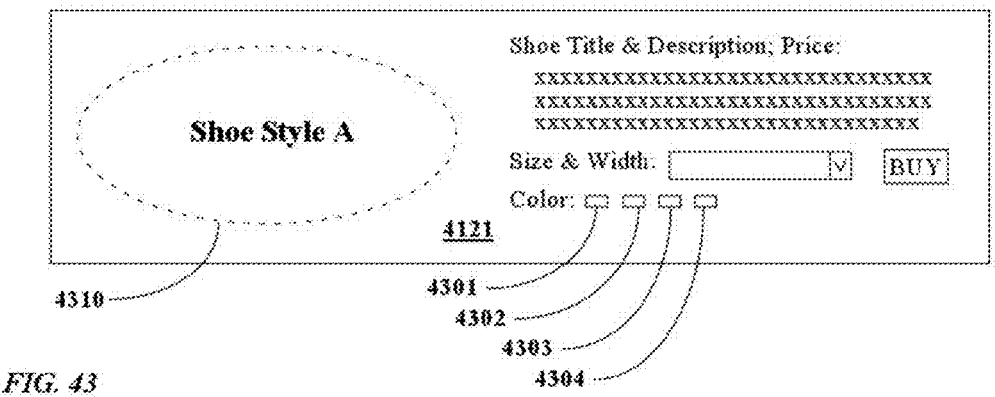
FIG. 43 provides a showcase view of a single portion of the web-page section of FIG. 42.

FIG. 43 provides a showcase view of a section of FIG. 41. Cursor movement within this section provides access to other hypermedia objects or MHOs within the section which provide additional functionality. For example, should the section be larger than the displayed area 4121, additional user input parameters (for example, in the case of the HDTP, finger roll or pitch) could enact left/right or up/down scrolling of the material displayed within the section. As another example, rollovers or clicked/tapped buttons 4301-4304 can be used to change or modulate the color of the item displayed in the image field 4310 according to available product choices.

Figure 44:
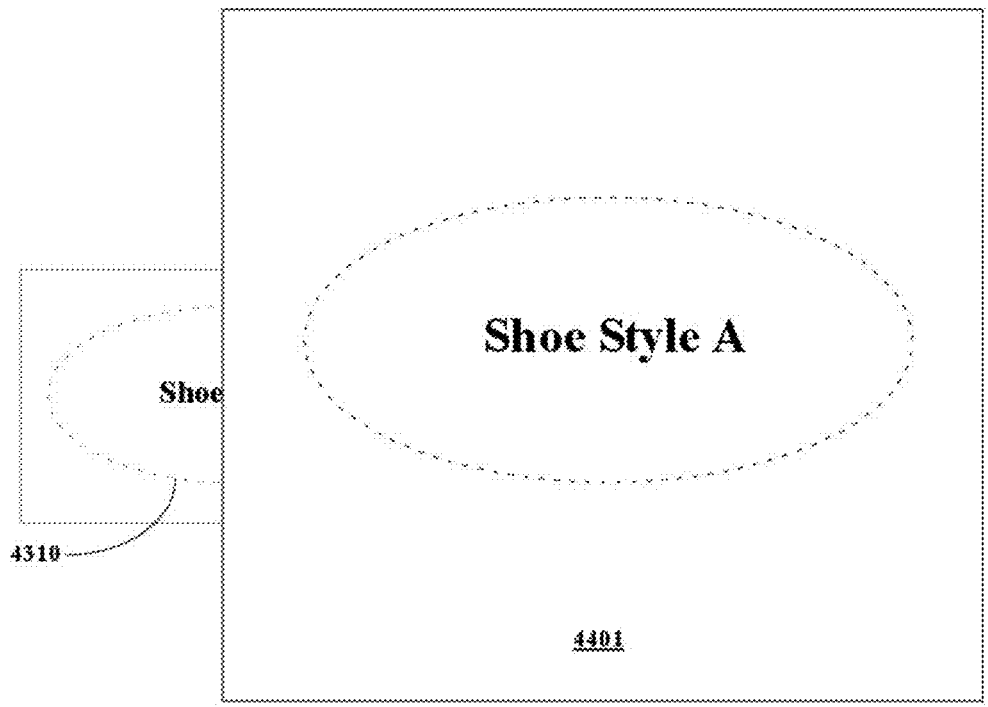
FIG. 44 shows the result of selecting a displayed element shown in FIG. 43 after choosing a color from the list shown in FIG. 43.

Positioning the cursor on the displayed in the image field 4310 can be used to invoke the display of an enlarged pop-up overlay image on the screen. For example, using an HDTP touchscreen, the selection can be made by placing the finger on the displayed image 4302. FIG. 44 shows an example enlarged pop-up overlay image 4401 resulting from selecting a displayed image field 4310 (such as the example shown in FIG. 43) after choosing a color from the options provided (for example via 4301-4304 shown in FIG. 43).

In an embodiment, the enlarged pop-up overlay image 4401 is implemented as a MHO which provides the user not only a larger image of the depicted object but also images corresponding to rotating the object through one or more angles of rotation as can be provided by associated families of images. In an embodiment, the MHO provides the user with images corresponding to zooming in/out, changes in lighting, etc., as can be provided by associated families of images and/or image processing capabilities.

For example, employing the HDTP, finger position rotations of yaw, pitch, and roll, as suggested in the postures and gestures represented in FIG. 14e-14f, can be used to visually render a sequence of images of the object viewed from angularly-varied observation points, and use of a second finger can be used to control the zoom by, for example, varying the spread between the two fingers as suggested in the postures and gestures depicted in FIG. 16. Further, for example, left-to-right motion of a thumb or little finger can be used to control the lighting effect.

Figure 46A:
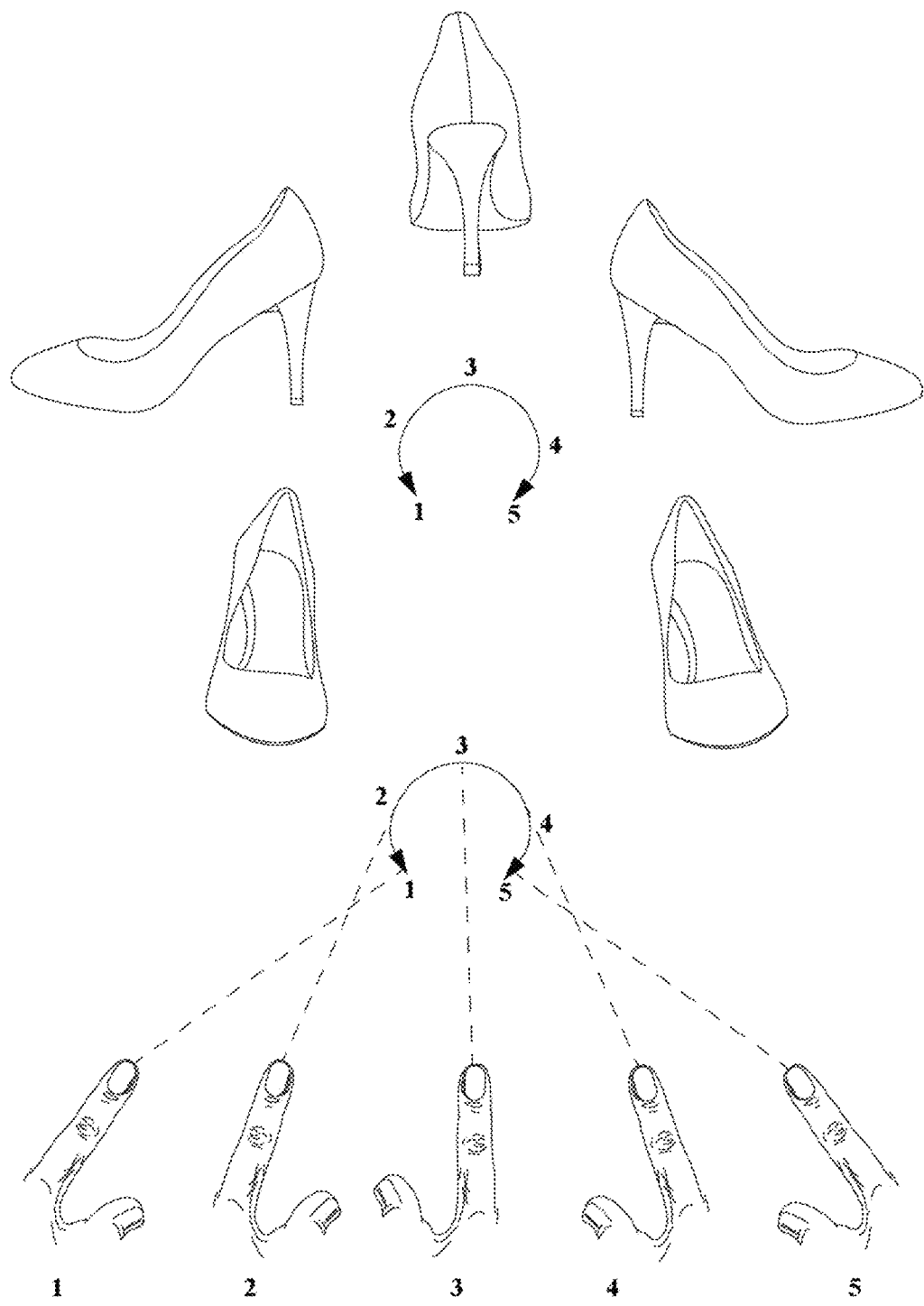
FIG. 46a depicts a sequence of images capturing a 1-dimensional rotation of a shoe over a non-periodic range of rotation angles as controlled by yaw positions and movements of a single finger in contact with an HDTP.
Figure 46B:
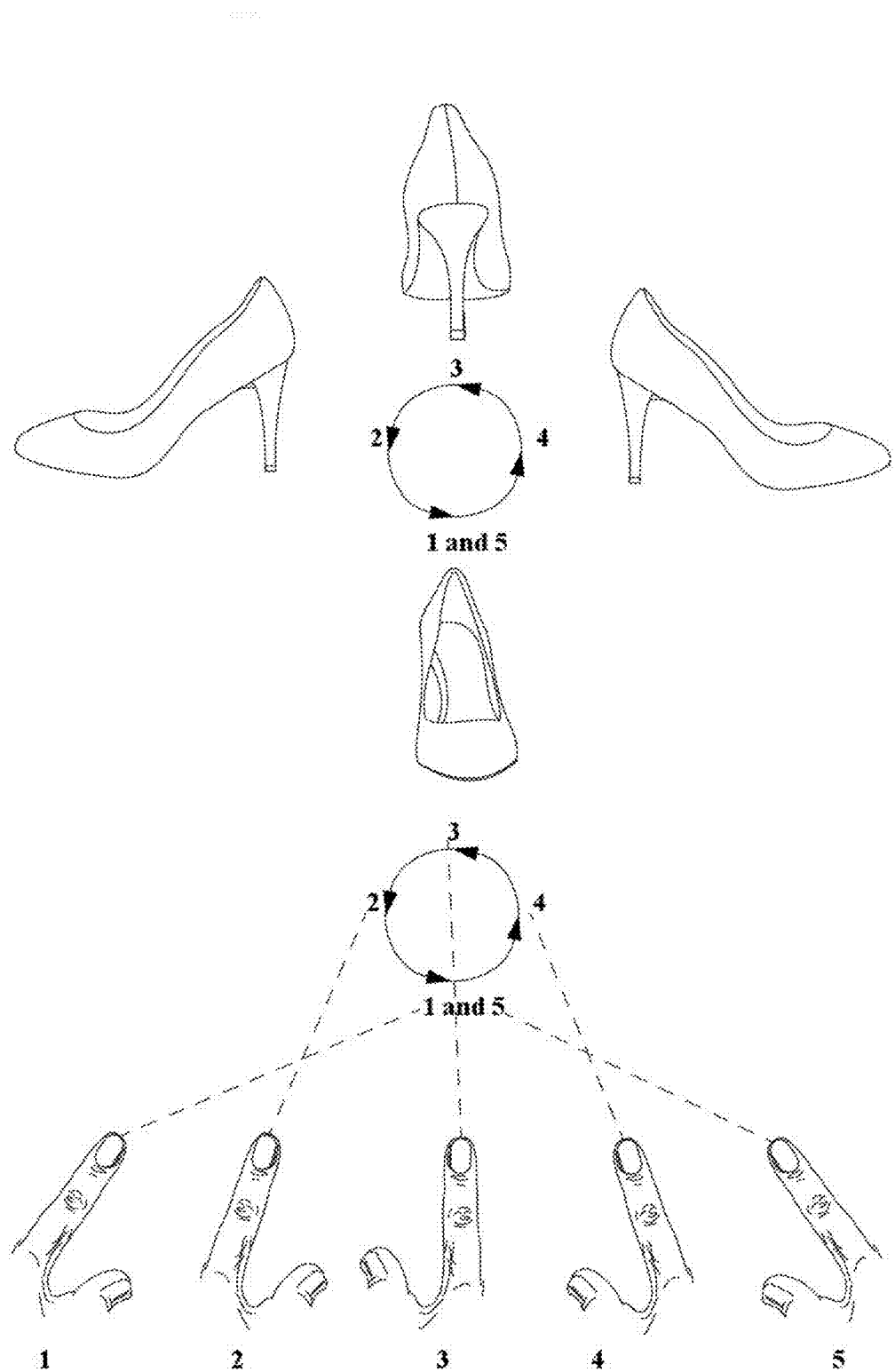
FIG. 46b depicts a sequence of images capturing a 1-dimensional rotation of a shoe over a periodic range of rotation angles as controlled by yaw positions and movements of a single finger in contact with an HDTP.
Figure 47:
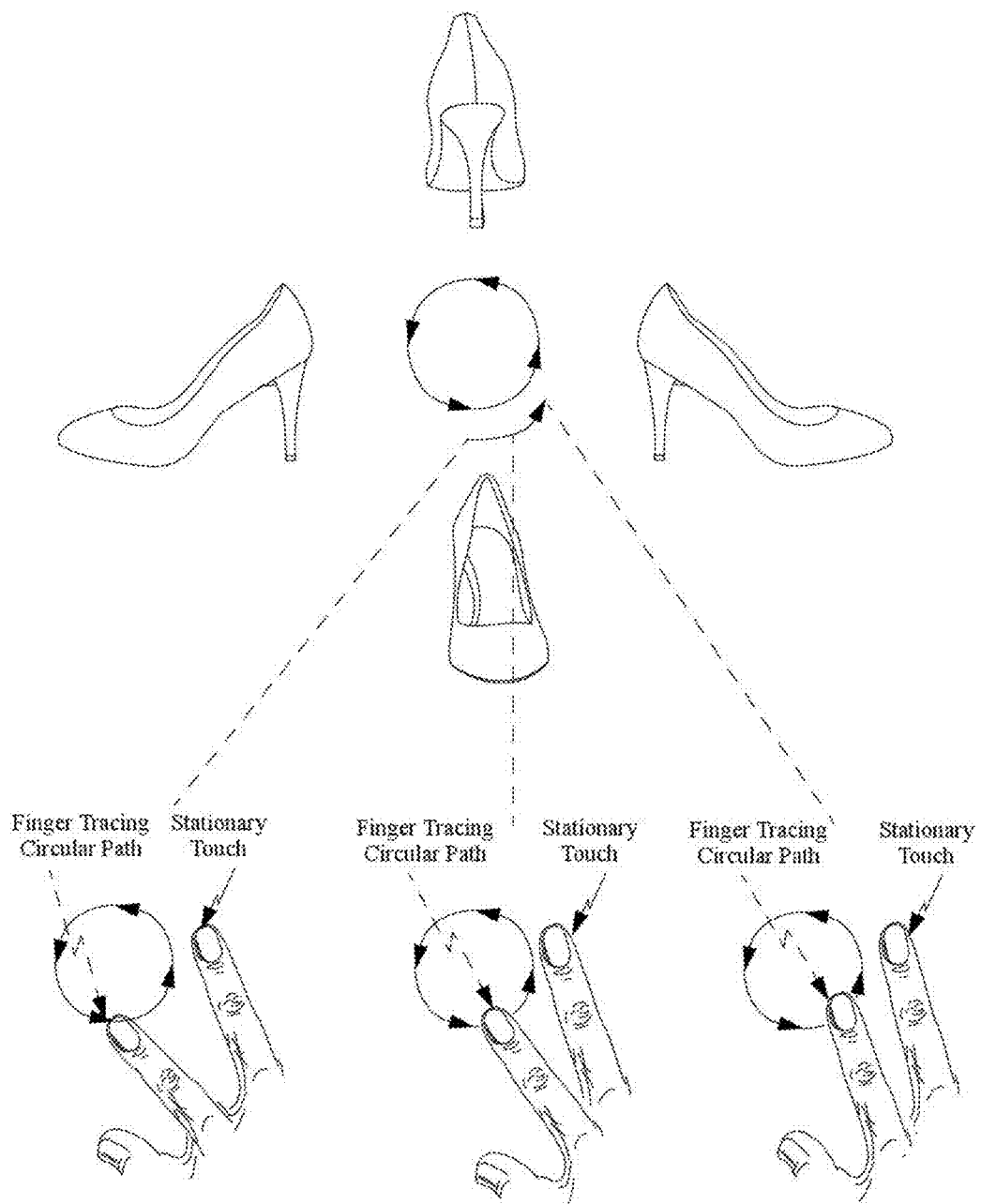
FIG. 47 depicts a sequence of images capturing a 1-dimensional rotation of a shoe over a periodic range of rotation angles as controlled by a family of two-finger posture positions and movements finger in contact with an HDTP.
Figure 48:
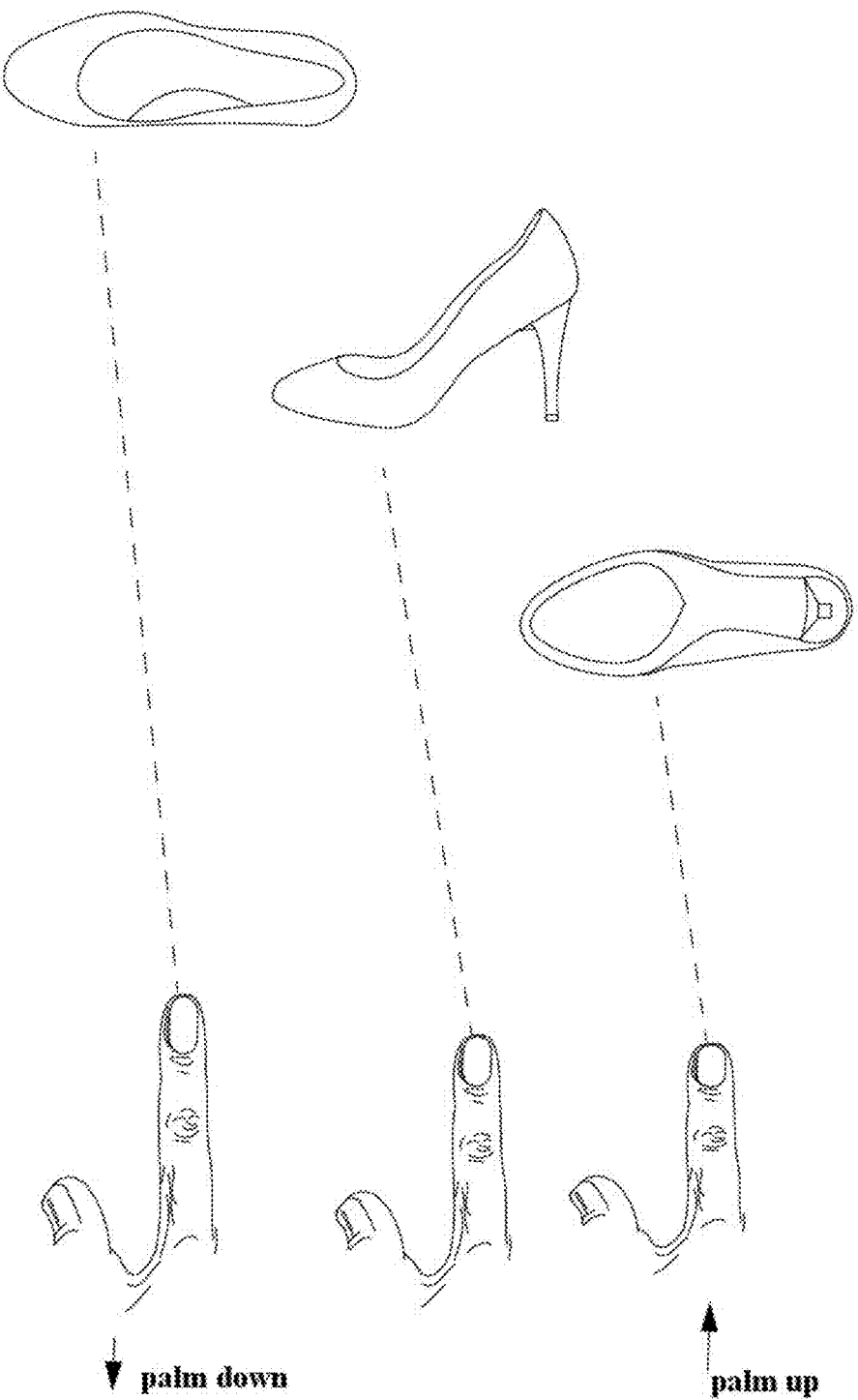
FIG. 48 depicts a sequence of images capturing a 1-dimensional rotation of a shoe within a different angle of rotation that that of FIGS. 46a-46b over a range of rotation angles as controlled by the pitch angle of a single finger in contact with an HDTP.

In an embodiment, families of images visually render a sequence of images of the object viewed from angularly-varied observation points can be implemented, for example, in a manner such as those described in conjunction with FIGS. 35-39. FIGS. 45a-45f depict representative views of a shoe as can be captured in individual images for use in the representative image array data structures described in conjunction with FIGS. 35-40. As an example of the user experience implying the HDTP:

FIG. 46a depicts a representative sequence of images capturing a 1-dimensional rotation of a shoe over a non-periodic range of rotation angles as controlled by yaw positions and movements of a single finger in contact with an HDTP;

FIG. 46b depicts a representative sequence of images capturing a 1-dimensional rotation of a shoe over a periodic range of rotation angles as controlled by yaw positions and movements of a single finger in contact with an HDTP;

FIG. 47 depicts a representative sequence of images capturing a 1-dimensional rotation of a shoe over a periodic range of rotation angles as controlled by a family of two-finger posture positions and movements finger in contact with an HDTP;

FIG. 48 depicts a representative sequence of images capturing a 1-dimensional rotation of a shoe within a different angle of rotation that that of FIGS. 46a-46b over a range of rotation angles as controlled by the pitch angle of a single finger in contact with an HDTP.

In an embodiment, as the at least one additional user-adjustable input for entering values is varied between values, one or another image of a group of images is displayed as part or all of the displayed visual appearance of an MHO, directly responsive to the last received value of the at least one additional user-adjustable input.

In an embodiment, zooming of the image can be implemented by well-known image processing algorithms and techniques which can be readily found in textbooks and on the internet. These are applied to one on more photographic images associated with the currently active viewing angle.

In an embodiment, variation in lighting can be implemented by well-known image processing algorithms and techniques which can be readily found in textbooks and on the internet. A simple example is to varying the overall brightness of the entire displayed image. In a more sophisticated embodiment, variation in lighting can be implemented, for example, by interpolating between two or more photograph images taken under different lighting conditions, said interpolation be implemented by well-known image processing algorithms and techniques which can be readily found in textbooks and on the internet. A simple example is varying the weighted proportions of each photograph image in a linear combination of the component-by-component (RGB, YUV, HSB, etc.) pixel values. In yet another embodiment, a combination of proportional linear combination of photograph image pixels values and other signal processing techniques can be used.

Many variations on the above examples are possible as is clear to one skilled in the art. Overall, such innovations provide at least two extraordinarily important advantages:

Rapid in-depth product inspection and comparison;

Significantly deeper understanding of the visual aspect of the product;

Despite each of the above, far less wrist and hand fatigue in the shopping experience.

Performance Seating Inspection Examples

Figure 49:
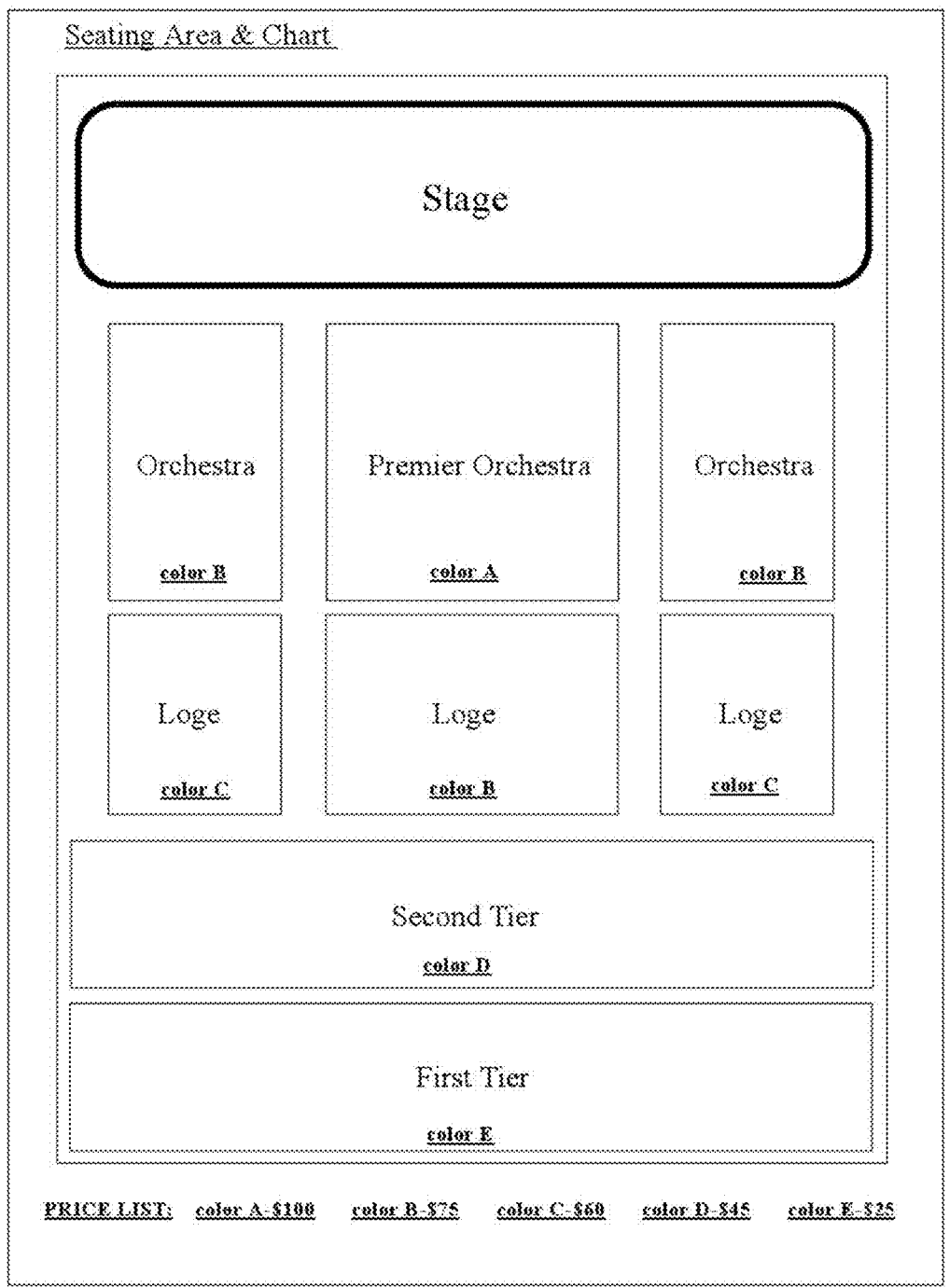
FIG. 49 depicts an event venue ticket shopping webpage.

FIG. 49 depicts an example ticket shopping webpage for a performance theatre. When on-line shoppers seek to purchase tickets for concerts, a common complaint is that the views provided of the venue (if any are provided) are often confusing and misleading, and there is at best limited information provided regarding viewing distance and angles of specific sections to the stage and/or their proximity to the exits, pillars, and other aspects of the venue.

These shortcomings could be significantly addressed by displaying actual images from the vantage point of each seat, ideally providing a 360° view from any given seat before purchase of (increasing expensive) tickets.

In an example embodiment, a potential ticket purchasing customer would come to a ticket purchase website and after selecting a particular even would be presented with a web page such as that depicted in FIG. 49. Each section of seating can be, for example, signified with a different color in order to distinguish different areas, types of areas, and/or prices. Seats that are not available could be signified in various ways, for example rendered in grey, black or other color, or displayed with an "X" or other symbol or highlighting rendered on (or replacing) the seat icon or depiction.

Figure 50:
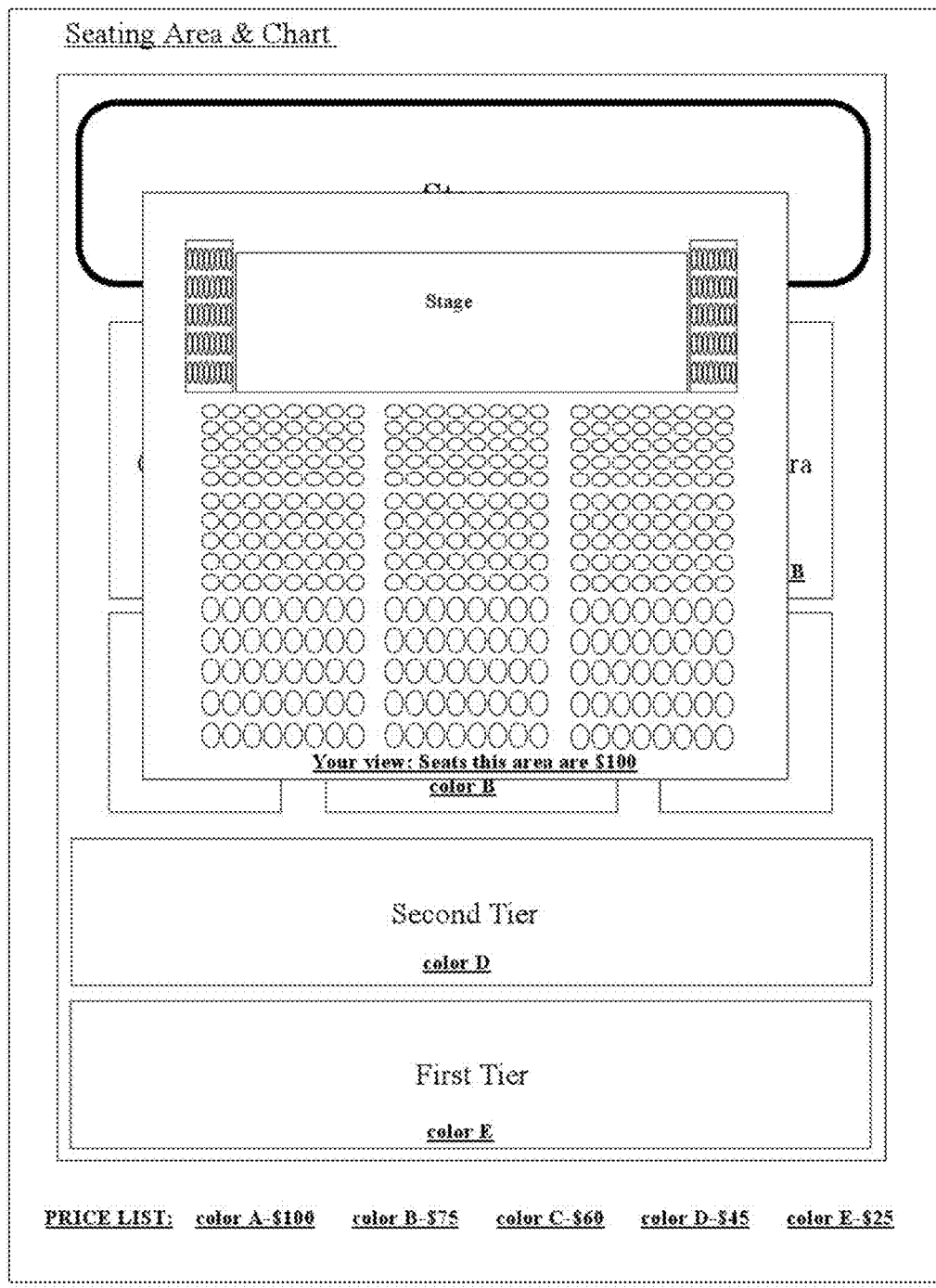
FIG. 50 depicts a popup image window overlay on the ticket shopping webpage depicted in FIG. 49, said popup image depicting a view showing a photographic representation of the view of a stage.
Figure 51:
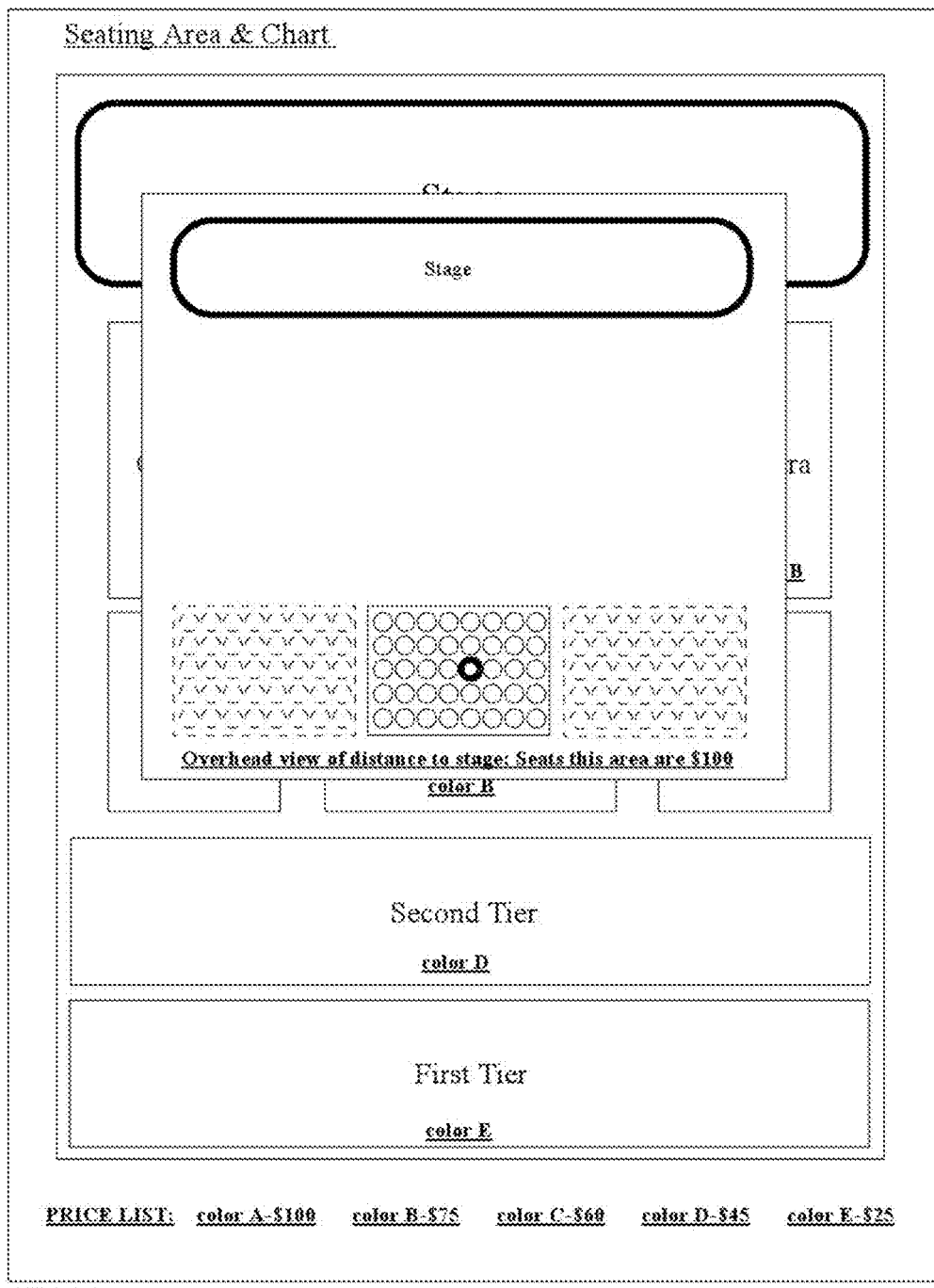
FIG. 51 depicts a popup image window overlay on the ticket shopping webpage depicted in FIG. 49, said popup image depicting an overhead view showing a photographic representation of the separation distance from a stage.

FIG. 50 depicts a popup image window overlay on the ticket shopping webpage depicted in FIG. 49. In an embodiment, the act of positioning of the cursor (or in an HDTP touchscreen or other touchscreen implementation, positioning a finger) on one section (for example, Loge) an image of actual view would appear in an overly pop-up box. In an embodiment, this image shows a reasonably accurate rendering of the view of the stage from that location, and in some embodiments the view of other aspects of the theatre such as the aisles, exits, seat covers, etc. In an embodiment, the price of the ticket is also displayed. By simply sweeping the cursor (or finger on an HDTP touchscreen or other touchscreen), the potential ticket purchaser is rapidly provided with more accurate perception of what the viewing experience will be and its trade-off with price, separation from friends, etc, as well as other information relating to comfort, quality, crowding, exit access safety, etc. In an embodiment involving the HDTP and the pop-up box implemented as a MHO, the user can roll a finger left and right to view and decide what angle they prefer to have with their seats, or tilt a finger up or down to move to a different row within the same section. For example, FIG. 51 depicts an overhead view showing a photographic representation of the separation distance from the stage. In an HDTP embodiment, roll, pitch, and/or yaw of the finger tip could allow viewing of the rest of the performing area including the ceilings, upper level(s), and exits.

In an example embodiment, tapping or clicking the graphic element representing a particular seat will select that seat as a further step towards reservation and/or purchase.

In an embodiment, zooming of the image for a given separation distance (between the stage and a seating area actively under study) can be implemented by known image processing algorithms and techniques which can be readily found in textbooks and on the internet. These are applied to one on more photographic images associated with the currently active viewing angle. In an embodiment, a mathematical model tied to a scaled seat-map or a database linked to a seat map (seat maps such as that depicted in FIG. 49) can calculate and/or retrieve separation distance data and viewing angle data and present to one or both of an at least one image selection element and an at least one image processing element.

In an embodiment, an image selection element selects images to display based on calculated and/or retrieved viewing angle data. In an embodiment, an image selection element selects images to display based on calculated and/or retrieved separation distance data. In an embodiment, should some locations in the venue contain view obstructions, the image selection element can include provisions for selection specific image selection from obstruction-handling families of images.

In an embodiment, distance and/or angle information can be used by an image processing element to provide one or more of selective cropping and/or distance-varying image warping to render a reasonably accurate expected view from the particular seat or region of seats. In an embodiment, at least some of the above can be used to provide display of images representing interactively selected views at various angles at the particular seat or seating area. In an embodiment, these and additional image processing functions can be used to implement panoramically merged images.

Thus, the invention provides for an improved interactive interface for consumers buying event tickets online providing users with a virtual view of the event venue as seen from any of the seats available for purchase. Those who have never been to a given venue can experience the view from a given seat to inform their selection before a purchasing decision is made.

image processing to be used to synthesize an image of a particular viewing angle from one or more photographic images comprising one or more other viewing angle(s), at least one of the calculation and display of which is under the control of a user input device.

A mathematical model tied to a scaled seat-map or a database linked to a seat map to be used to calculate and/or retrieve separation distance data and viewing angle data and present to one or both of an at least one image selection element and an at least one image processing element, at least one of the calculation and display of which is under the control of a user input device.

Separation distance data and viewing angle data to be used by at least one image processing element to calculate a synthesized view from one or more photographic images, at least one of the calculation and display of which is under the control of a user input device.

An image selection element to be used to select images to display based on calculated and/or retrieved viewing angle data. In an embodiment, an image selection element selects images to display based on calculated and/or retrieved separation distance data.

Should some locations in the venue contain view obstructions, the image selection element to include provisions for selection specific image selection from obstruction-handling families of images, at least one of the calculation and display of which is under the control of a user input device.

Distance and/or angle information to be used by an image processing element to provide one or more of selective cropping and/or distance-varying image warping to render a reasonably accurate expected view from the particular location, such as a seat or region of seats in a theater, sports, or performance venue, at least one of the calculation and display of which is under the control of a user input device.

At least some of the afore described to be used to provide display of images representing interactively selected views at various angles at the particular seat or seating area, at least one of the calculation and display of which is under the control of a user input device.

At least some of the afore described and additional image processing functions to be used to implement panoramically merged images, at least one of the calculation and display of which is under the control of a user input device.

While the invention has been described in detail with reference to disclosed embodiments, various modifications within the scope of the invention will be apparent to those of ordinary skill in this technological field. It is to be appreciated that features described with respect to one embodiment typically can be applied to other embodiments.

The invention can be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Although exemplary embodiments have been provided in detail, various changes, substitutions and alternations could be made thereto without departing from spirit and scope of the disclosed subject matter as defined by the appended claims. Variations described for exemplary embodiments may be realized in any combination desirable for each particular application. Thus particular limitations, and/or embodiment enhancements described herein, which may have particular advantages to a particular application, need not be used for all applications. Also, not all limitations need be implemented in methods, systems, and apparatuses including one or more concepts described with relation to the provided exemplary embodiments. Therefore, the invention properly is to be construed with reference to the claims.

We claim:

1. A non-transitory computer-readable medium containing executable instructions stored in a storage, the instructions comprising:

activating a hypermedia object associated with an application, the hypermedia object for display on a display screen and responsive to information provided by a user interface input device comprising two-dimensional pointing functions and at least one additional user-adjustable input for entering values from a range comprising more than two possible values, the hypermedia object comprising:

a first visual representation of the hypermedia object for display in a first region of a display screen wherein the first region is associated with an application, and an associated responsive area in a second region of the display for activating the hypermedia object; and allowing a user to activate the hypermedia object from a user-initiated action enacted on a user interface input device, the user interface input device comprising two-dimensional pointing functions and at least one additional user-adjustable input for entering values from a range comprising more than two values;

wherein activating the hypermedia object enables the entry of at least one additional user-adjustable input value for use by the associated application using the at least one additional user-adjustable input comprised by the user interface input device, wherein the at least one additional user-adjustable input value comprises a finger angle based on a measured parameter of a single contact location on the user interface input device.

2. The non-transitory computer-readable medium of claim 1 wherein the first and second regions of the display are the same region.

3. The non-transitory computer-readable medium of claim 1 further comprising a hyperlink function that is activated by user interface input device when a cursor is positioned within-the associated responsive area, the cursor position controlled by the two-dimensional pointing functions.

4. The non-transitory computer-readable medium of claim 1 wherein the hypermedia object comprises a rollover function that is activated by using the user interface input device to position a cursor within the associated responsive area, the cursor position controlled by the two-dimensional pointing functions.

5. The non-transitory computer-readable medium of claim 1 wherein the hypermedia object comprises a button function that is activated by the user interface input device when a cursor is positioned within the associated responsive area, the cursor position controlled by the two-dimensional pointing functions.

6. The non-transitory computer-readable medium of claim 1 wherein the hypermedia object comprises a slider function.

7. The non-transitory computer-readable medium of claim 1 wherein the hypermedia object comprises a menu function.

8. The non-transitory computer-readable medium of claim 1 wherein the user input device is a computer mouse comprising a first scrollwheel.

9. The non-transitory computer-readable medium of claim 8 wherein the user input device is a computer mouse further comprising a second scrollwheel.

10. The non-transitory computer-readable medium of claim 1 wherein the user input device is a computer mouse comprising a touchpad.

11. The non-transitory computer-readable medium of claim 1 wherein the user input device is a computer mouse comprising a High Definition Touch Pad (HDTP).

12. The non-transitory computer-readable medium of claim 1 wherein the user input device comprises a touch user interface responsive to gestures and the at least one additional user-adjustable input comprises at least one gesture.

13. The non-transitory computer-readable medium of claim 1 wherein the user input device comprises a touch user interface responsive to a yaw angle of a finger in contact with the touch user interface and the at least one additional user-adjustable input is responsive to a measurement of the yaw angle.

14. The non-transitory computer-readable medium of claim 1 wherein the user input device comprises a touch user interface responsive to a roll angle of a finger in contact with the touch user interface and the at least one additional user-adjustable input is responsive to a measurement of the roll angle.

15. The non-transitory computer-readable medium of claim 1 wherein the user input device comprises a touch user interface responsive to a pitch angle of a finger in contact with the touch user interface and the at least one additional user-adjustable input is responsive to a measurement of the pitch angle.

16. The non-transitory computer-readable medium of claim 1 wherein the user input device comprises a touch user interface responsive to at least two angles of a finger in contact with the touch user interface and the at least one additional user-adjustable input is responsive to a measurement of each of the two angles.

17. The non-transitory computer-readable medium of claim 1 wherein a second visual representation of the hypermedia object is displayed responsive to the control of the hypermedia object.

18. The non-transitory computer-readable medium of claim 1 wherein the first visual representation of the hypermedia object changes responsive to the control of the hypermedia object.

19. The non-transitory computer-readable medium of claim 1 wherein the first visual representation of the hypermedia object changes responsive to the at least one additional user-adjustable input.

20. The non-transitory computer-readable medium of claim 1 wherein the user input device is a touch interface comprising a tactile grammar.

21. The non-transitory computer-readable medium of claim 19, wherein a second visual representation of the hypermedia object is displayed responsive to the control of the hypermedia object.

22. The non-transitory computer-readable medium of claim 1, wherein the finger angle is based on at least one measured parameters of at least one of roll, pitch, or yaw.

23. The non-transitory computer-readable medium of claim 1, wherein the finger angle includes a roll, pitch, and yaw.

24. The non-transitory computer-readable medium of claim 1, wherein the finger angle is based on at least one measured parameter with shape recognition.

25. The non-transitory computer-readable medium of claim 1, wherein the finger angle is based on at least one measured tilt.

26. The non-transitory computer-readable medium of claim 25, wherein the finger angle is based on at least one measured rotation.

27. The non-transitory computer-readable medium of claim 1, wherein additional user-adjustable input for entering values is within a hotspot.

28. The non-transitory computer-readable medium of claim 1 wherein activating the hypermedia object by the user interface input device comprises a pointing device or keystroke.

29. A method comprising:

allowing a user to activate the hypermedia object associated with an application, the hypermedia object for display on a display screen and responsive to information provided by a user input device comprising two-dimensional pointing functions and at least one additional user-adjustable input for entering values from a range comprising more than two possible values, wherein the user input device comprises a touch user interface responsive to the roll angle of a finger in contact with the touch user interface, and the hypermedia object comprising:

a first visual representation of the hypermedia object for display in a first region of a display screen wherein the first region is associated with an application, and an associated responsive area in a second region of the display for activating the hypermedia object; and allowing a user to activate the hypermedia object from a user-initiated action enacted on a user input device, the user input device comprising two-dimensional pointing functions and at least one additional user-adjustable input for entering values from a range comprising more than two values;

wherein activating the hypermedia object enables the entry of at least one additional user-adjustable input value for use by the associated application using the at least one additional user-adjustable input comprised by the user input device, wherein the at least one additional user-adjustable input value comprises a finger angle based on a measured parameter of a single contact location on the user interface input device.

* * * * *